(12) United States Patent
Sorimachi et al.

(10) Patent No.: US 7,184,549 B2
(45) Date of Patent: Feb. 27, 2007

(54) METHOD AND APPARATUS FOR ENCRYPTION, METHOD AND APPARATUS FOR DECRYPTION, AND COMPUTER-READABLE MEDIUM STORING PROGRAM

(75) Inventors: Toru Sorimachi, Tokyo (JP); Toshio Tokita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 973 days.

(21) Appl. No.: 09/936,570

(22) PCT Filed: Dec. 22, 2000

(86) PCT No.: PCT/JP00/09129

§ 371 (c)(1),
(2), (4) Date: Dec. 6, 2001

(87) PCT Pub. No.: WO01/52472

PCT Pub. Date: Jul. 19, 2001

(65) Prior Publication Data

US 2002/0181709 A1 Dec. 5, 2002

(30) Foreign Application Priority Data

Jan. 14, 2000 (JP) ............................. 2000-005161

(51) Int. Cl.
*H04K 1/00* (2006.01)
(52) U.S. Cl. ............................................ 380/37; 380/28
(58) Field of Classification Search ................. 380/37, 380/27, 28
See application file for complete search history.

(56) References Cited

U.S. PATENT DOCUMENTS

| | | | |
|---|---|---|---|
| 5,615,264 A | 3/1997 | Kazmierczak et al. | |
| 5,631,960 A | 5/1997 | Likens et al. | |
| 5,673,319 A | 9/1997 | Bellare et al. | |
| 5,796,836 A * | 8/1998 | Markham | ..................... 380/28 |
| 6,161,183 A | 12/2000 | Saito et al. | |
| 6,226,742 B1 * | 5/2001 | Jakubowski et al. | ......... 713/170 |

FOREIGN PATENT DOCUMENTS

| | | |
|---|---|---|
| DE | 197 24 072 A1 | 12/1998 |
| EP | 0 802 653 A2 | 10/1997 |
| EP | 0 837 383 A2 | 4/1998 |
| EP | 0 874 496 A2 | 10/1998 |
| JP | 57 069344 | 4/1982 |
| JP | 02 073747 | 3/1990 |
| JP | 04 048336 | 2/1992 |
| JP | 04 191935 | 7/1992 |
| JP | 82 48879 | 8/1996 |
| JP | 09 298736 | 11/1997 |
| JP | 10 123950 | 4/1998 |

\* cited by examiner

*Primary Examiner*—Nasser Moazzami
*Assistant Examiner*—Ellen C. Tran
(74) *Attorney, Agent, or Firm*—Birch, Stewart, Kolasch & Birch, LLP

(57) ABSTRACT

To encrypt another piece of data during encrypting process of a certain piece of data, a memory 55 is provided in parallel with a feedback line 65 which feeds back data from an encrypting module 51 using an encryption key K to a selector 54. When an interrupt IT for processing plaintext block data $N_1$ is generated while plaintext block data $M_1$ is processed, ciphertext block data $C_1$ at timing of generation of the interrupt IT is made to be stored in a register 56. The ciphertext block data $C_1$ stored in the memory 55 is made to be selected by the selector 54 at timing of completion of processing the plaintext block data $N_1$, and processing the plaintext block data $M_{1+1}$ is started.

50 Claims, 49 Drawing Sheets

METHOD AND APPARATUS FOR ENCRYPTION, METHOD AND APPARATUS FOR DECRYPTION, AND COMPUTER-READABLE MEDIUM STORING PROGRAM

This application is the national phase under 35 U.S.C. § 371 of PCT International Application No. PCT/JP00/09129 which has an International filing date of Dec. 22, 2000, which designated the United States of America and was not published in English.

TECHNICAL FIELD

The present invention relates to an encrypting apparatus, a decrypting apparatus, and encrypting/decrypting method, in particular, to an invention which enables to encrypt/decrypt another piece of data while a certain piece of data is encrypted/decrypted.

BACKGROUND ART

FIG. 43 shows a block diagram of an encryptor performing encryption of Cipher Block Chaining Mode (hereinafter, referred to as the CBC mode).

An encryption of the CBC mode is performed as follows: first, plaintext block data $M_1$ of 64 bits is input by block unit; the input data is encrypted by an encrypting module 51 using an encryption key K; ciphertext block data $C_1$ and plaintext block data $M_{i+1}$, subsequent to the data $M_1$, are XORed; and the XORed result is supplied to the encrypting module 51, for encryption using the encryption key K, as a next input for encrypting process. Then, this process is repeatedly chained, and the whole plaintext data M will be encrypted into ciphertext data C.

FIG. 44 shows a block diagram of a decrypting apparatus performing decryption of the CBC mode.

The decrypting apparatus shown in FIG. 44 is an apparatus for decrypting the ciphertext data encrypted by the encrypting apparatus shown in FIG. 43. The ciphertext block data $C_1$ is input to a decrypting module 71 for decryption using the encryption key K, XORed with an initial value IV, and decrypted into plaintext block data $M_1$. When ciphertext block data $C_2$ is input, the block data $C_2$ is decrypted by the decrypting module 71 using the encryption key K, XORed with the ciphertext block data $C_1$, which has been previously input and stored in a register 111, and decrypted into plaintext block data $M_2$.

Here, the register 111 can be provided inside a selector 73.

The CBC mode can be represented by the following expressions where plaintext block data is $M_i$ (i=1, 2, ..., n), ciphertext block data $C_i$ (i=1, 2, ..., n), the encrypting process using the encryption key K is defined as $E_k$, and the decrypting process using the encryption key K is defined as $D_k$:

$C_1 = E_k(M_1 \text{ EXR IV})$
$C_i = E_k(M_i \text{ EXR } C_{i-1})$ (i=2, 3, ..., n)
$M_1 = D_k(C_1) \text{ EXR IV}$
$M_i = D_k(C_i) \text{ EXR } C_{i-1}$ (i=2, 3, ..., n)

Here, EXR represents an XOR operation. IV represents an initial value to be used for an initial step of encrypting and decrypting processes. The same initial value IV is used both in the encryptor and the decryptor.

FIG. 45 shows an encryptor performing encryption of Output Feedback Mode (hereinafter, referred to as OFB mode).

FIG. 46 shows a decryptor performing decryption of the OFB mode.

FIG. 47 shows an encryptor performing encryption of Cipher Feedback Mode (hereinafter, referred to as CFB mode).

FIG. 48 shows a decryptor performing decryption according to the CFB mode.

Here, the register 111 can be provided inside the selector 73.

FIG. 49 is a block diagram showing a procedure for encrypting plaintext data M and plaintext data N using the encryptor of the CBC mode.

Hereinafter, a case in which the plaintext data M including plaintext block data $M_1$, plaintext block data $M_2$, and plaintext data $M_3$, and the plaintext data N including only plaintext block data $N_1$ will be explained.

When the encryption of plaintext block data $M_1$ is started, ciphertext block data $C_1$ is output, and the ciphertext block data $C_1$ is also used for encrypting process of plaintext block data $M_2$. In this way, ciphertext block data $C_1$ is fed back to the process of encrypting plaintext block data $M_{i+1}$, which forms a chained process. Accordingly, it is not possible to encrypt the plaintext block data $N_1$ unless encrypting process of the plaintext block data $M_1$ through the plaintext block data $M_3$ has been finished.

FIG. 50 shows the encrypting process of the CBC mode as well as FIG. 49.

In case of FIG. 50, it takes long to prepare each of the plaintext block data $M_1$, the plaintext block data $M_2$, and the plaintext block data $M_3$. While, the encryption has been finished before the next plaintext block data $M_{i+1}$ is prepared, which generates an idle time (time between T1 through T2, T3 through T4). In this way, even if the idle time is generated, the chain process has to be performed such that the ciphertext block data $C_1$ should be fed back to the encrypting process of the plaintext data $M_{i+1}$. Therefore, the process for the plaintext block data $N_1$ cannot be performed until the encrypting process of the plaintext block data $M_3$ is finished.

FIG. 51 shows a data confidentiality process and a data integrity ensuring process. The plaintext data M is, for example, encrypted into the ciphertext data C by the encryptor of the OFB mode. A message authentication code (MAC) P is computed by the encryptor of the CBC mode, and is appended to the last bit of the ciphertext data C. In case of receiving data which is encrypted and to which the MAC P is appended, as well as decrypting the ciphertext data C into the plaintext data M by the decryptor of the OFB mode, the MAC P is computed from the ciphertext data C by the decryptor of the CBC mode. It is possible to confirm the ciphertext data C transmitted has not tampered by comparing the obtained MAC P with the MAC P transmitted and received.

FIG. 52 shows a procedure for the confidentiality process and the MAC computing process shown in FIG. 51.

The plaintext block data $M_1$ through the plaintext block data $M_3$ are serially encrypted into the ciphertext block data $C_1$ through the ciphertext block data $C_3$. Subsequent, the MAC P is computed by serially inputting the ciphertext block data $C_1$ through ciphertext block data $C_3$.

The encryptor and the decryptor of each mode shown in FIGS. 42 through 48 has a problem as follows: the data obtained by encrypting and decrypting process of the previous block data should be fed back and used for encrypting and decrypting the next block data; there is a problem that once the encrypting process or the decrypting process is started, another encrypting process or another decrypting process cannot be started unless the whole steps of the encrypting process or the decrypting process are finished. Accordingly, if the encrypting/decrypting process, which is previously started, requires much time, the subsequent encrypting/decrypting process should wait for a long time.

Further, in case of performing the confidentiality process and the integrity ensuring process, the integrity ensuring process should be performed after performing the confidentiality process, which takes a long processing time.

It is an object of the preferred embodiment of the present invention to obtain an encryptor, a decryptor, an encrypting method, and a decrypting method which can perform encrypting/decrypting process of another piece of data while the encrypting/decrypting process of a certain piece of data is performed.

Further, it is another object of the preferred embodiment of the present invention to perform encryption/decryption of the data having a higher priority prior to other data.

Further, it is another object of the preferred embodiment of the present invention to perform the confidentiality process and the integrity ensuring process in parallel at a high speed.

DISCLOSURE OF THE INVENTION

According to the present invention, an encrypting apparatus encrypting first processing data and second processing data includes:

a memory for storing status of encrypting process, and the encrypting apparatus starts encrypting process of the second processing data before encrypting process of the first processing data is completed, the encrypting apparatus makes the memory store the status of encrypting process of the first processing data when the encrypting apparatus starts encrypting process of the second processing data, the encrypting apparatus returns the status of the encrypting process of the encrypting apparatus to the status of the encrypting process of the first processing data stored in the memory when the encrypting apparatus restarts encrypting the first processing data, and the encrypting apparatus restarts encrypting process of the first processing data.

The encrypting apparatus restarts encrypting process of the first processing data before encrypting process of the second processing data is completed, the memory stores the status of encrypting process of the second processing data when the encrypting apparatus restarts encrypting process of the first processing data, the encrypting apparatus returns the status of the encrypting process of the encrypting apparatus to the status of the encrypting process of the second processing data stored in the memory when the encrypting apparatus restarts encrypting process of the second processing data, and the encrypting apparatus restarts encrypting process of the second processing data.

The first processing data is first plaintext data and the second processing data is second plaintext data.

The encrypting apparatus starts encrypting process of the second processing data by an interrupt.

An encrypting apparatus encrypting plaintext data M including plaintext block data $M_i$ (i=1, 2, 3, . . . ) and plaintext data N including plaintext block data $N_j$ (j=1, 2, 3, . . . ), the encrypting apparatus includes:

a mechanism for receiving a request to encrypt the plaintext data N during encrypting process of the plaintext data M;

an encrypting unit for encrypting the plaintext block data $M_1$ to output ciphertext block data $C_1$;

a feedback loop for feeding back the ciphertext block data $C_1$ output from the encrypting unit to the encrypting unit through a feedback line;

a memory, provided in parallel with the feedback line of the feedback loop, for receiving a request to encrypt the plaintext data N and stores the ciphertext block data $C_1$ fed back when the plaintext block data $M_{1+1}$ is not encrypted subsequent to the plaintext block data $M_1$ so that the encryption process of any of the plaintext block data of the plaintext data N is started; and a selector for selecting and supplying the ciphertext block data $C_1$ fed back from the feedback line of the feedback loop to the feedback loop in case that the plaintext block data $M_{1+1}$ is encrypted subsequent to the plaintext block data $M_1$, and for selecting and supplying the ciphertext block data $C_1$ stored in the memory to the feedback loop in case that the plaintext block data $M_{1+1}$ is not encrypted subsequent to the plaintext block data $M_1$ and the plaintext block data $M_{1+1}$ is encrypted after any of the plaintext block data of the plaintext data N is encrypted.

The memory includes:

plural registers corresponding to plural pieces of plaintext data; and a switch for switching the plural registers corresponding to the plaintext data to be encrypted.

According to the present invention, an encrypting method includes the steps of:

encrypting plaintext block data $M_1$ (i=1, 2, 3, . . . ) of first plaintext data M using ciphertext block data $C_1$ (i=1, 2, 3, . . . ) output from an encrypting module;

storing ciphertext block data $C_1$ to be used for encrypting plaintext block data $M_{1+1}$ of the first plaintext data M in a memory during or after encrypting process of the plaintext block data $M_1$;

encrypting at least one plaintext block data of second plaintext data N after storing the ciphertext block data $C_1$ to be used for encrypting the plaintext block data $M_{1+1}$ in the memory; and encrypting the plaintext block data $M_{1+1}$ of the first plaintext data M by inputting the ciphertext block data $C_1$ to be used for the plaintext block data $M_{1+1}$ stored in the memory and using the encrypting module after encrypting the at least one plaintext block data of the second plaintext data N.

According to the present invention, an encrypting apparatus encrypting plaintext data including at least one plaintext block data into ciphertext data using an encrypting unit and generating a message authentication code (MAC) to ensure an integrity of the ciphertext data, the encrypting apparatus includes:

an encrypting unit, having a first feedback loop for feeding back ciphertext block data $C_1$ output by the encrypting unit to the encrypting unit when the plaintext block data is encrypted by the encrypting unit, for inputting the plaintext data, performing an encrypting process by feeding back the ciphertext block data $C_1$ through the first feedback loop, and outputting the ciphertext block data;

a message authentication code (MAC) generator, having a second feedback loop for feeding back a computed intermediate MAC result, for inputting the ciphertext block data whenever the ciphertext block data is output from the encrypting unit, processing data, feeding back the computed intermediate MAC result by the second feedback loop, and generating the MAC to ensure the integrity of the ciphertext data.

The encrypting unit and the MAC generator perform alternately the encrypting process and a MAC generating process by sharing one encrypting module and one feedback loop, and the one feedback loop includes:

a memory for respectively storing and outputting results of the encrypting process and the MAC generating process; and a selector for selecting alternately the results of the encrypting process and the MAC generating process from the memory to alternately perform the encrypting process and the MAC generating process.

According to the present invention, an encrypting method for encrypting plaintext data including at least one plaintext block data into ciphertext data using an encrypting unit and generating a message authentication code (MAC) to ensure an integrity of the ciphertext data, the encrypting method includes:

an encrypting step, including a first feedback step for feeding back ciphertext block data $C_1$ output from the encrypting unit when the encrypting unit encrypts plaintext block data, inputting the plaintext block data, performing an encrypting process by feeding back the ciphertext block data $C_1$ through a first feedback loop, and outputting a ciphertext block data; and a MAC generating step, including a second feedback step for feeding back a computed intermediate MAC result, inputting the ciphertext block data whenever the ciphertext block data is output from the encrypting step, processing data, feeding back the computed intermediate MAC result through the second feedback step, and generating the MAC to ensure the integrity of the ciphertext data.

According to the present invention, a decrypting apparatus decrypting first processing data and second processing data includes a memory for storing a status of a decrypting process, and wherein the decrypting apparatus starts the decrypting process of the second processing data before the decrypting process of the first processing data is completed, the decrypting apparatus makes the memory store the status of the decrypting process of the first processing data when the decrypting process of the second processing data is started, and the decrypting apparatus returns the status of the decrypting process of the decrypting apparatus to the status of the decrypting process of the first processing data stored in the memory when the decrypting process of the first processing data is restarted, and the decrypting apparatus restarts the decrypting process of the first processing data.

The decrypting apparatus restarts the decrypting process of the first processing data before the decrypting process of the second processing data is completed, the memory stores the decrypting status of the second processing data when the decrypting process of the first processing data is restarted, the decrypting apparatus returns the decrypting status of the decrypting apparatus to the decrypting status of the second processing data stored in the memory when the decrypting process of the second processing data is restarted, and the decrypting apparatus restarts the decrypting process of the second processing data.

The first processing data is first ciphertext data, and the second processing data is second ciphertext data.

The decrypting apparatus starts the decrypting process of a first block data of the second processing data by an interrupt.

According to the present invention, a decrypting apparatus decrypting ciphertext block data $C_1$ (i=1, 2, 3, . . . ) included in ciphertext data C and ciphertext block data $D_j$ (j=1, 2, 3, . . . ) included in ciphertext data D, the decrypting apparatus includes:

a mechanism for receiving a request to decrypt the ciphertext data D at an arbitrary timing during a decrypting process of the ciphertext data C;

a decrypting unit for performing the decrypting process of the ciphertext block data $C_1$ to output plaintext block data $M_1$;

a feedback loop for feeding back the ciphertext block data $C_1$ to be used for decrypting ciphertext block data $C_{1+1}$ to the decrypting unit through a feedback line;

a memory, provided in parallel with the feedback line of the feedback loop, for receiving the request to decrypt the ciphertext data D and storing the ciphertext block data $C_1$ fed back when the ciphertext block data $C_{1+1}$ is not decrypted subsequent to the ciphertext block data $C_1$ so that the decrypting process of any of ciphertext block data of the ciphertext data D is started; and a selector for selecting and supplying the ciphertext block data $C_1$ fed back from the feedback line of the feedback loop in case that the ciphertext block data $C_{1+1}$ is decrypted subsequent to the ciphertext bock data $C_1$, and for selecting and supplying the ciphertext block data $C_1$ stored in the memory in case that the ciphertext block data $C_{1+1}$ is not decrypted subsequent to the ciphertext block data $C_1$ and the ciphertext block data $C_{1-1}$ is decrypted after any of the ciphertext block data of the ciphertext data D is decrypted.

The memory includes:

plural registers corresponding to plural pieces of ciphertext data; and a switch switching registers corresponding to the ciphertext data to be decrypted.

According to the present invention, a decrypting method includes steps of:

decrypting ciphertext block data $C_1$ (i=1, 2, 3, . . . ) of first ciphertext data C using a decrypting module;

storing ciphertext block data $C_1$ to be used for decrypting ciphertext block data $C_{1+1}$ in a memory during or after decrypting the ciphertext block data $C_1$;

decrypting at least one ciphertext block data of a second ciphertext data D after storing the ciphertext block data $C_1$ to be used for decrypting the ciphertext block data $C_{1+1}$; and inputting the ciphertext block data $C_1$ to be used for decrypting the ciphertext block data $C_{1+1}$ stored in the memory after decrypting the at least one ciphertext block data of the ciphertext data D and decrypting the ciphertext block data $C_{1+1}$ of the first ciphertext data C using the decrypting module.

According to the present invention, a decrypting apparatus decrypting ciphertext data including at least one ciphertext block data into plaintext data, and generating a message authentication code (MAC) for ensuring an integrity of ciphertext data, the decrypting apparatus includes:

a decrypting unit, including a first feedback loop for feeding back module output block data $T_1$ generated at decrypting data by a decrypting module, for inputting the ciphertext block data, decrypting the ciphertext block data using the module output block data $T_1$ fed back through the first feedback loop, and outputting plaintext block data;

a MAC generator, including a second feedback loop for feeding back a computed intermediate MAC result, for inputting ciphertext block data identical to the ciphertext block data input to the decrypting unit, processing the data, outputting the computed intermediate MAC result, feeding back the computed intermediate MAC result through the second feedback loop, and generating the MAC for ensuring the integrity of ciphertext data.

The decrypting unit and the MAC generator share one decrypting module and one feedback loop and alternately perform a decrypting process and a MAC generating process, and the one feedback loop includes:

a memory storing and outputting results of the decrypting process and the MAC generating process; and a selector for alternately selecting the results of the decrypting process and the MAC generating process to output to the decrypting module for alternately performing the decrypting process and the MAC generating process.

According to the present invention, a decrypting method decrypting ciphertext data including at least one ciphertext block data into plaintext data and generating a message authentication code (MAC) for ensuring an integrity of the ciphertext data, the decrypting method includes:

a decrypting step including a first feedback step for feeding back module output block data $T_1$ generated at decrypting data by a decrypting module, inputting the ciphertext block data, decrypting the ciphertext block data using the module output block data $T_1$ fed back through the first feedback loop, and outputting plaintext block data;

a MAC generating step including a second feedback step for feeding back a computed intermediate MAC result, inputting ciphertext block data identical to the ciphertext block data input to the decrypting unit, processing the data, outputting the computed intermediate MAC result, feeding back the computed intermediate MAC result by the second feedback loop, and generating the MAC for ensuring the integrity of ciphertext data.

According to the present invention, an encrypting apparatus encrypting plaintext data M including plaintext block data $M_i$ (i=1, 2, 3, . . . ) and plaintext data N including plaintext block data $N_j$ (j=1, 2, 3, . . . ), the encrypting apparatus includes:

a mechanism for receiving a request to encrypt the plaintext data N during encrypting process of the plaintext data M before completion of the encrypting process of the plaintext data M;

an encrypting module for outputting encrypted data as module output block data $T_1$;

a feedback loop for feeding back the module output block data $T_1$ output from the encrypting module to the encrypting module through a feedback line;

a memory, provided in parallel with the feedback line of the feedback loop, for receiving the request to encrypt the plaintext data N, and storing the module output block data $T_1$ fed back when the plaintext block data $M_{i+1}$ is not encrypted subsequent to the plaintext block data $M_i$ so that an encrypting process of any plaintext block data of the plaintext data N is started; and a selector for selecting and supplying the module output block data $T_1$ fed back through the feedback line of the feed back loop to the feedback loop in case that the plaintext block data $M_{i+1}$ is encrypted subsequent to the plaintext block data $M_i$, and for selecting and supplying the module output block data $T_1$ stored in the memory to the feedback loop in case that the plaintext block data $M_{i+1}$ is not encrypted subsequent to the plaintext block data $M_i$ and the plaintext block data $M_{i+1}$ is encrypted after any of plaintext block data of the plaintext data N is encrypted.

The memory includes:

plural registers corresponding to plural pieces of plaintext data; and a switch switching registers corresponding to the plaintext data to be encrypted.

According to the present invention, an encrypting method includes steps of:

encrypting plaintext block data $M_i$ (i=1, 2, 3, . . . ) of first plaintext data M using module output block data $T_1$ (i=1, 2, 3, . . . ) output from an encrypting module;

storing the module output block data $T_1$ to be used for encrypting the plaintext block data $M_{i+1}$ of the fist plaintext data M during or after encrypting the plaintext block data $M_i$;

encrypting at least one plaintext block data of second plaintext data N after storing the module output block data $T_1$ to be used for encrypting the plaintext block data $M_{i-1}$; and inputting the module output block data $T_1$ to be used for encrypting the plaintext block data $M_{i+1}$ stored in the memory after encrypting the at least one plaintext block data of the second plaintext data N and encrypting the plaintext block data $M_i$ of the first plaintext data M using the encrypting module.

According to the present invention, an encrypting apparatus encrypting plaintext data including at least one plaintext block data and generating a message authentication code (MAC) for ensuring an integrity of ciphertext data, the encrypting apparatus includes:

an encrypting unit, having a first feedback loop for feeding back module output block data $T_1$ output from the encrypting module to the encrypting module when the plaintext block data is encrypted by the encrypting unit, for inputting the plaintext data, performing encrypting process by feeding back the module output block data $T_1$ through the first feedback loop, and outputting the ciphertext block data;

a MAC generator, having a second feedback loop for feeding back a computed intermediate MAC result, for inputting the ciphertext block data whenever the ciphertext block data is output from the encrypting unit, processing data, feeding back the computed intermediate MAC result through the second feedback loop, and generating the MAC to ensure the integrity of the ciphertext data.

The encrypting unit and the MAC generator share one encrypting module and one feedback loop to perform alternately the encrypting process and a MAC generating process, and the one feedback loop includes:

a memory for respectively storing and outputting results of the encrypting process and the MAC generating process; and a selector for selecting alternately the results of the encrypting process and the MAC generating process from the memory to alternately perform the encrypting process and the MAC generating process.

According to the present invention, an encrypting method for encrypting plaintext data including at least one plaintext block data into ciphertext data using an encrypting unit and generating a message authentication code (MAC) to ensure an integrity of the ciphertext data includes:

an encrypting step, having a first feedback step for feeding back module output block data $T_1$ output from an encrypting module when the plaintext block data is encrypted, for inputting the plaintext block data, performing an encrypting process by feeding back the module output block data $T_1$ through a first feedback loop, and outputting ciphertext block data; and a MAC generating step, having a second feedback step for feeding back a computed intermediate MAC result, for inputting the ciphertext block data whenever the ciphertext block data is output from the encrypting step, processing data, feeding back the computed intermediate MAC result through the second feedback step, and generating the MAC to ensure the integrity of the ciphertext data.

According to the present invention, a decrypting apparatus decrypting ciphertext data C including ciphertext block data $C_1$ (i=1, 2, 3, . . . ) and ciphertext data D including ciphertext block data $D_j$ (j=1, 2, 3, . . . ), the decrypting apparatus includes:

a mechanism for receiving a request to decrypt the ciphertext data D during a decrypting process of the ciphertext data C;

a decrypting module for outputting decrypted data as module output block data $T_1$;

a feedback loop for feeding back the module output block data $T_1$ output from the decrypting module to the decrypting module through a feedback line;

a memory, provided in parallel with the feedback line of the feedback loop, for receiving a request to decrypt the ciphertext data D and stores the module output block data $T_1$ fed back in case that the ciphertext block data $C_{1+1}$ is not decrypted subsequent to the ciphertext block data $C_1$ so that the decrypting process of any of the ciphertext block data of the ciphertext data D is started; and a selector for selecting and supplying the module output block data $T_1$ fed back through the feedback line of the feedback loop to the feedback loop in case that the ciphertext block data $C_{1+1}$ is decrypted subsequent to the ciphertext block data $C_1$, and for selecting and supplying the module output block data $T_1$ stored in the memory to supply to the feedback loop in case that the ciphertext block data $C_{1+1}$ is not decrypted subsequent to the ciphertext block data $C_1$ and the ciphertext block data $C_{1+1}$ is decrypted after any of the ciphertext block data of the ciphertext data D is decrypted.

The memory includes:

plural registers corresponding to plural ciphertext data; and a switch for switching the plural registers corresponding to the ciphertext data to be decrypted.

According to the present invention, a decrypting method includes steps of:

decrypting ciphertext block data $C_1$ (i=1, 2, 3, . . . ) of first ciphertext data C using module output block data $T_1$ (i=1, 2, 3, . . . ) output from a decrypting module;

storing module output block data $T_1$ to be used for decrypting ciphertext block data $C_{1+1}$ of the first ciphertext data C in a memory during or after a decrypting process of the ciphertext block data $C_1$;

decrypting at least one ciphertext block data of second ciphertext data D after storing the module output block data $T_1$ to be used for decrypting the ciphertext block data $C_{1+1}$ in the memory; and decrypting the ciphertext block data $C_{1+1}$ of the first ciphertext data C using the decrypting module by inputting the module output block data $T_1$ to be used for the ciphertext block data $C_{1+1}$ stored in the memory after decrypting the at least one ciphertext block data of the second ciphertext data D.

According to the present invention, a decrypting apparatus decrypting ciphertext data including at least one ciphertext block data into ciphertext data using a decrypting module and generating a message authentication code (MAC) to ensure an integrity of the ciphertext data, the decrypting apparatus includes;

a decrypting unit, having a first feedback loop for feeding back ciphertext block data $C_1$ output from the decrypting unit to the decrypting unit when the ciphertext block data is decrypted by the decrypting unit, for inputting the ciphertext data, performing a decrypting process by feeding back the module output block data $T_1$ through the first feedback loop, and outputting the ciphertext block data;

a message authentication code (MAC) generator having a second feedback loop for feeding back a computed intermediate MAC result, for inputting the ciphertext block data identical to the ciphertext block data input to the decrypting unit, processing data, feeding back the computed intermediate MAC result through the second feedback loop, and generating the MAC to ensure the integrity of the ciphertext data.

The decrypting unit and the MAC generator share one decrypting module and one feedback loop to perform alternately the decrypting process and a MAC generating process, and the one feedback loop includes:

a memory for respectively storing and outputting results of the decrypting process and the MAC generating process; and a selector for selecting alternately the results of the decrypting process and the MAC generating process from the memory to alternately perform the decrypting process and the MAC generating process.

According to the present invention, a decrypting method for decrypting ciphertext data including at least one ciphertext block data into plaintext data using a decrypting unit and generating a message authentication code (MAC) to ensure an integrity of the ciphertext data, the decrypting method includes:

a decrypting step, having a first feedback step for feeding back ciphertext block data $C_1$, for inputting the ciphertext block data, performing a decrypting process of the ciphertext block data $C_1$ fed back through the first feedback loop, and outputting plaintext block data; and a MAC generating step, having a second feedback step for feeding back a computed intermediate MAC result, for inputting the ciphertext block data identical to the ciphertext block data input to the decrypting step, processing data to output the computed intermediate MAC result, feeding back the computed intermediate MAC result through the second feedback step, and generating the MAC to ensure the integrity of the ciphertext data.

The encrypting process is performed using block cipher algorithm.

The decrypting process is performed using block cipher algorithm.

The memory stores an intermediate encrypting result of the first processing data and an encryption key to be used for encrypting the first processing data as the status of the encrypting process.

The memory stores an intermediate decrypting result of the second processing data and an encryption key to be used for decrypting the second processing data as the status of the decrypting process.

According to the present invention, an encrypting apparatus includes:

an encrypting unit for inputting data to encrypt and outputting encrypted data; and a message authentication code (MAC) generator for inputting the encrypted data output from the encrypting unit and generating a MAC for ensuring an integrity of the encrypted data, and the MAC generator starts generating the MAC before completion of encrypting the data by the encrypting unit.

According to the present invention, a decrypting apparatus includes:

a decrypting unit for inputting data to decrypt and outputting decrypted data; and a message authentication code (MAC) generator for inputting the decrypted data output from the decrypting unit and generating a MAC for ensuring an integrity of encrypted data, and the MAC generator starts generating the MAC before completion of decrypting the data by the decrypting unit.

According to the present invention, an encrypting method includes:

an encrypting step for inputting data to encrypt and outputting encrypted data; and a MAC generating step for inputting the encrypted data output from the encrypting step and generating a MAC for ensuring an integrity of the encrypted data, and the MAC generating step starts generating the MAC before completion of encrypting the data by the encrypting step.

According to the present invention, a decrypting method comprising:

a decrypting step for inputting data to decrypt and outputting decrypted data; and a MAC generating step for inputting the decrypted data output from the decrypting step and generating a MAC for ensuring an integrity of the encrypted data, and the MAC generating step starts generating the MAC before completion of decrypting the data by the decrypting step.

The present invention provides a program for having a computer execute processes of the encrypting apparatus and steps for the encrypting method. Further, the invention provides a computer readable storage medium storing the program.

The present invention provides a program for having a computer execute processes of the decrypting apparatus and steps for the decrypting method. Further, the invention provides a computer readable storage medium storing the program.

BEST MODE FOR CARRYING OUT THE INVENTION

Embodiment 1

Figure 1:
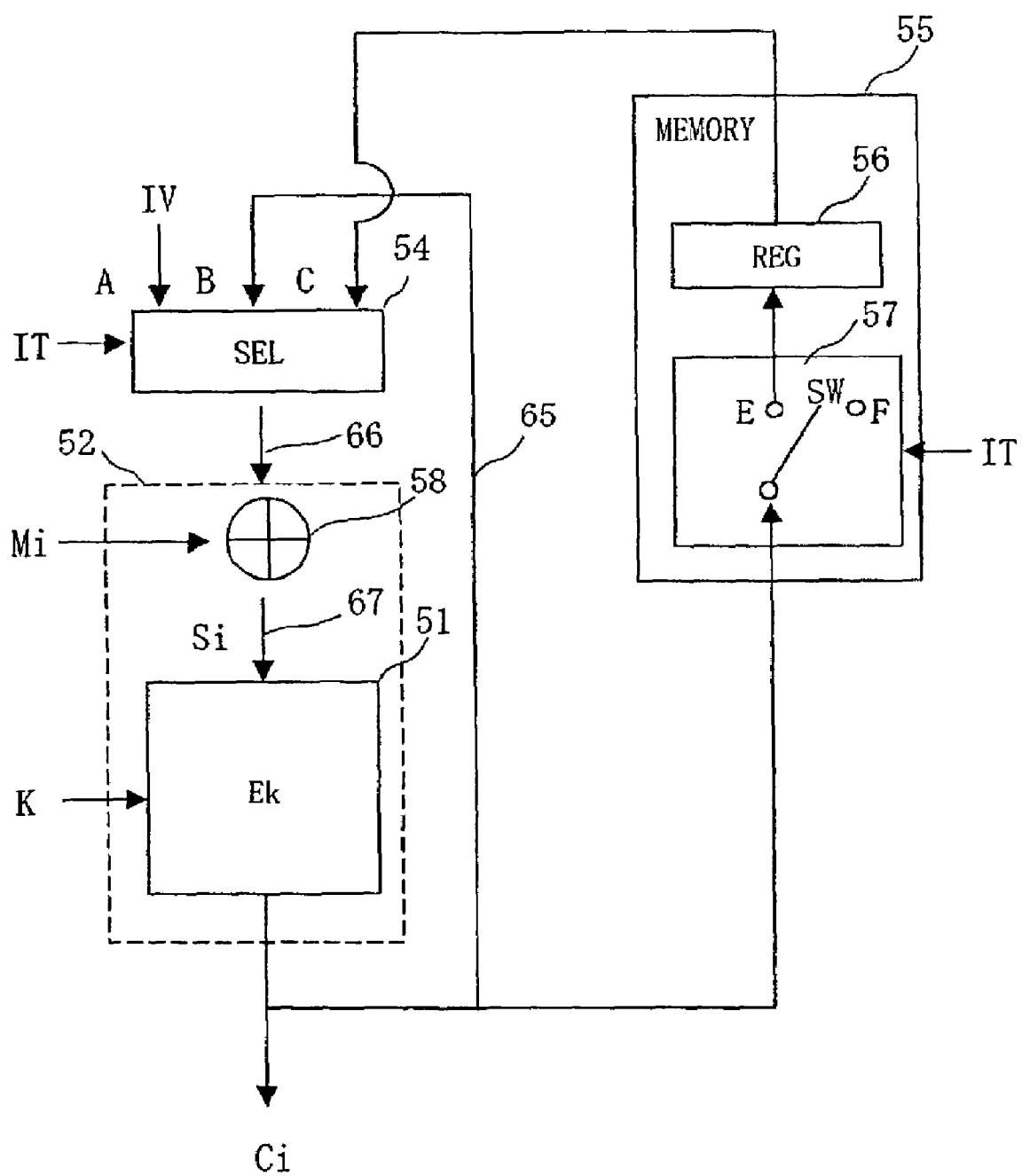
FIG. 1 shows an encryptor of the CBC mode according to the first embodiment.

FIG. 1 shows an encryptor of the CBC mode according to the present embodiment.

The encryptor of the present embodiment is configured by a selector 54, an XOR circuit 58, an encrypting module 51 using an encryption key K, and a memory 55. An encrypting unit 52 includes the XOR circuit 58 and the encrypting module 51 using the encryption key K. The selector 54 and the encrypting module 51 using the encryption key K form a feedback loop with feedback lines 65, 66, and 67. Ciphertext block data $C_1$ encrypted by the encrypting module 51 using the encryption key K is input to the XOR circuit 58 again through the feedback loop, and module input data $S_1$ is generated at the XOR circuit 58. Then, the module input data $S_1$ generated is supplied to the encrypting module 51 using the encryption key K.

The memory 55 is provided in parallel with the feedback line 65. The memory 55 includes a register 56 and a switch 57. The switch 57 switches inputting to the register 56 or ignoring an output of the encrypting module 51 using the encryption key K. This switching is performed by, for example, an interrupt IT. When the interrupt IT is generated, the switch 57 is connected to E, and when the interrupt is resolved, the switch 57 is connected to F. The register 56 inputs and stores the ciphertext block data $C_1$ supplied through E. The ciphertext block data $C_1$ is output to the selectors 54. The selector 54 is provided with three inputs A, B and C and selects one out of three. This selection is dependent on the interrupt IT.

Figure 2:
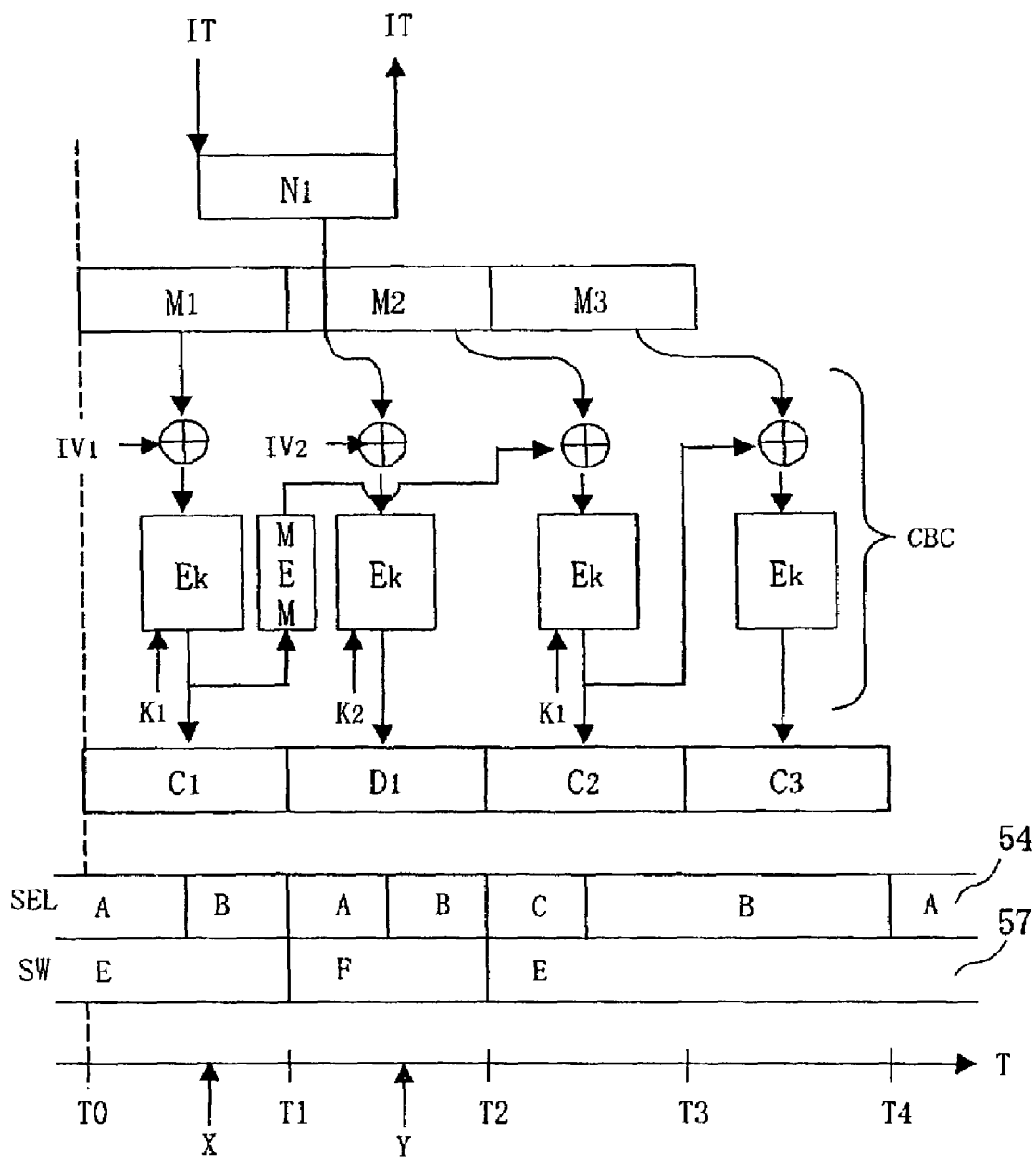
FIG. 2 shows an operation procedure of the encryptor of the CBC mode.

FIG. 2 shows an operation procedure of the encryptor shown in FIG. 1.

Figure 3:
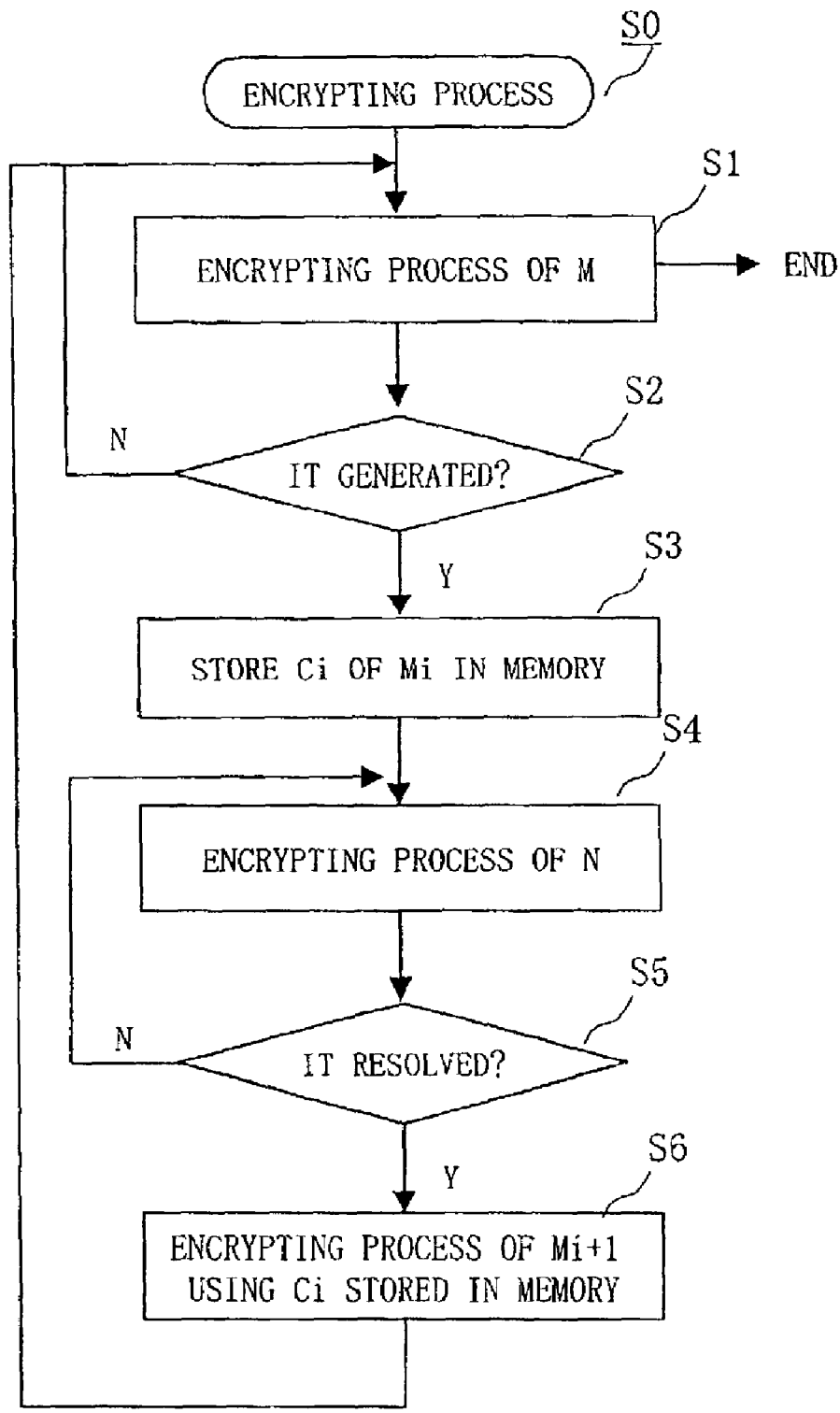
FIG. 3 is a flowchart showing an operation of the encryptor of the CBC mode.

FIG. 3 is a flowchart showing an operation of the encryptor shown in FIG. 1.

The input of the selector 54 is set to A when the electric power is supplied to the encryptor, and the switch 57 is connected to E. Further, when plaintext data N is requested to encrypt, an interrupt IT is generated. The interrupt IT keeps ON unless the request to encrypt the plaintext data N is resolved. Further, the plaintext data M is encrypted using the key $K_1$, and the plaintext data N is encrypted using the key $K_2$. When the interrupt IT is generated or the interrupt IT is resolved, the key $K_1$ or the key $K_2$ is supplied again to the encrypting module.

At the time of T0, the key $K_1$ is supplied, and the encrypting process of the plaintext data $M_1$ is started. When the encrypting process of the plaintext data $M_1$ is started at the time of T0, the input of the selector 54 is switched to B after the initial value IV is once input from the input A of the selector 54. Further, at the time of X during the plaintext data $M_1$ is being encrypted using the key $K_1$, it is assumed an interrupt IT for requesting to encrypt the plaintext block data $N_1$ is generated. The ciphertext block data $C_1$ becomes to be stored in the memory 55 by the time of T1. Then, at the time of T1, the key $K_2$ is supplied to the encrypting module 51 due to the generation of the interrupt IT. Further, the selector 54 sets the input to A at the time of T1. The switch 57 is connected to F at the time of T1. After the time of T1, the plaintext block data $N_1$ is encrypted using the key $K_2$, and the ciphertext block data $D_1$ is output. At the time of Y, it is assumed the encryption of the plaintext block data $N_1$ is finished, and the interrupt IT is resolved. Due to the resolution of the interrupt IT, at the time of T2, the key $K_1$ is supplied to the encrypting module 51, the input of the selector 54 is switched to C, and the switch 57 is connected to E. By switching the selector 54 to C, the ciphertext block data $C_1$ stored in the memory 55 is input for encrypting the plaintext block data $M_2$, the plaintext block data $M_2$ is encrypted by the encrypting module using the key $K_1$, and the ciphertext block data $C_2$ is output. Before the time of T3, the input of the selector 54 is switched to B. In case of encrypting the plaintext block data $M_3$, the ciphertext block data $C_2$ is fed back from a feedback line 65 of a feedback loop and input, the plaintext block data $M_3$ is encrypted by the encrypting module using the key $K_1$, and the ciphertext block data $C_3$ is output.

When the same keys are used for encrypting the plaintext data M and the plaintext data N ($K_1=K_2$), it is sufficient to supply the key only once at the starting time of the encrypting process.

A whole operation will be explained referring to the flowchart of FIG. 3.

At step S1, the encrypting process of the plaintext data M is started and continued. When the final block data is finished to be processed, the encrypting process terminates. At step S2, an interrupt IT generated at an arbitrary timing is observed. When the interrupt IT is generated while the plaintext block data $M_1$ is processed, at step S3, the ciphertext block data $C_1$ which is being processed is stored in the register 56 of the memory 55. At step S4, the encrypting process of the plaintext data N, which is requested to be encrypted by the interrupt IT, is performed. This encrypting process of step S4 is continuously performed until the interrupt IT is released as shown in step S5. When the interrupt IT is released, at step S6, the plaintext block data $M_1$ is encrypted using the ciphertext block data $C_1$ stored in the register 56 of the memory 55. Afterwards, the process returns to step S1, and the encrypting process will be continued.

Figure 4:
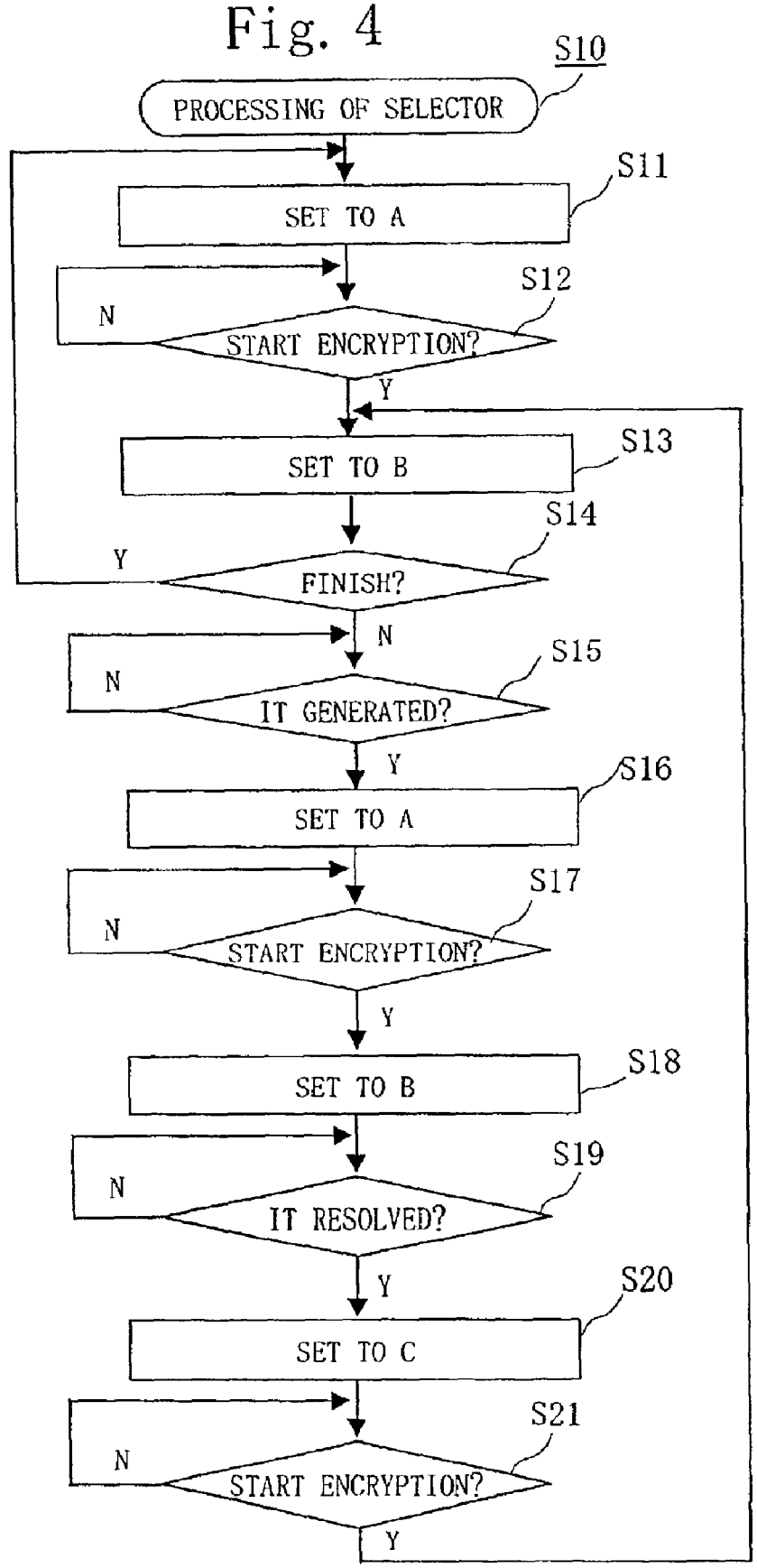
FIG. 4 is a flowchart showing an operation of a selector 54.

FIG. 4 shows an operation of the selector 54.

When the electric power is turned ON, the input is set to A as shown at step S11. When the encrypting process starts at step S12, the input is set to B at step S13. Namely, the ciphertext block data $C_1$ fed back from the feedback line 65 of the feedback loop is used. At step S14, if it is detected the block data which is being processed is the final data, the process returns to step S11 in which the status is the same as the electric power is turned ON.

At step S15, if it is detected the interrupt IT is generated, the input is set to A at step S16, and if the encrypting process is started, the input is set to B at step S18. Until the interrupt IT is resolved, the input is kept to B. That is, the ciphertext block data $C_1$ fed back from the feedback line 65 of the feedback loop is used. At step S19, if it is detected the interrupt IT is resolved, the input is set to C at step S20. By setting the input to C, the ciphertext block data $C_1$ stored in the memory 55 is input. When the encrypting process using the input from C, the process returns to step S13 and the input is set to B.

As described above, the selector 54 can be switched based on the generation of the interrupt IT.

The encrypting process of the plaintext data M can be also started at an arbitrary time based on the generation of the interrupt IT.

Figure 5:
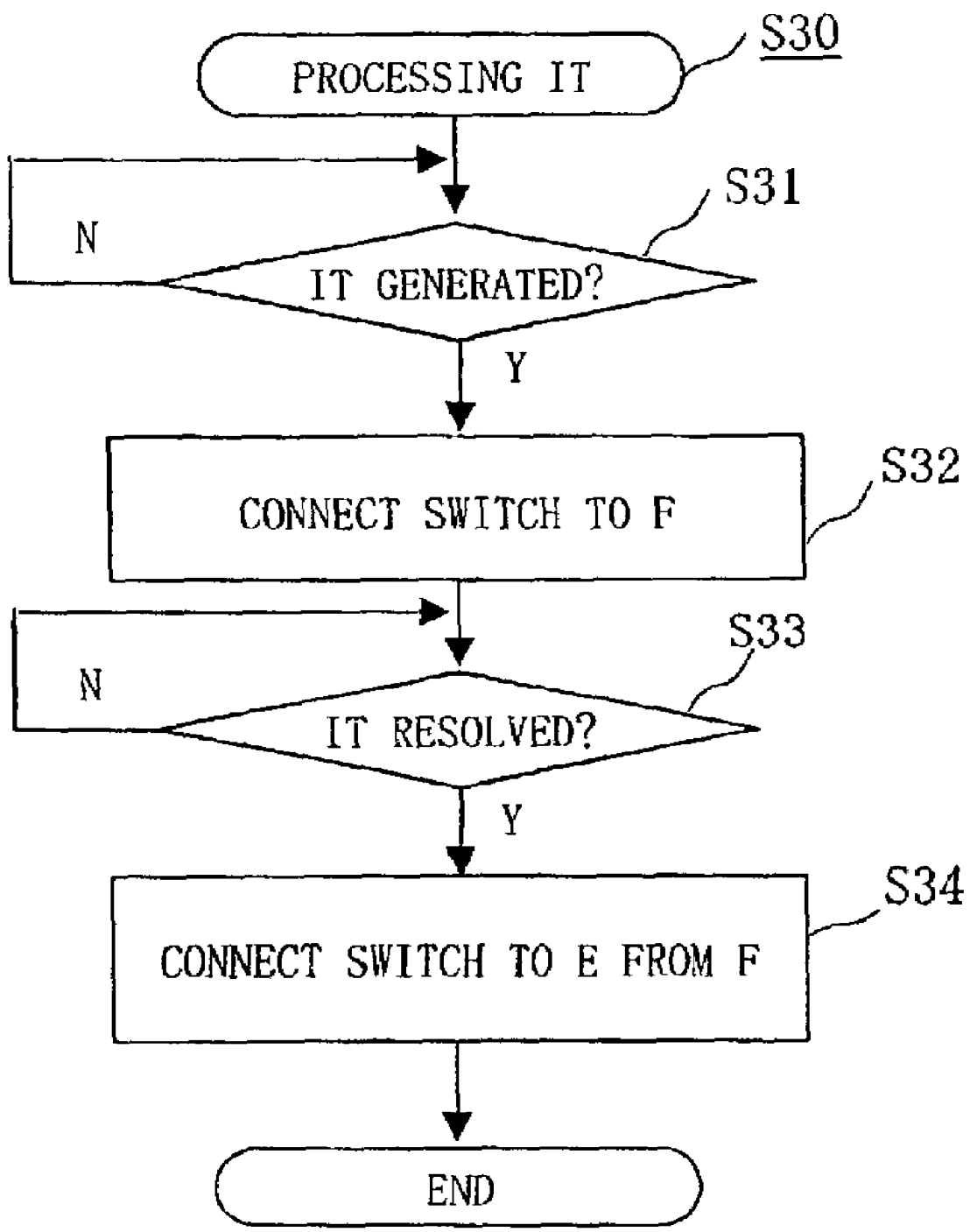
FIG. 5 is a flowchart showing an interrupting process of a switch 57.

FIG. 5 is a flowchart which shows processing the interrupt by the switch 57.

When the electric power is turned ON and in case of the encrypting process of the first plaintext thereafter, the switch 57 is connected to E. When the interrupt IT is generated at step S31, the switch 57 is switched from E to F. Then, at step S33, it is detected the interrupt IT is resolved, the switch 57 is switched from F to E. In this way, the switch 57 ignores the ciphertext block data $C_1$ from the generation to the resolution of the interrupt. Accordingly, the register 56 of the memory 55 holds the ciphertext block data $C_1$, which was generated at generating time of the interrupt IT.

As described above, the operations of the encryptor illustrated in FIGS. 1 through 5 show the interrupt processing mechanism which receives the request to encrypt the plaintext data N before completion of the encryption of the plaintext data M in the encryptor for encrypting the plaintext block data $M_i$ (i=1, 2, 3, . . . ) included in the plaintext data M and the plaintext block data $N_j$ (j=1, 2, 3, . . . ) included in the plaintext data N.

Further, the encryptor shown in FIGS. 1 through 5 includes the encrypting module 51 for encrypting the plaintext block data $M_1$ and outputting the ciphertext block data $C_1$, the feedback loop 65 and 66 for feeding the ciphertext block data $C_1$ output from the encrypting module 51 back to the encrypting unit 52 via the feedback line 65, and the memory 55, provided in parallel with the feedback line 65 of the feedback loop, for receiving the encryption request of the plaintext data N by the interrupt, and storing the ciphertext block data $C_1$ fed back if the plaintext block data $M_{i+1}$ is not encrypted subsequent to the plaintext block data $M_i$ by starting the encrypting process of any of the plaintext block data N.

Further, the encryptor shown in FIGS. 1 through 5 includes the selector 54 for selecting the ciphertext block data $C_1$, fed back by the feedback line 65 of the feedback loop, and supplying the ciphertext block data $C_1$ through the feedback loop when the plaintext block data $M_{i+1}$ is encrypted subsequent to the plaintext block data $M_i$, and for selecting the ciphertext block data $C_1$ stored in the memory 55 and supplying to the encrypting unit 52 through the feedback loop when the plaintext block data $M_{i+1}$ is not encrypted next to the plaintext block data $M_i$, and the any piece of the plaintext data N.

The memory 55 stores the status of the encryptor in case of the interrupt IT is generated. By storing the status of encrypting process, it becomes possible to return to the original status of encrypting a certain piece of data even if the encryption of another piece of data is performed during the certain piece of data is encrypted. Namely, by using the data stored in the memory, the status of the encryptor can return to the status which is completely identical to the status at the time when the encryption is interrupted, which enables to continue the interrupted encrypting process.

Figure 6:
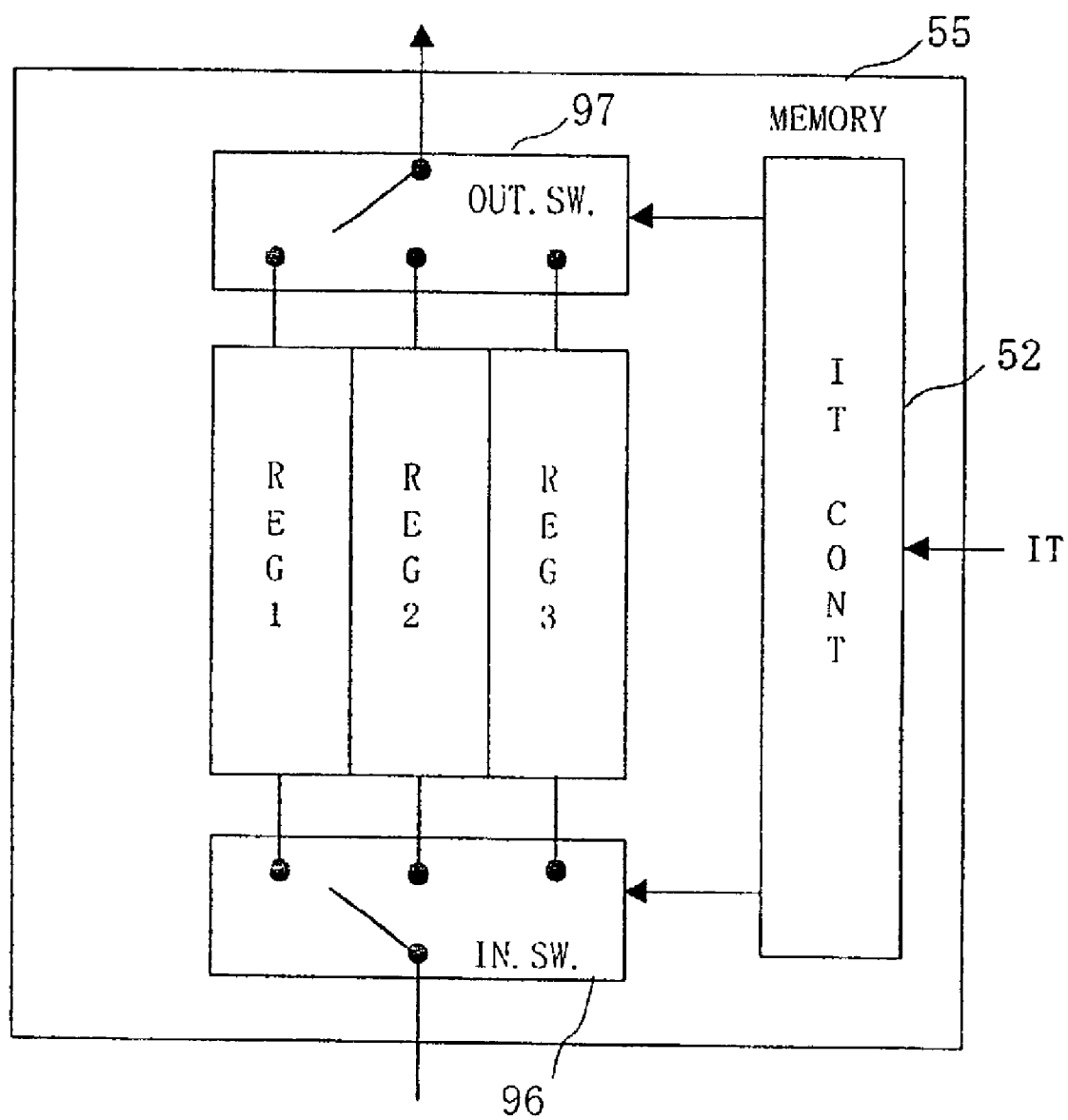
FIG. 6 shows another example of a memory 55.

FIG. 6 shows another configuration example of the memory 55.

The memory 55 includes an interrupt control unit 52, an input switch 96, an output switch 97, and plural registers (REG 1, 2, 3). By providing the plural registers in this way, it becomes possible to receive plural interrupts.

Figure 7:
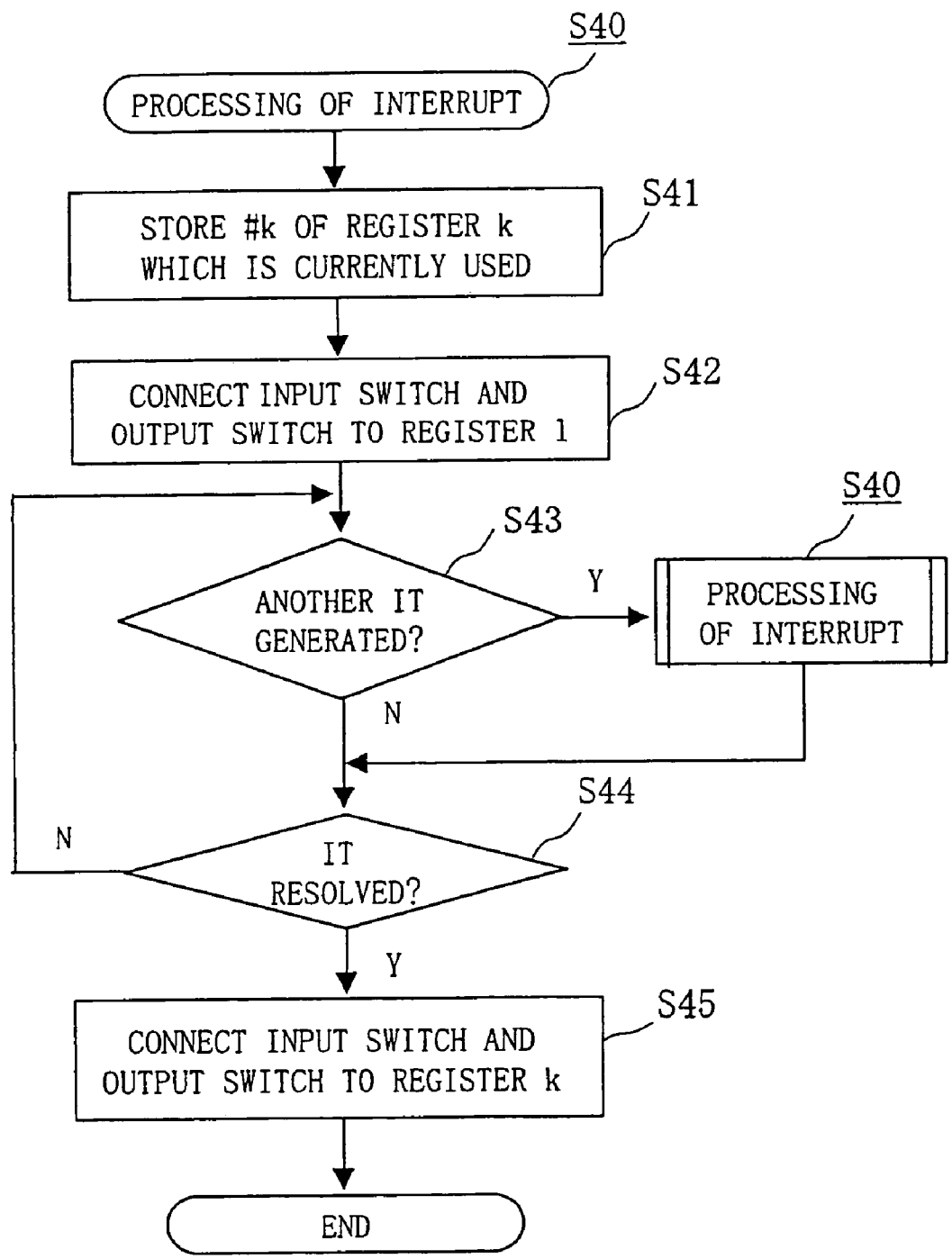
FIG. 7 is a flowchart showing an interrupting process of the memory 55.

FIG. 7 shows processing the interrupt performed by the memory 55.

When the interrupt IT is generated, at step S41, the number k, which is the number of the register k being currently used, is stored. At step S42, the input switch 96 and the output switch 97 are connected to the register 1, which is one of the registers except the register k. At this status, the encrypting process of the plaintext data N is performed. Further, it is observed if another interrupt is generated during the plaintext data N is encrypted. When it is detected another interrupt IT is generated at step S43, the step S40, which is the process for processing the interrupt, is called again. In this way, whenever the interrupt IT is generated, the step S40 is recursively called. Consequently, plural hierarchical processes for processing the interrupt can be performed. At step S44, it is checked if the interrupt is resolved. When the interrupt is resolved, the input switch 96 and the output switch 97 are switched to the register k using the number k stored in the memory. In case of FIG. 6, the memory 55 includes three registers, so that 3 layer hierarchical processes for processing the interrupt can be performed.

Figure 8:
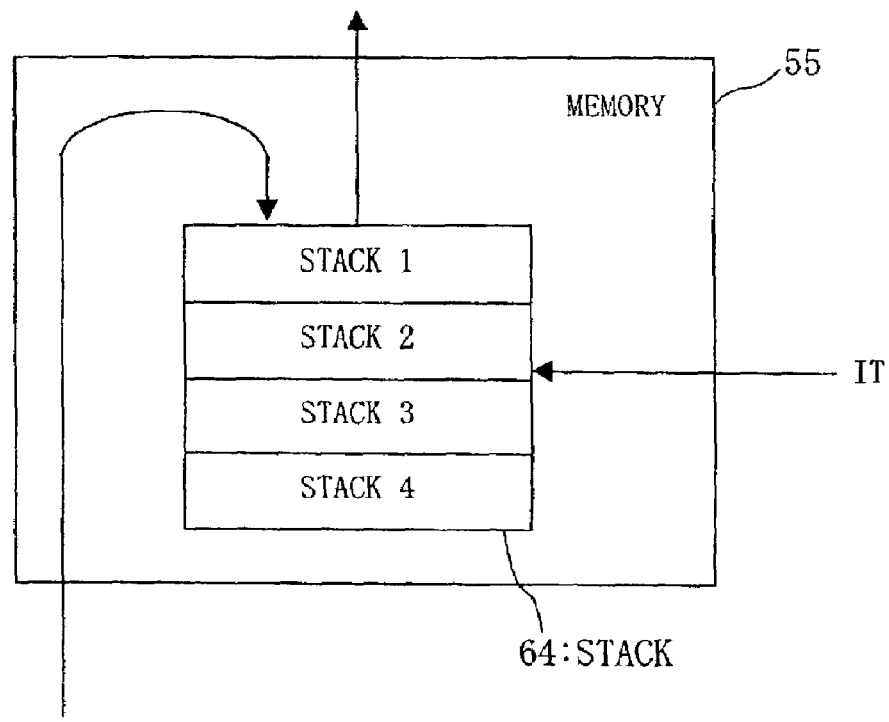
FIG. 8 shows another example of the memory 55.

FIG. 8 shows another configuration example of the memory 55.

The memory 55 includes a stack 64. The stack 64 is a register of first-in last-out (FILO). When the interrupt IT is generated during a stack 1 is used, the data stored in the stack 1 is transferred to a stack 2, and the data thereafter is stacked in the stack 1. When the interrupt IT is resolved, the stacked data in the stack 1 is output, and the data stored in the stack 2 is returned to the stack 1. FIG. 8 shows a case in which 4 layer hierarchical processes for processing the interrupt can be performed.

As shown in FIG. 6, when it is possible to perform plural hierarchical processes for processing the interrupt, a priority can be assigned to each of the interrupts. For example, a priority 1 is assigned to the interrupt IT1, and a priority 2, which means a lower priority than the priority 1, is assigned to the interrupt IT2. By assigning the priority in this way, it is possible to postpone the process for the priority 2 when the interrupt IT1 having the priority 1 is generated.

Figure 9:
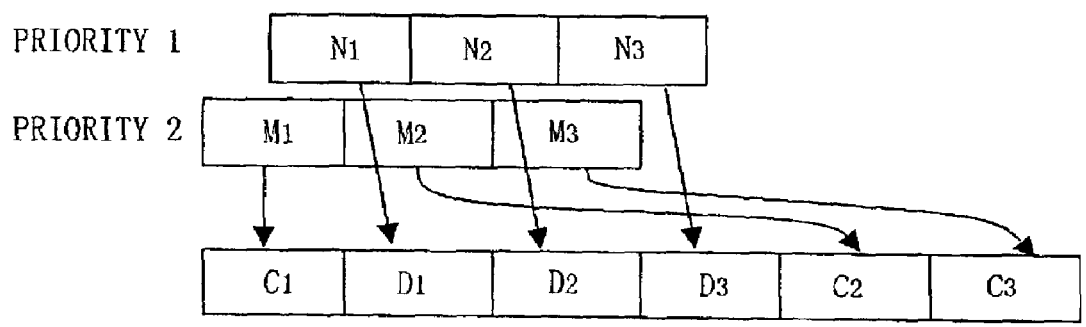
FIG. 9 shows a priority processing.

FIG. 9 shows a case in which the encrypting process having the priority 1 is performed prior to the encrypting process having the priority 2. In this case, the encrypting process having the priority 1 is finished first.

Figure 10:
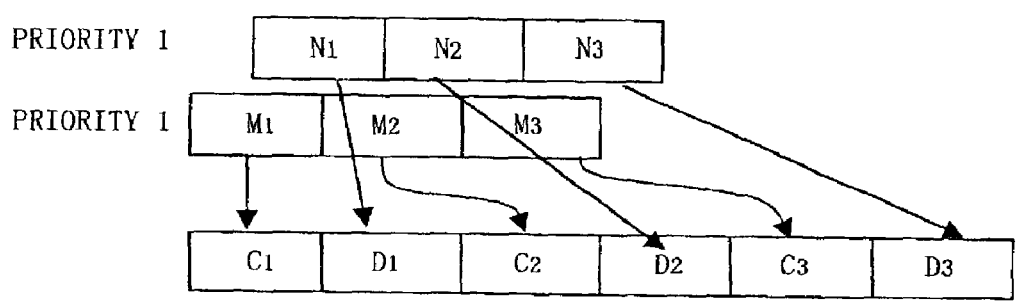
FIG. 10 shows another priority processing.

FIG. 10 shows a case in which both encrypting processes have the same priorities.

When the priorities are the same, each of the plaintext block data of the both encrypting processes is encrypted alternately.

Figure 11:
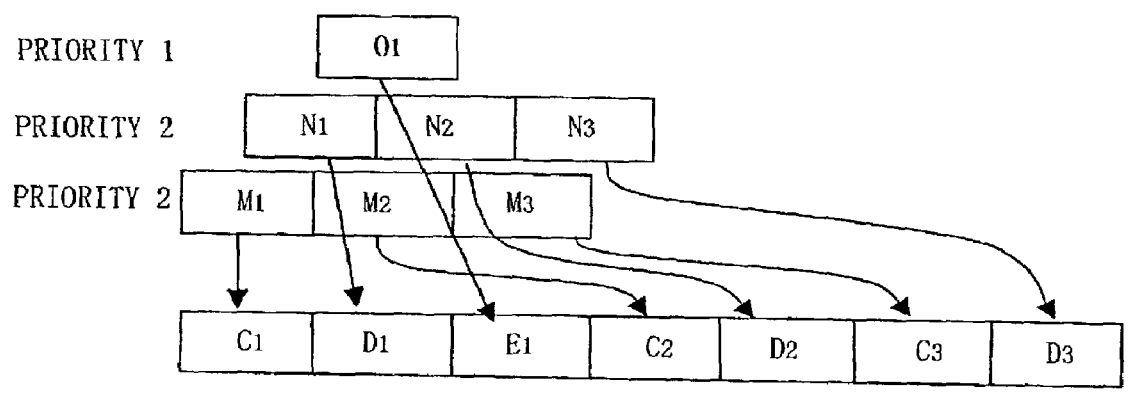
FIG. 11 shows another priority processing.

FIG. 11 shows a case in which data having the priority 1 and data having the priority 2 are encrypted.

By assigning the priority to each interrupt as shown in FIGS. 9 through 11, it is possible to perform the encrypting process which is desirable for the user. In case of processing data of an urgent matter or data with a short length, effective processing can be performed by assigning a higher priority to such data.

Figure 12:
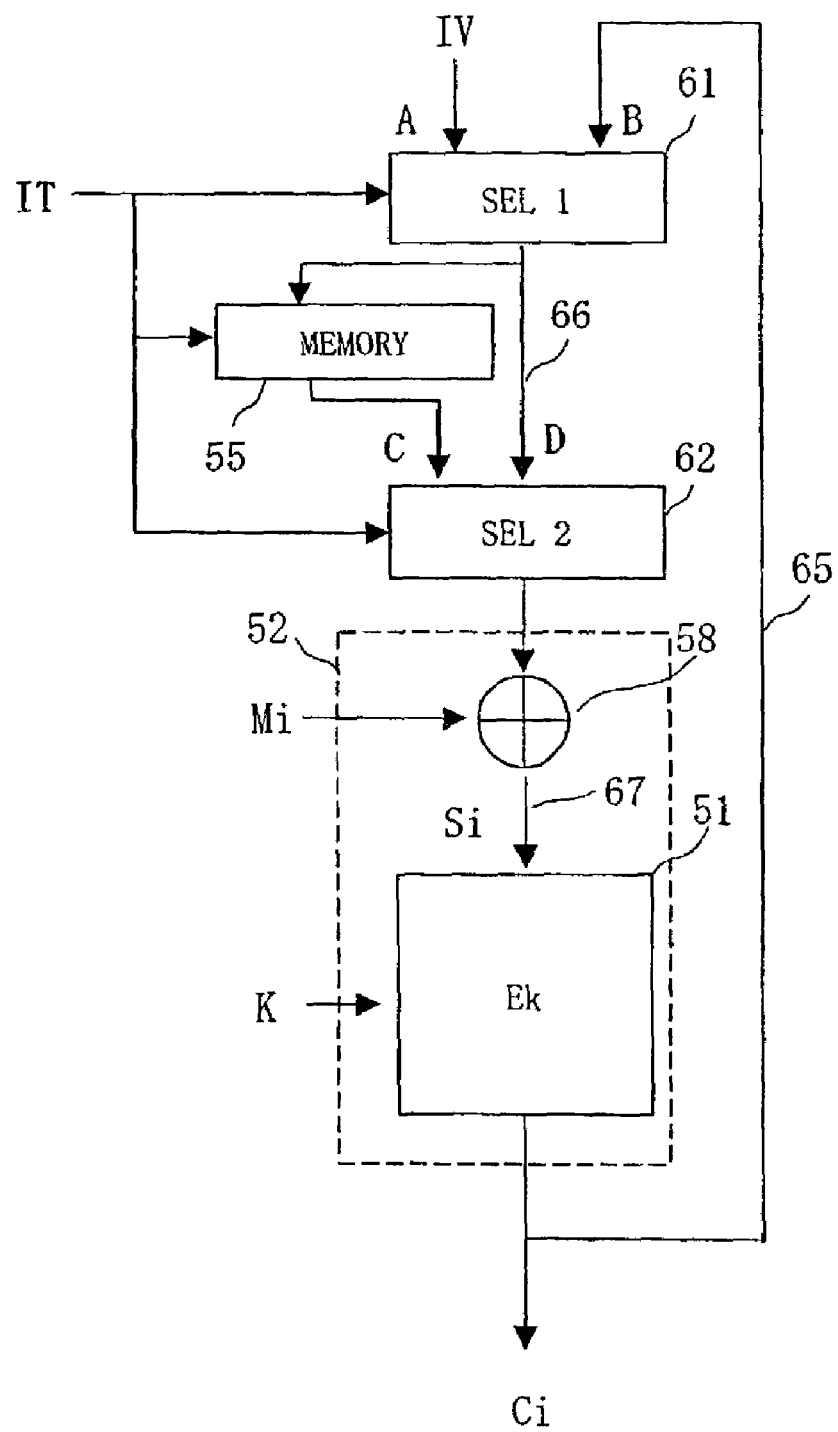
FIG. 12 shows a case in which the memory 55 is provided in parallel with a feedback line 66.

FIG. 12 shows a case in which the memory 55 is placed in parallel with the feedback line 66.

The XOR circuit 58 and the encrypting module 51 using the encryption key K constitute the encrypting unit 52.

Figure 13:
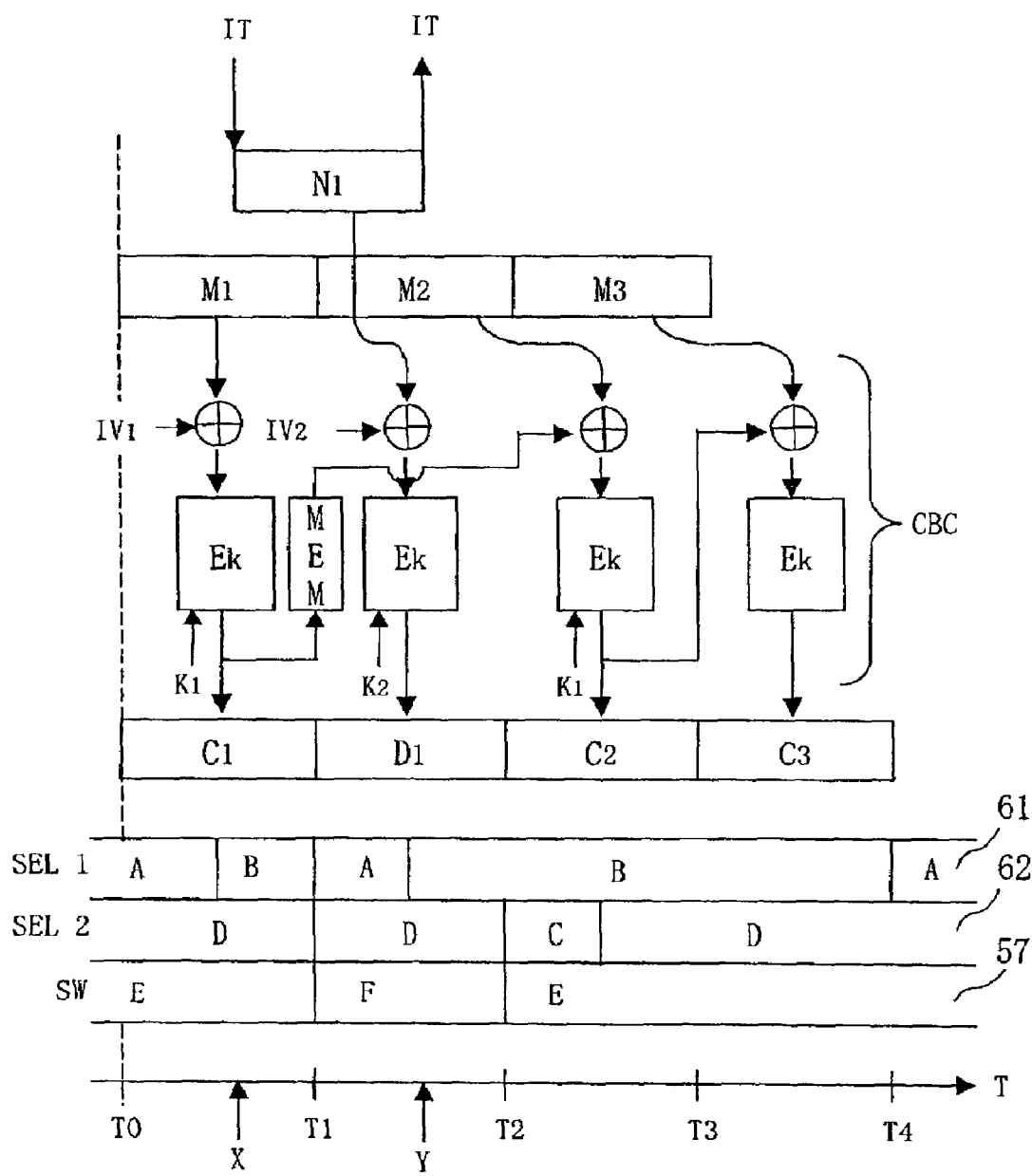
FIG. 13 shows an operation procedure of the encryptor of FIG. 12.

FIG. 13 shows an operation procedure of the encryptor of FIG. 12.

When the following connections are selected by the first selector 61 and the second selector 62, which enables these selectors to operate in the same manner as the selector 54 of FIG. 1. the first selector 61+the second selector 62=the selector 54

| | | | | |
|---|---|---|---|---|
| A | + | D | = | A |
| B | + | D | = | B |
| A | + | C | = | C |
| B | + | C | = | C |

In FIG. 13, when the second selector 62 selects D, the selection (A or B) of the first selector 61 becomes effective, and when the second selector 62 selects C, the contents of the memory 55 is output. Namely, the second selector 62 should select C if the contents of the memory 55 is desired to be used (when the encrypting process is returned from the plaintext data N to the plaintext data M due to the resolution of the interrupt IT).

Figure 14:
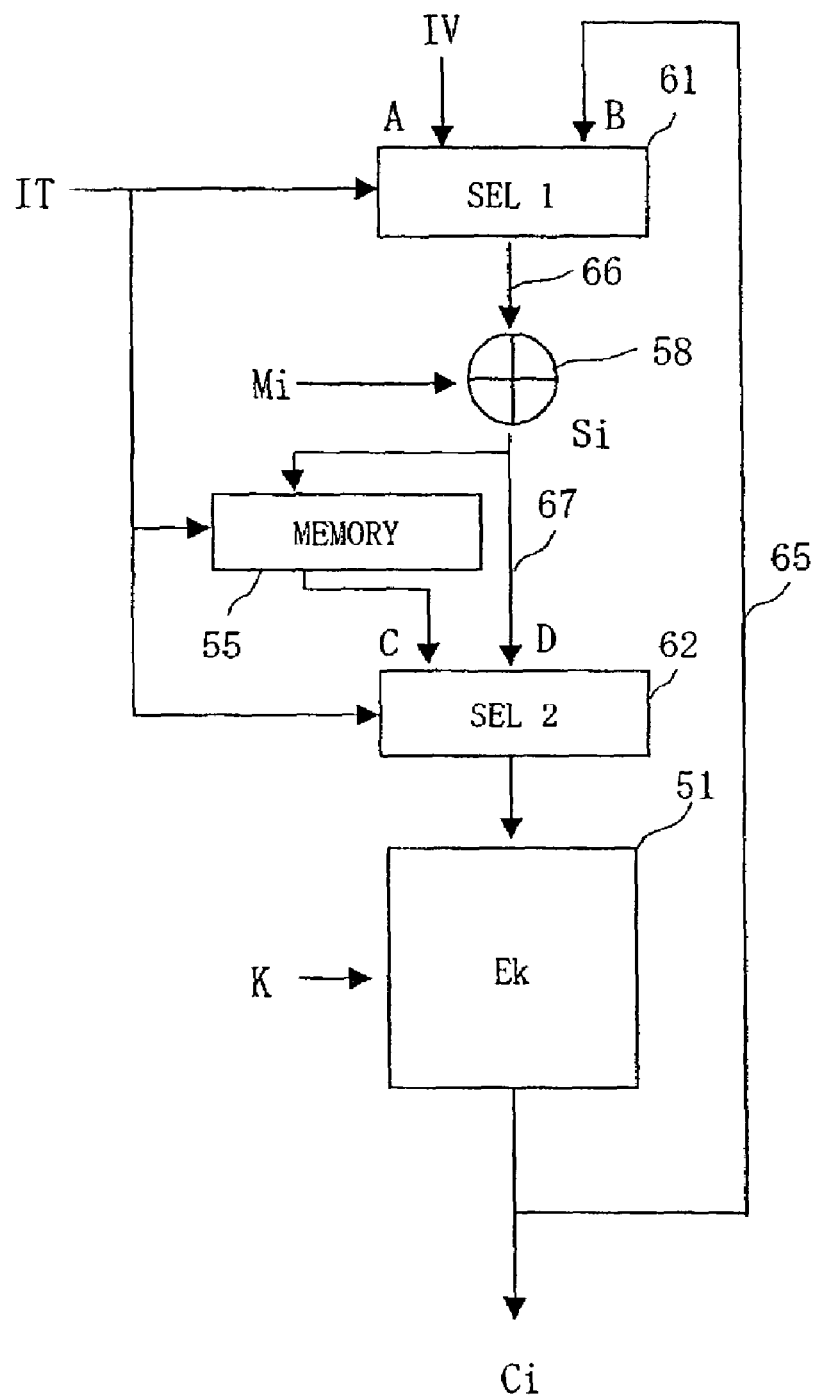
FIG. 14 shows a case in which the memory 55 is provided in parallel with a feedback line 67.

FIG. 14 shows a case in which the memory 55 is placed in parallel with the feedback line 67.

Figure 15:
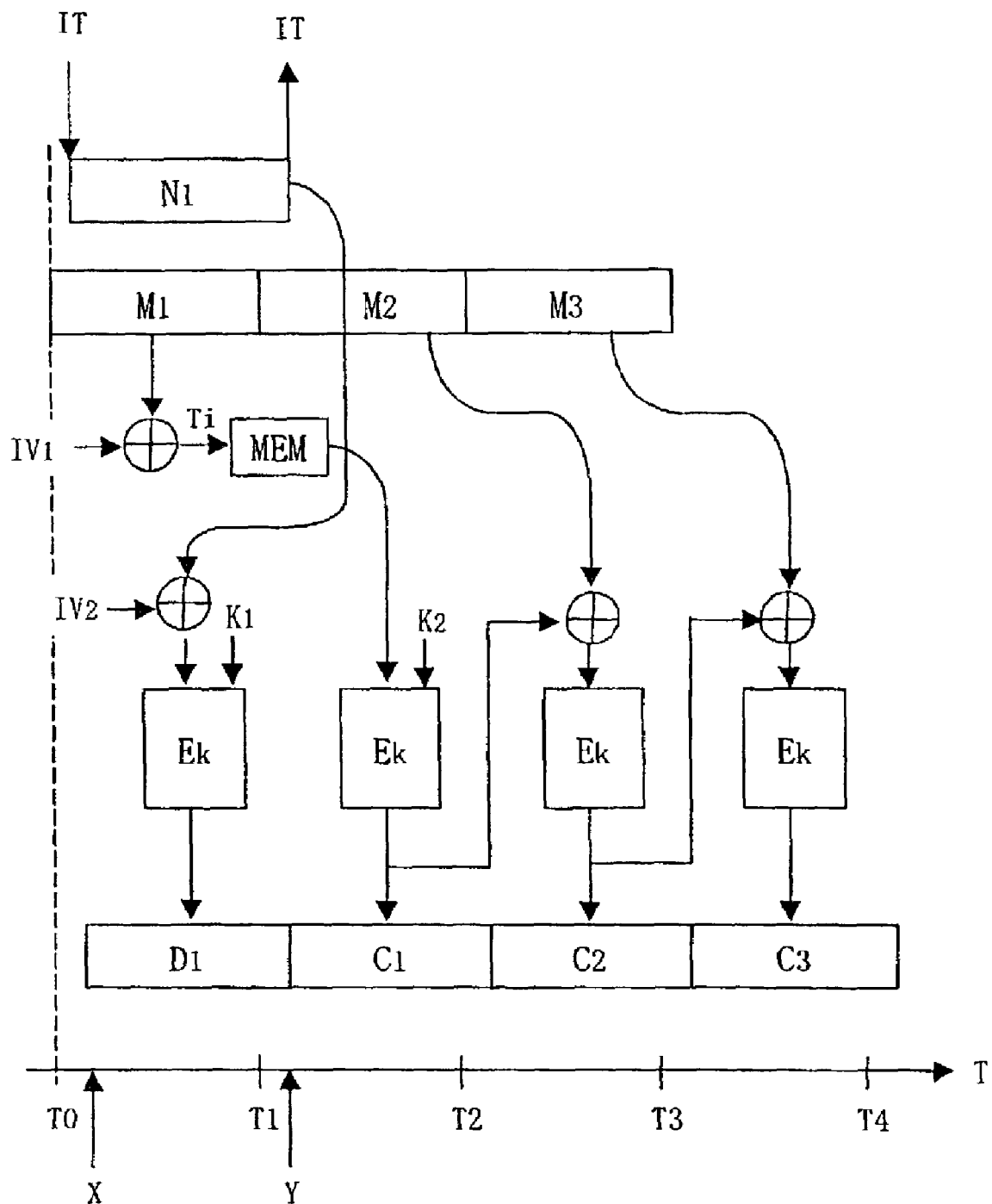
FIG. 15 shows an operation procedure of the encryptor of FIG. 14.

FIG. 15 shows an operation procedure of the encryptor of FIG. 14.

If the time X when the interrupt IT is generated is before XOR operation by the XOR circuit 58, the memory 55 stores the module input data $S_1$ XORed by the XOR circuit 58. Then, the plaintext block data $N_1$ is encrypted. Subsequent, the second selector 62 is made to select and input the module input data $S_1$ to the encrypting module 51 using the encryption key K, and encrypted to output the ciphertext block data $C_1$.

As shown in FIGS. 1, 12, and 14, the memory 55 can be placed in parallel with any one of the feedback line 65, the feedback line 66 and the feedback line 67. The memory 55 stores the status which is just before the encryptor starts encrypting another piece of data during encrypting a certain piece of data. The memory 55 can be placed at any place as long as the encryptor can return to the original status using the data stored in the memory 55 when the encryptor finishes encrypting the other data. Further, the memory 55 can be provided at plural locations.

As described above, the encryptor according to the present embodiment performs encrypting process of the first processing data (plaintext M) including at least one block data $M_i$ (i=1, 2, 3, . . . , m) and the second processing data (plaintext N) including at least one block data $N_j$ (j=1, 2, 3, . . . , n) and the encryptor includes the memory 55 for storing the status of encrypting process. The encryptor starts encrypting the first block data of the second processing data before encrypting all of the block data ($M_1$–$M_m$) of the first processing data. And at the time when the encryptor starts encrypting the first block data $N_1$ of the second processing data, the state of the encryption of the first processing data (for example, ciphertext block data $C_1$) is stored in the memory 55. When the encryptor restarts encrypting the first processing data, the status of the encryption of the encryptor is returned to the stored status of the encryption of the first processing data, and then the encryptor restarts processing encryption of the first processing data.

Further, the encryptor restarts encrypting the first processing data before completing the encryption of data of all blocks ($N_1$–$N_n$) of the second processing data, and simultaneously the memory 55 stores the status of the encryption of the second processing data (for example, ciphertext block data $D_j$) when the encryptor restarts encrypting the first processing data. When the encryptor restarts encrypting the second processing data, the status of the encryption of the encryptor is returned to the stored status of the encryption of the second processing data, and then the encryptor restarts encrypting the second processing data.

Figure 16:
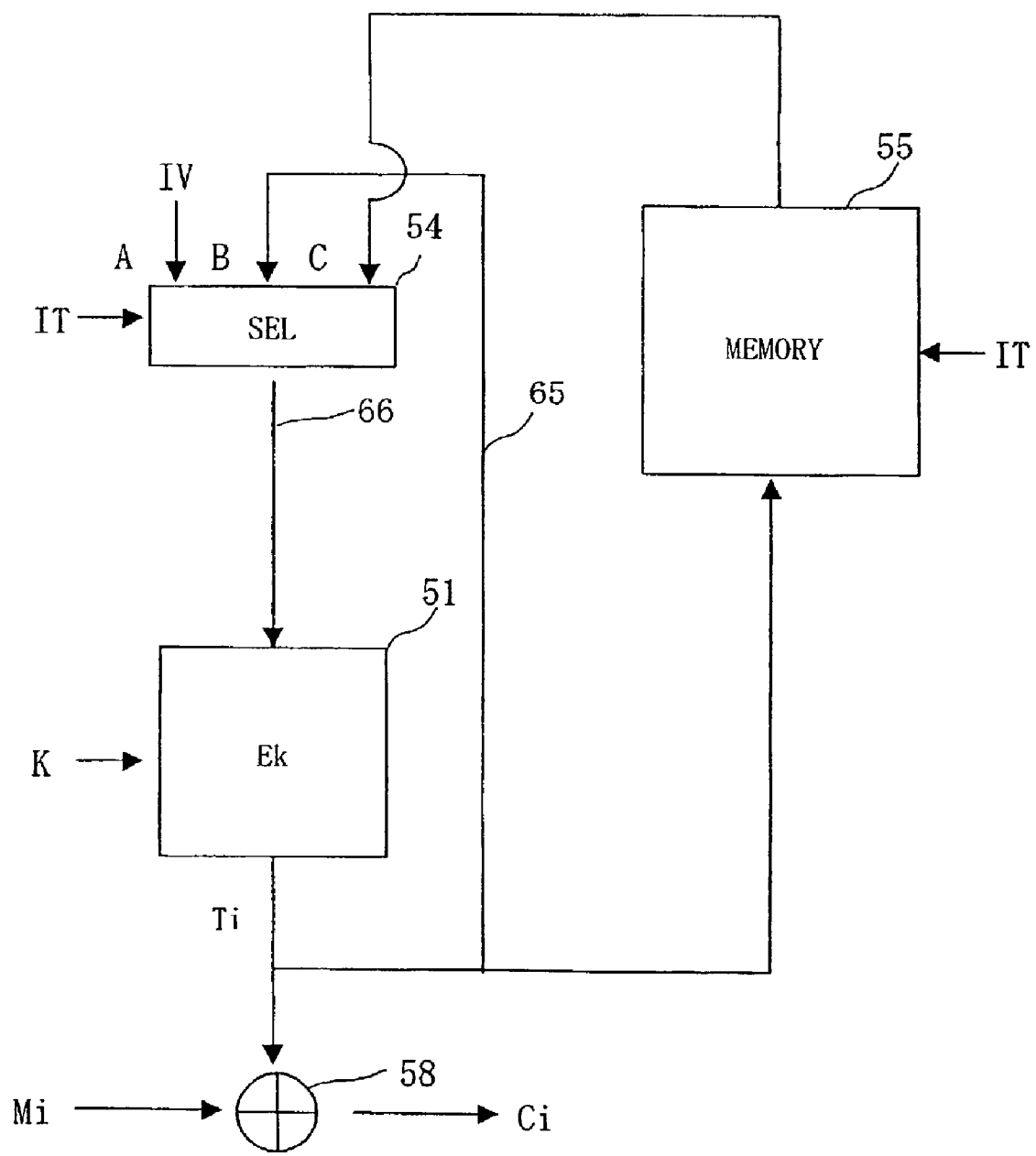
FIG. 16 shows an encryptor of the OFB mode.

FIG. 16 shows a configuration of the encryptor of the OFB mode.

The figure is characterized by additionally including the memory 55. The memory 55 stores module output data $T_1$ supplied from the encrypting module 51.

FIG. 16 shows an encryptor for encrypting plaintext block data $M_i$ (i=1, 2, 3, . . . ) included in the plaintext data M and plaintext block data $N_j$ (j=1, 2, 3, . . . ) included in the plaintext data N. The encryptor includes a processing mechanism of the interrupt that receives the request to encrypt the plaintext data N during the encryption of the plaintext data M before the completion of encrypting the plaintext data M and the encrypting module 51 for outputting encrypted data as the module output block data $T_1$. The encryptor further includes feedback loops 65 and 66 for feeding back the module output block data $T_1$ supplied from the encrypting module 51 to the encrypting module through the feedback line 65, and the memory 55 provided in parallel with the feedback line 65 of the feedback loop and for receiving a request to encrypt the plaintext data N and storing the module output block data $T_1$ fed back when the plaintext block data $M_{i-1}$ is not encrypted subsequent to the plaintext block data $M_i$ because the encryptor starts encrypting any plaintext block data of the plaintext data N. Yet further the encryptor includes the selector 54 which selects the module output block data $T_1$ fed back by the feedback line 65 of the feedback loop to supply to the encrypting module 51 through the feedback loop when the plaintext block data $M_i$ is encrypted subsequent to the plaintext block data $M_i$, and selects the module output block data $T_1$ stored in the memory 55 to supply to the encrypting module 51 through the feedback loop when the plaintext block data $M_{i+1}$ is not encrypted subsequent to the plaintext block data $M_i$ but after any plaintext block data of the plaintext data N.

Figure 17:
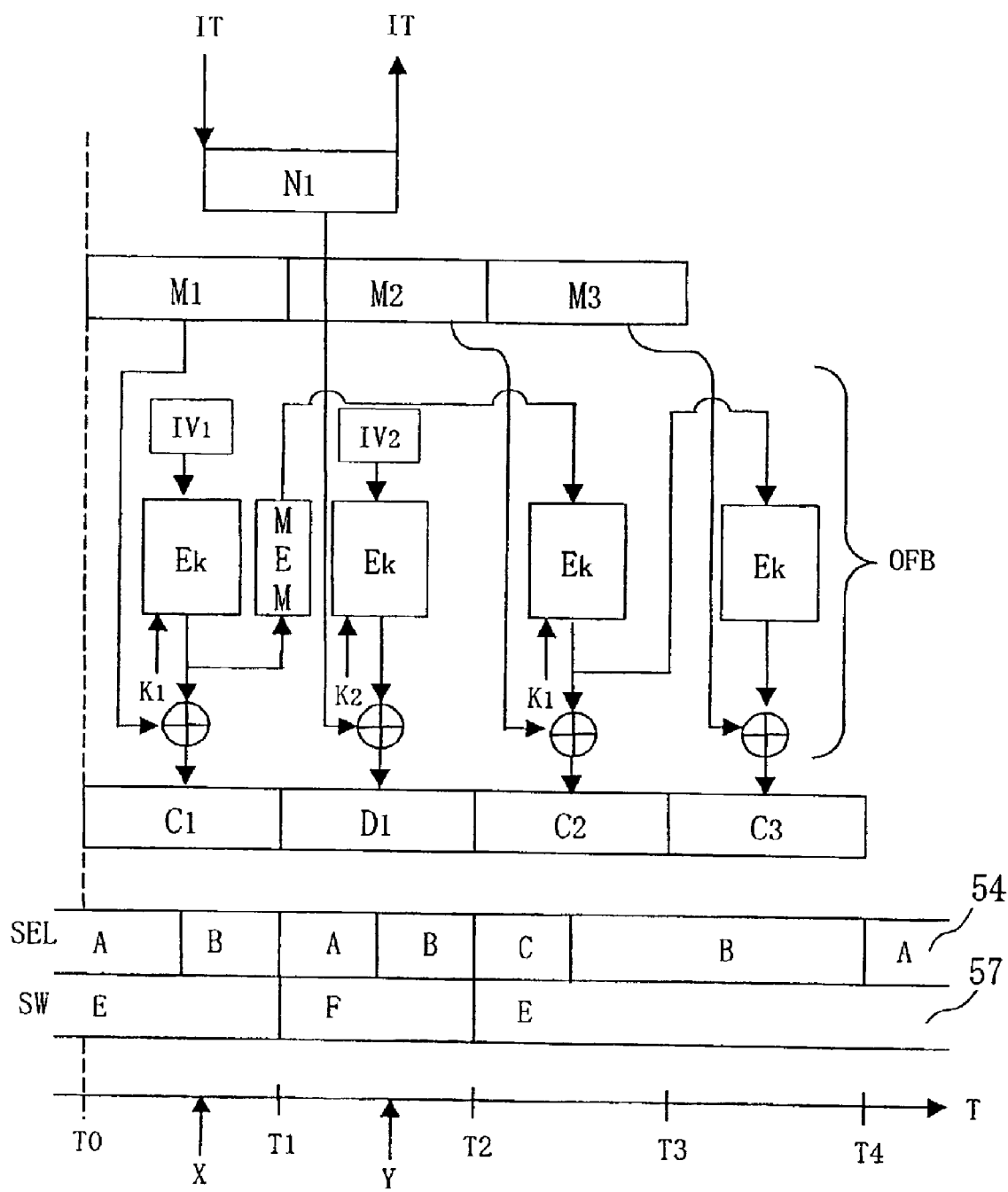
FIG. 17 shows an operation procedure of the encryptor of FIG. 16.

FIG. 17 explains the encryptor of the OFB mode shown in FIG. 16.

In FIG. 17, the operation of the CBC mode of FIG. 2 is changed to the operation of the OFB mode, and the other operations are the same to the one of FIG. 2.

Figure 18:
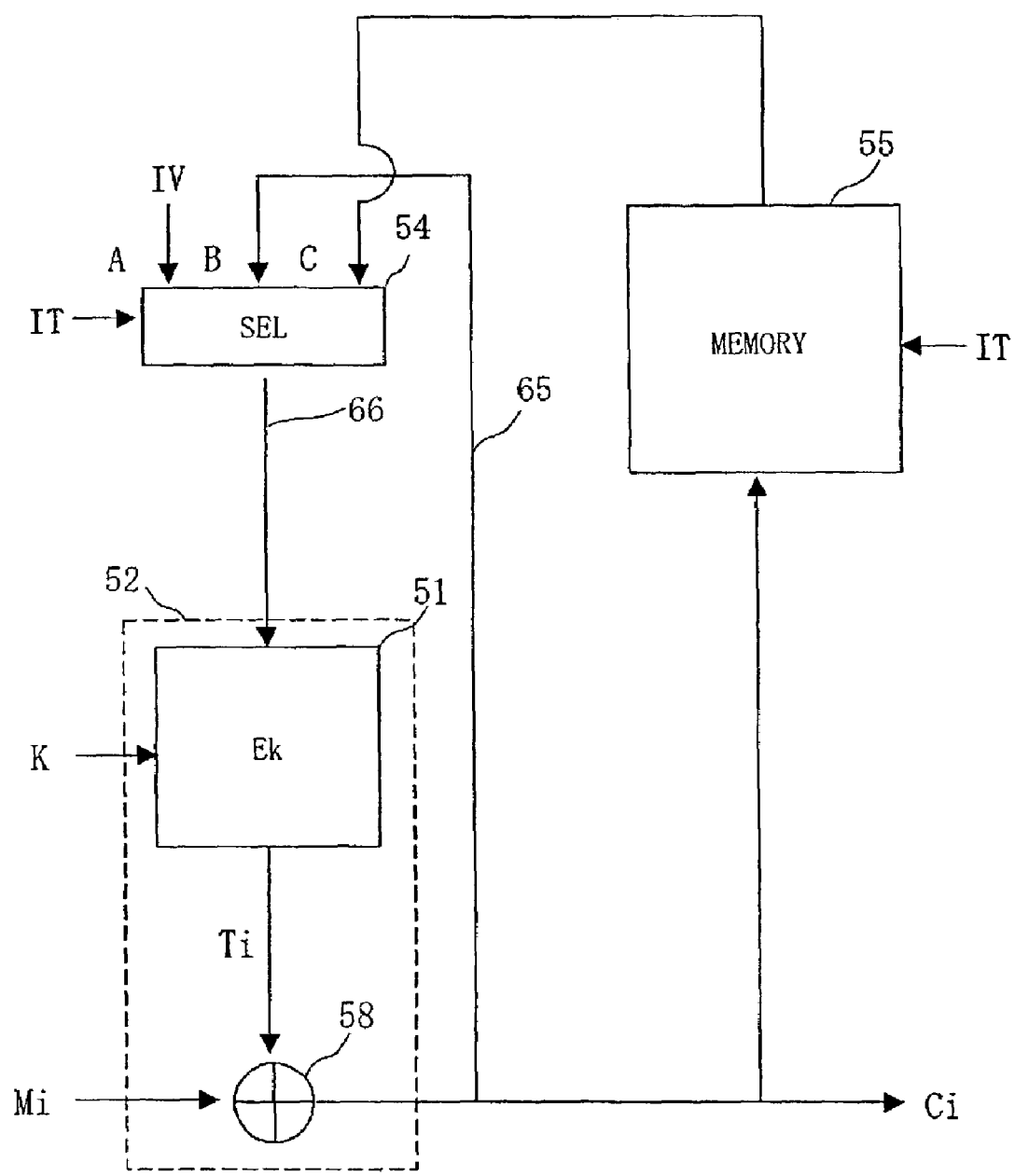
FIG. 18 shows an encryptor of the CFB mode.

FIG. 18 shows an encryptor of the CFB mode.

Figure 47:
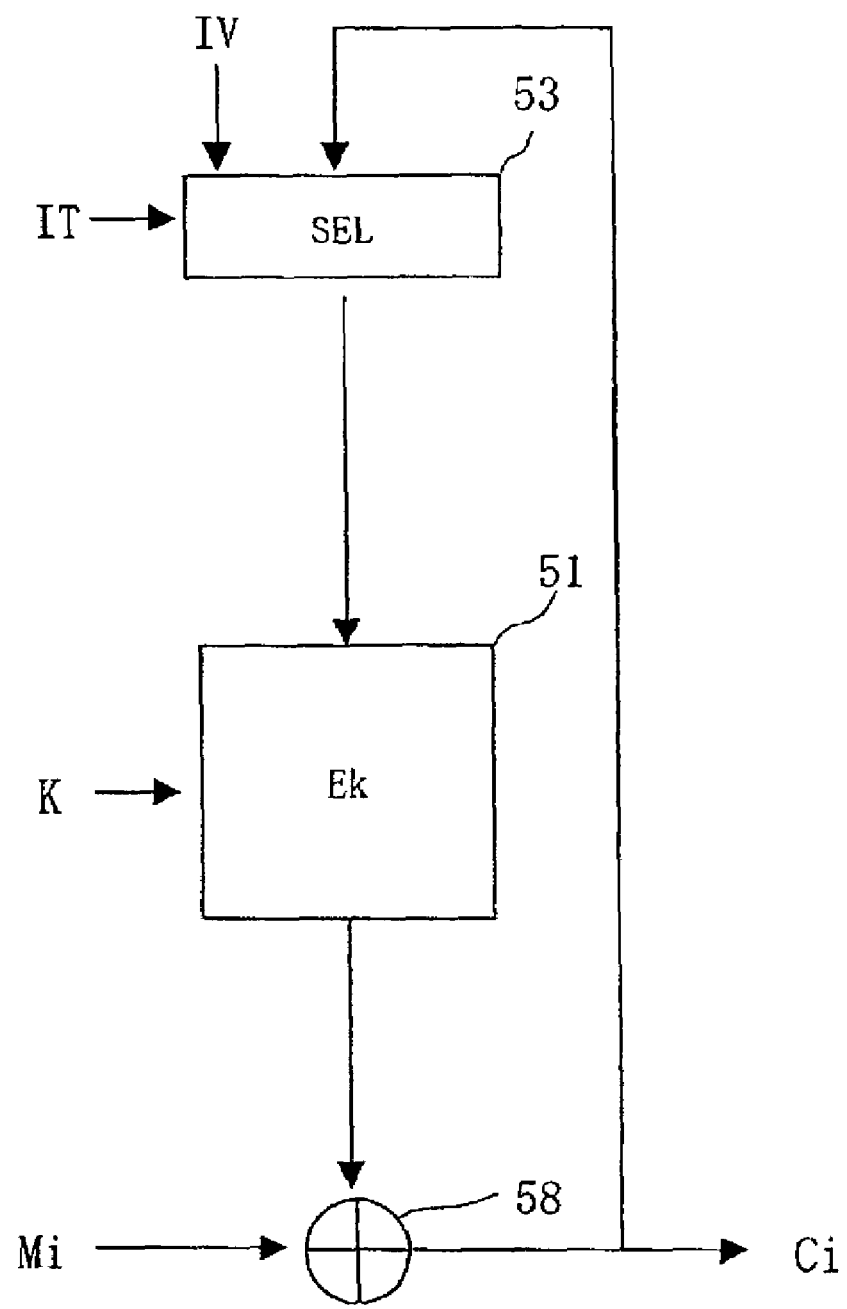
FIG. 47 shows a conventional encryptor of the CFB mode.
Figure 48:
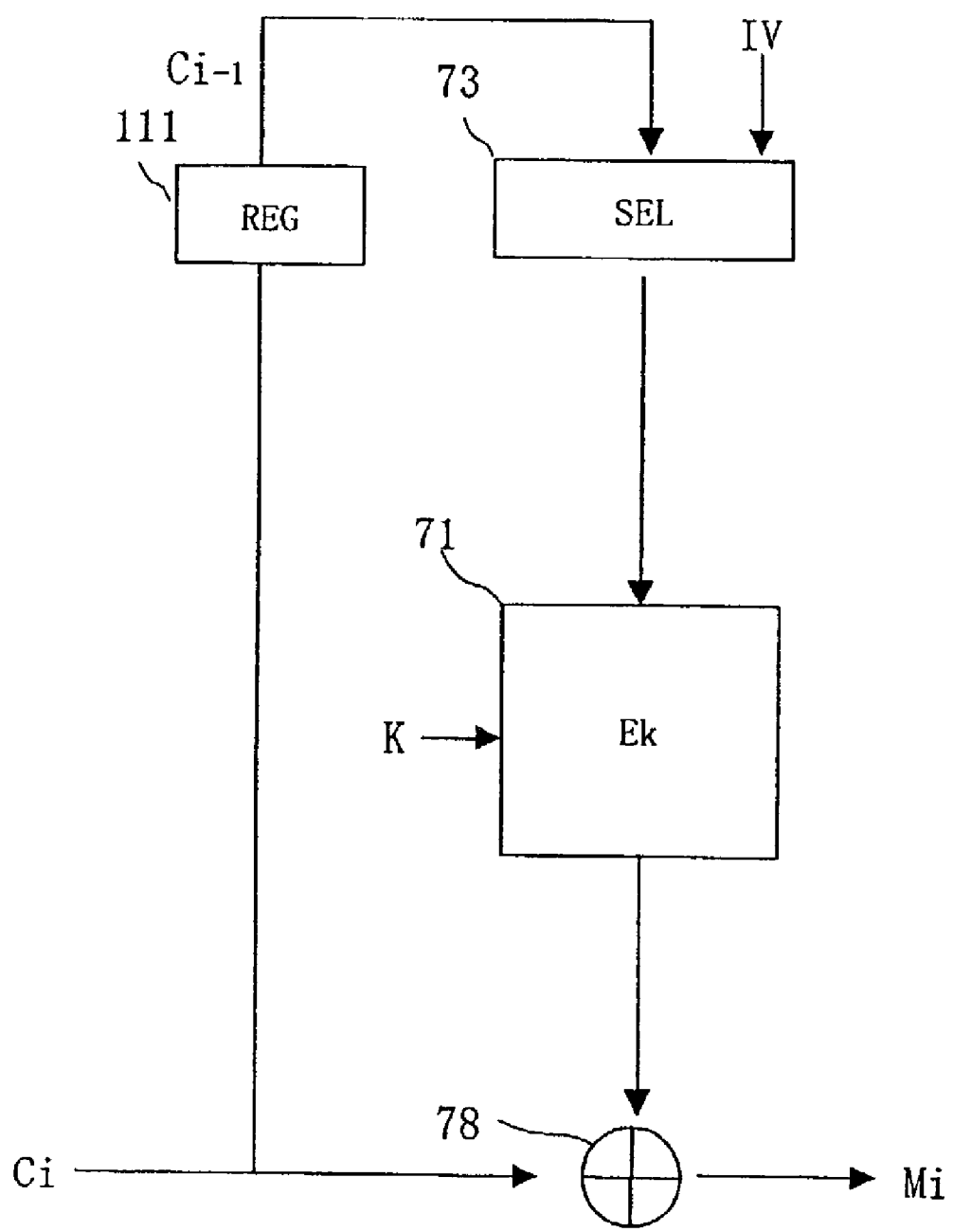
FIG. 48 shows a conventional decryptor of the CFB mode.
Figure 49:
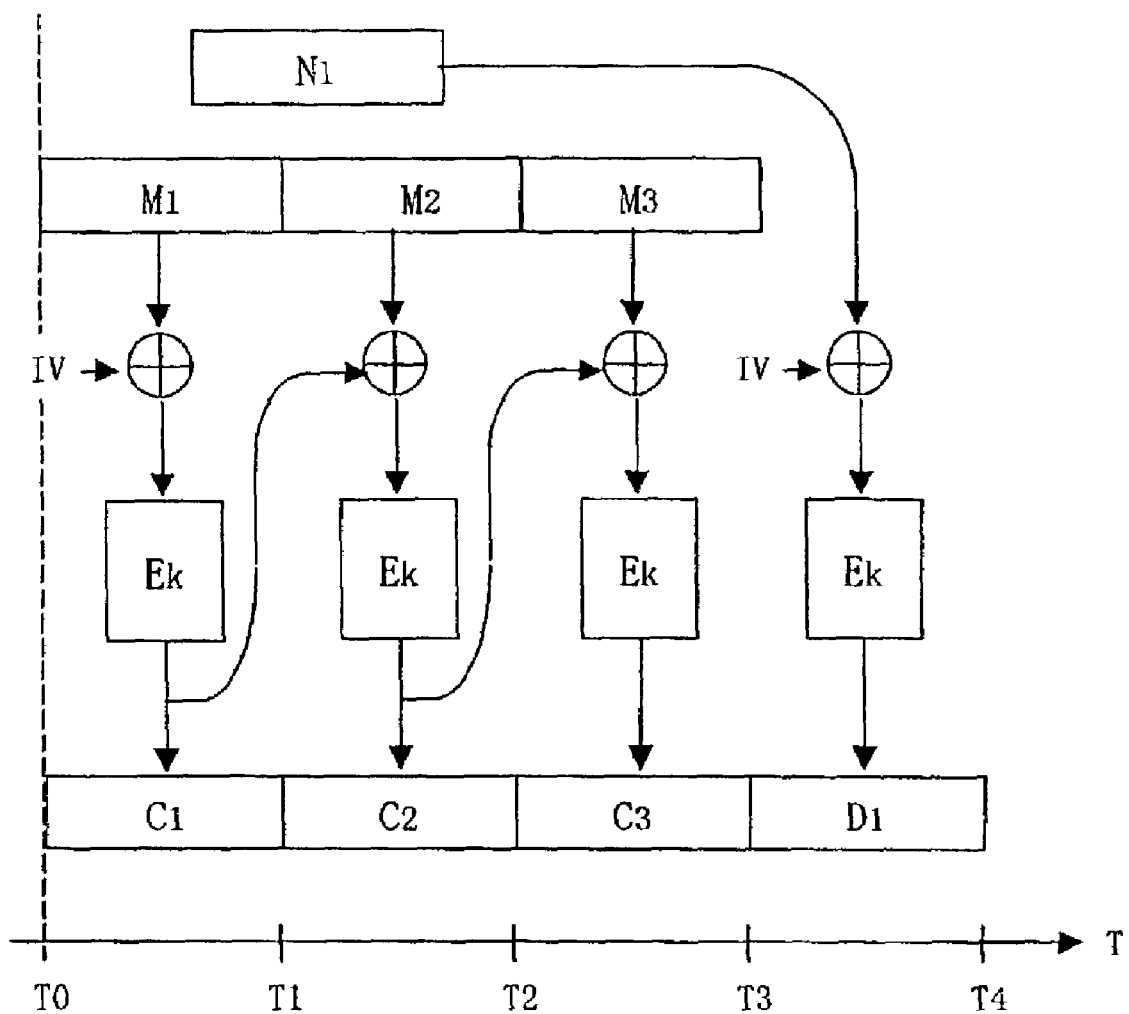
FIG. 49 shows a conventional encrypting procedure.
Figure 50:
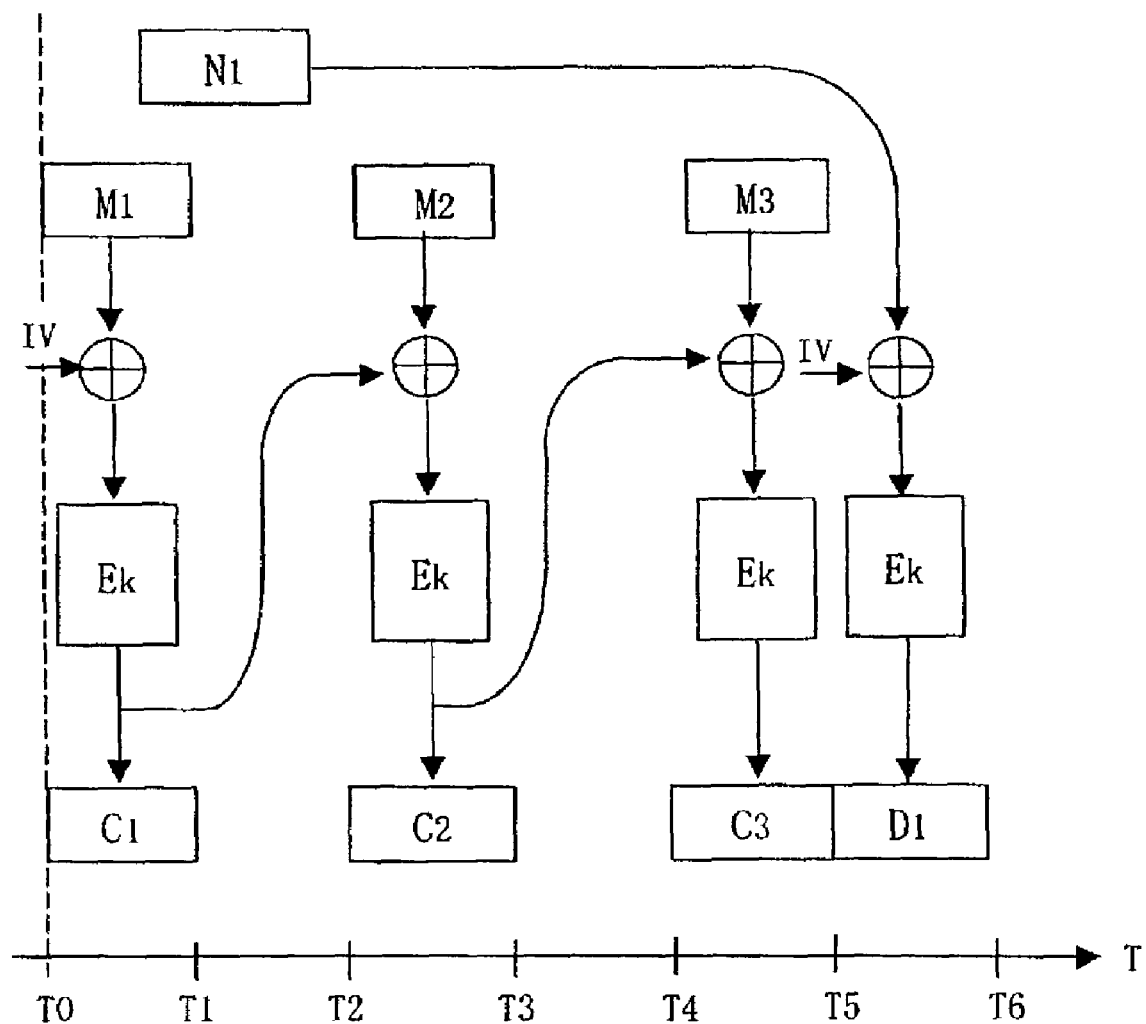
FIG. 50 shows a conventional encrypting procedure.
Figure 51:
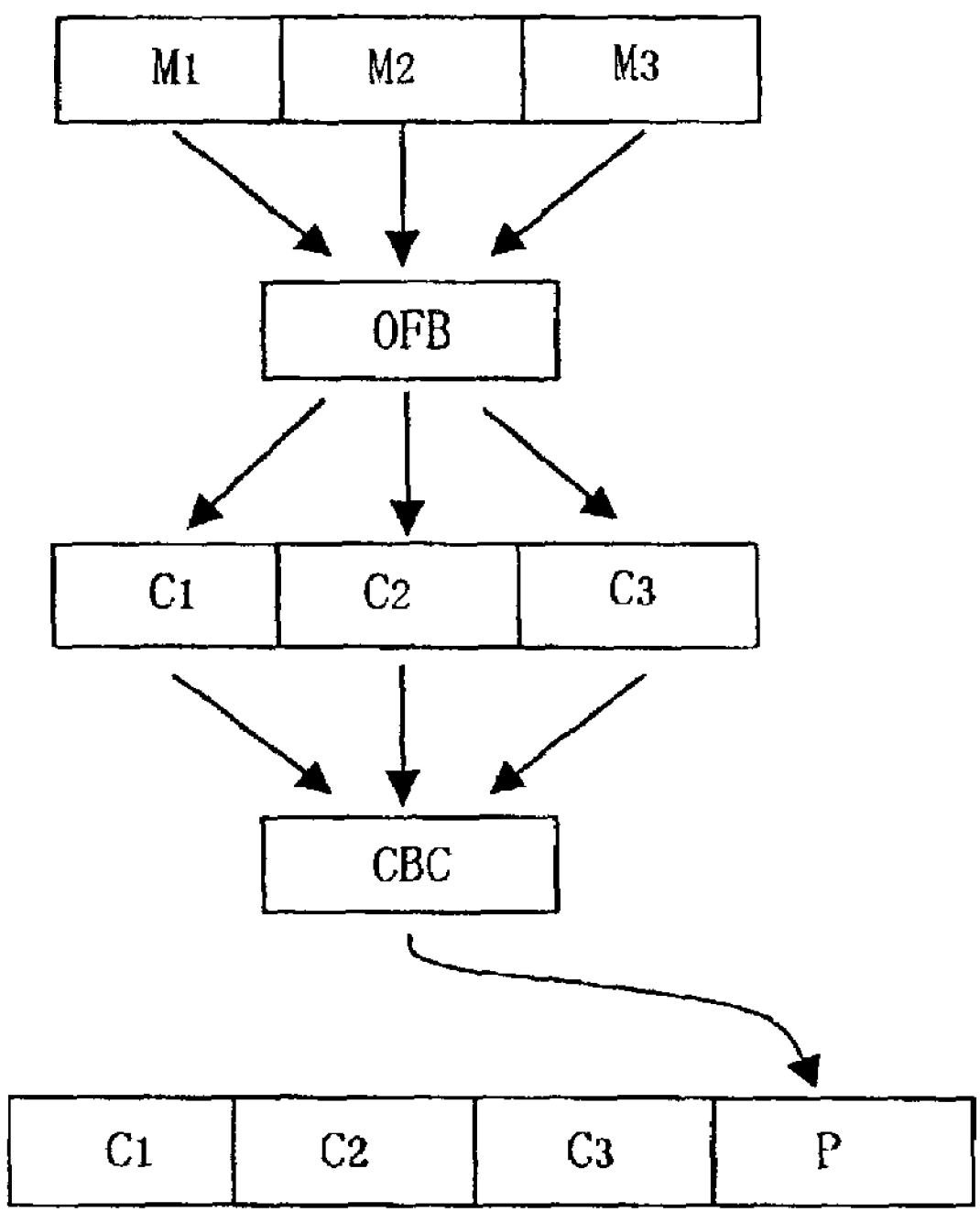
FIG. 51 explains a confidentiality process and an integrity ensuring process.

Compared with FIG. 47, the encryptor of FIG. 18 additionally includes the memory 55. The memory 55 stores ciphertext block data $C_1$ output from the XOR circuit 58.

Further, en encryption unit 52 is configured by the XOR circuit 58 and the encrypting module 51 using the encryption key K.

FIG. 18 shows an encryptor for encrypting plaintext block data $M_i$ (i=1, 2, 3, . . . ) included in the plaintext data M and plaintext block data $N_j$ (j=1, 2, 3, . . . ) included in the plaintext data N. The encryptor includes a processing mechanism of the interrupt that receives the request to encrypt the plaintext data N during the encryption of the plaintext data M before the completion of encrypting the plaintext data M and the encrypting unit 52 for encrypting the plaintext block data $M_i$ and outputting the ciphertext block data $C_1$. The encryptor further includes feedback loops 65 and 66 for feeding back the module output block data $T_1$ supplied from the encrypting module 51 to the encrypting module through the feedback line 65, and the memory 55 provided in parallel with the feedback line 65 of the feedback loop, for receiving a request to encrypt the plaintext data N and storing the module output block data $T_1$ fed back when the plaintext block data $M_{i+1}$ is not encrypted subsequent to the plaintext block data $M_i$ because the encryptor starts a certain plaintext block data of the plaintext data N. Yet further, the encryptor includes the selector 54 which selects the module output block data $T_1$ fed back by the feedback line 65 of the feedback loop to supply to the encrypting module 51 through the feedback loop when the plaintext block data $M_1$ is encrypted subsequent to the plaintext block data $M_1$, and selects the module output block data $T_1$ stored in the memory 55 to supply to the encrypting module 51 through the feedback loop when the plaintext block data $M_{1+1}$ is not encrypted subsequent to the plaintext block data $M_1$ but after a certain plaintext block data of the plaintext data N.

Figure 19:
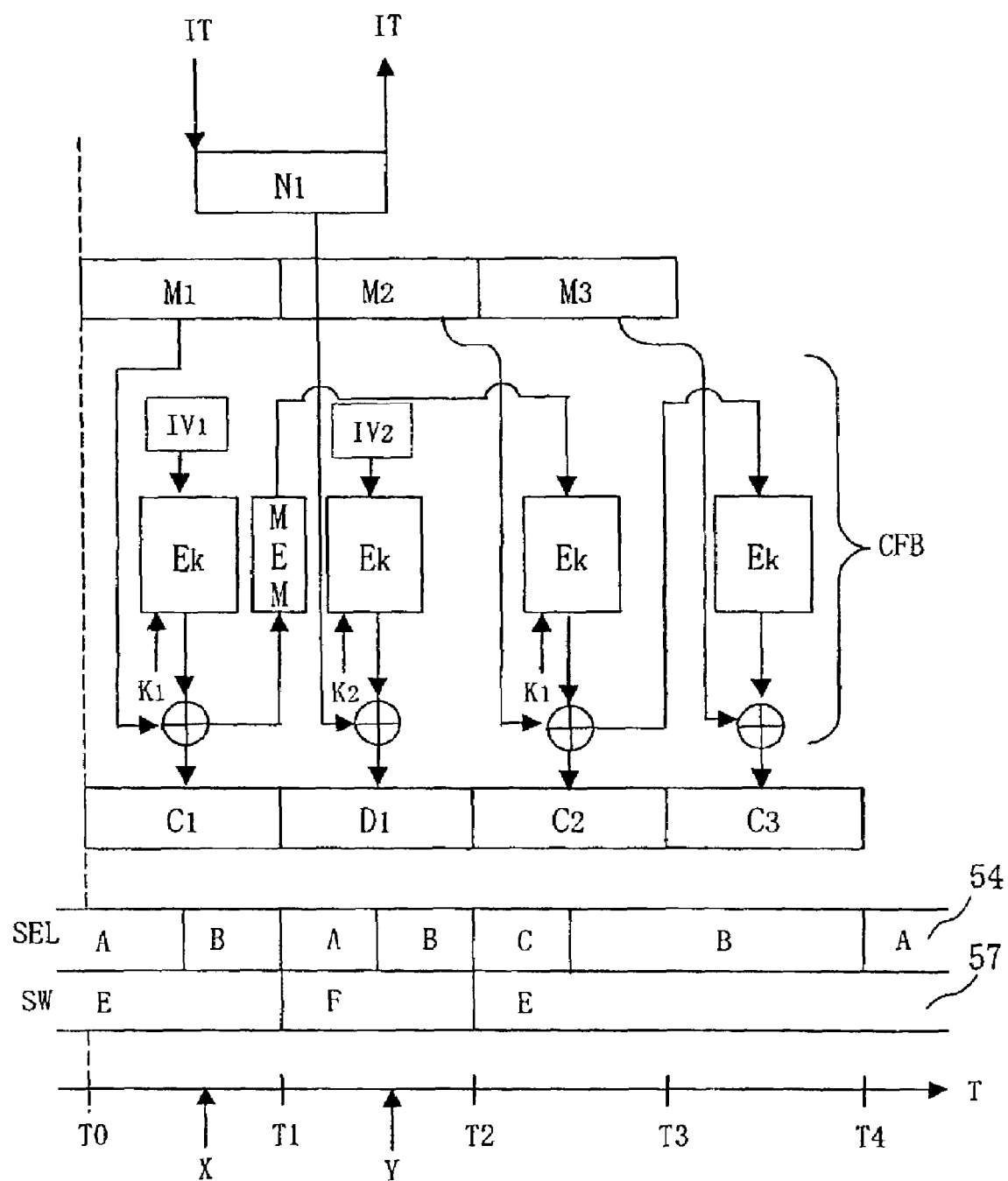
FIG. 19 shows an operation procedure of the encryptor of FIG. 18.

FIG. 19 explains the encryptor of the OFB mode shown in FIG. 18.

In FIG. 19, the operation of the CBC mode of FIG. 2 is changed to the operation of the OFB mode, and the other operations are the same to the one of FIG. 2.

Figure 20:
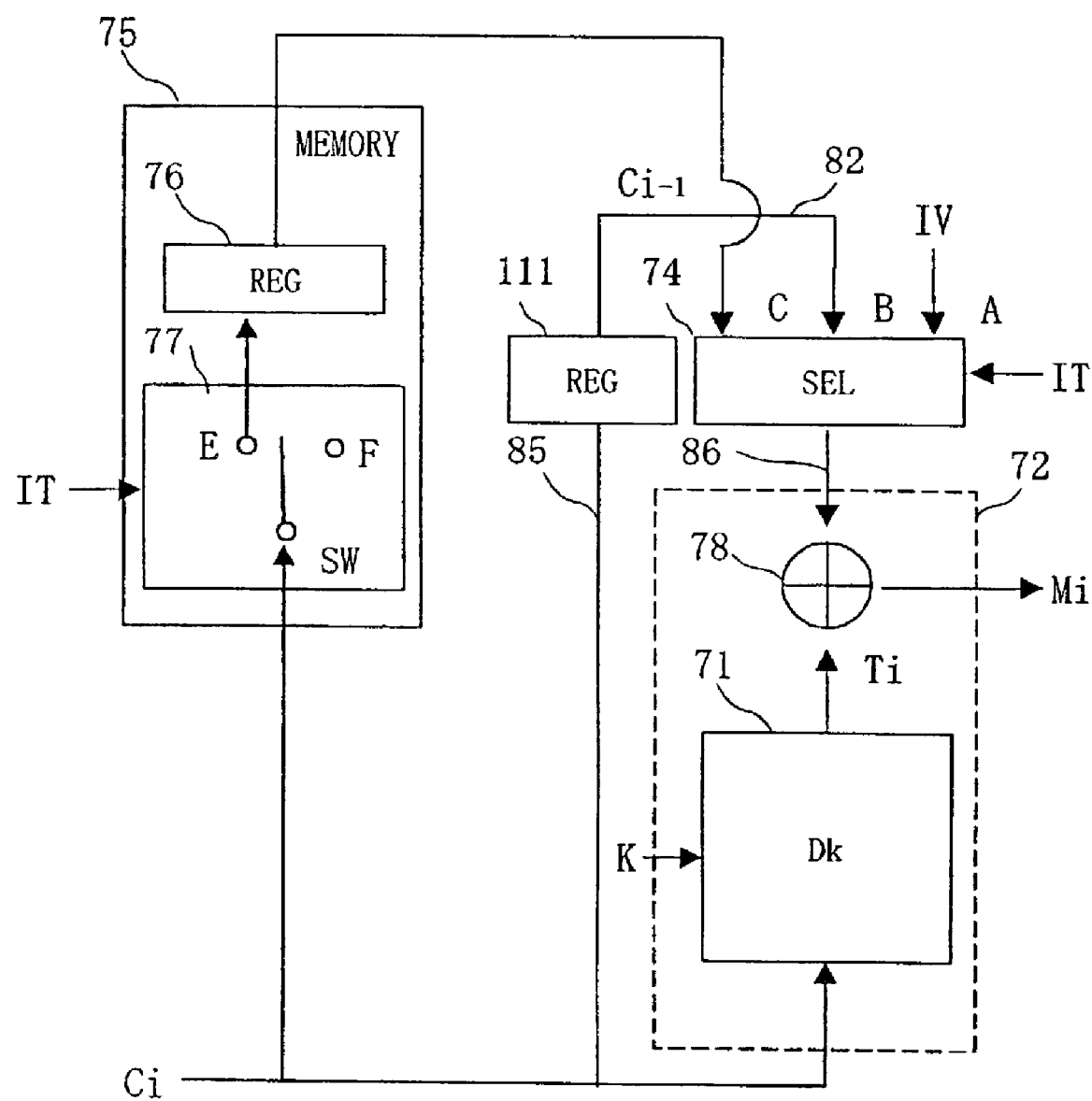
FIG. 20 shows a decryptor of the CBC mode.

FIG. 20 shows a decryptor of the CBC mode.

Figure 44:
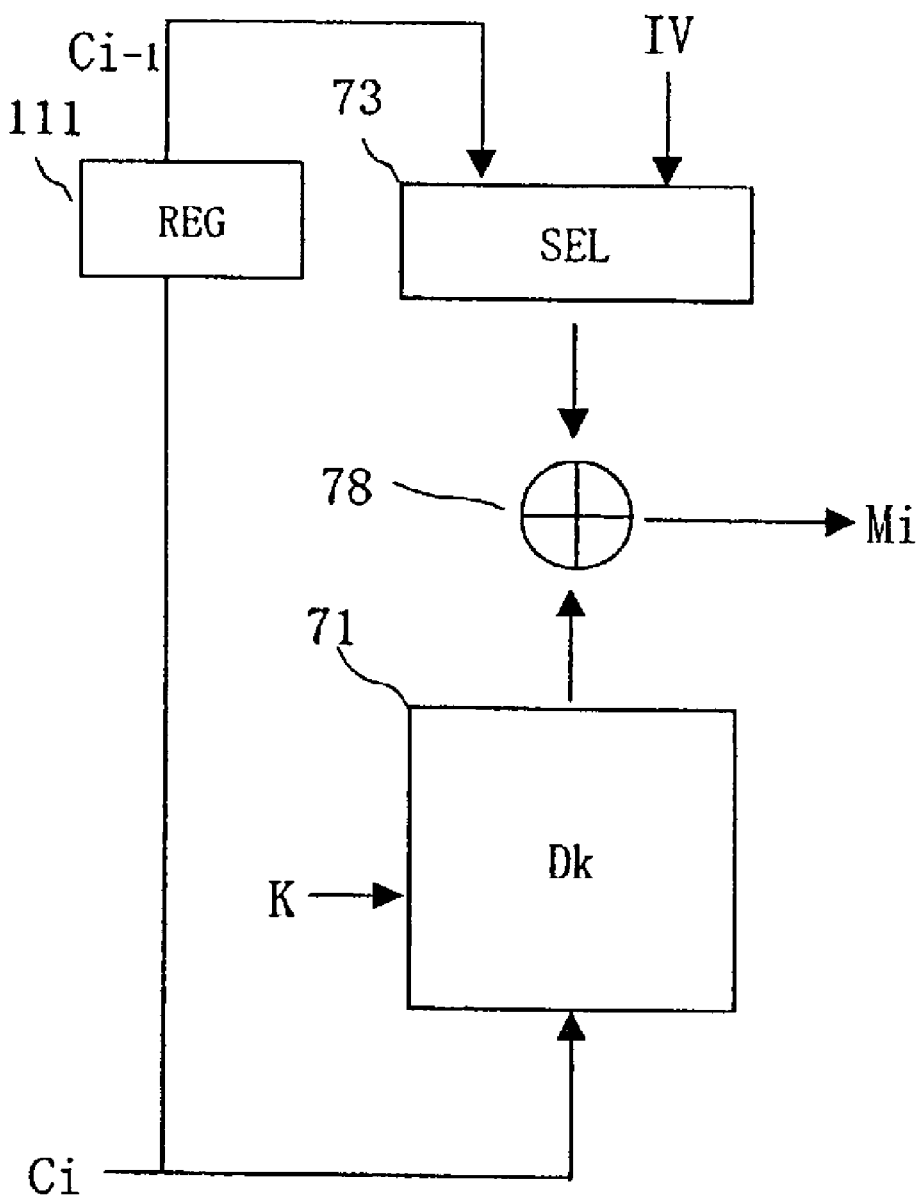
FIG. 44 shows a conventional decryptor of the CBC mode.
Figure 45:
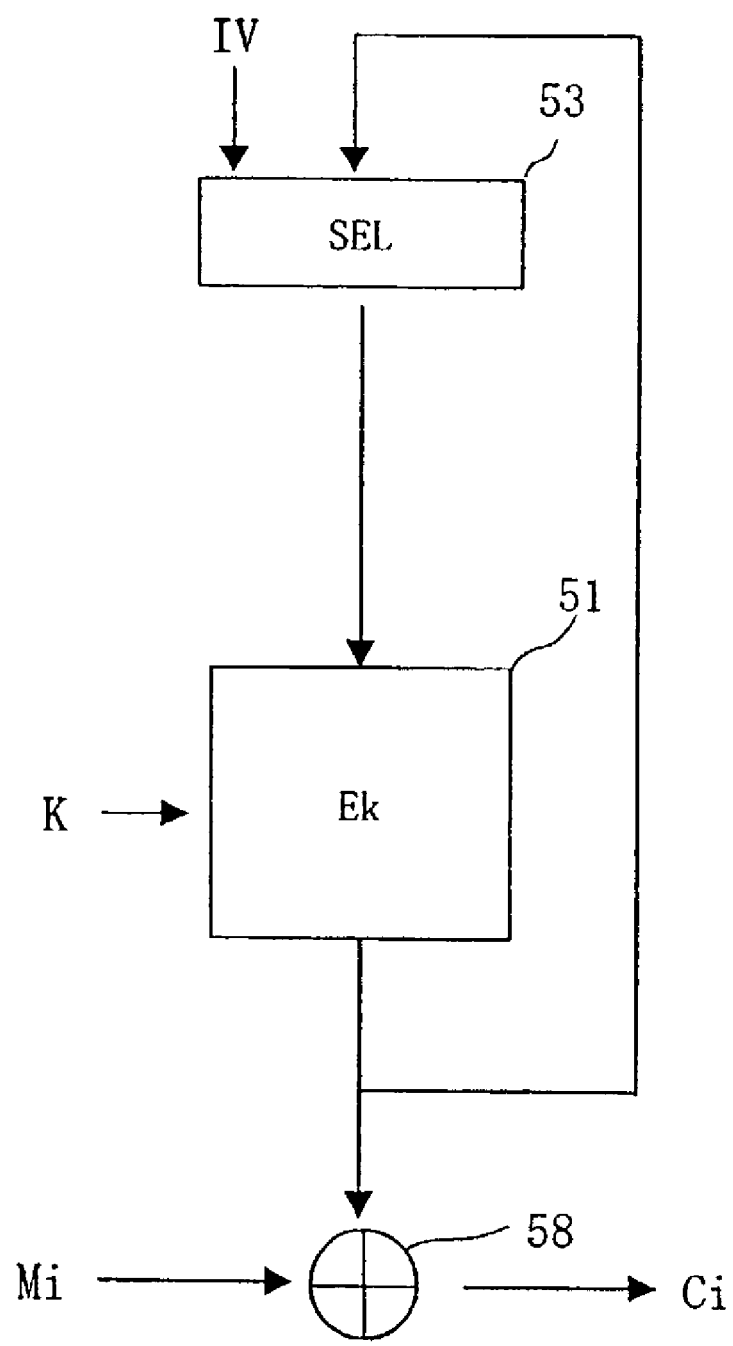
FIG. 45 shows a conventional encryptor of the OFB mode.
Figure 46:
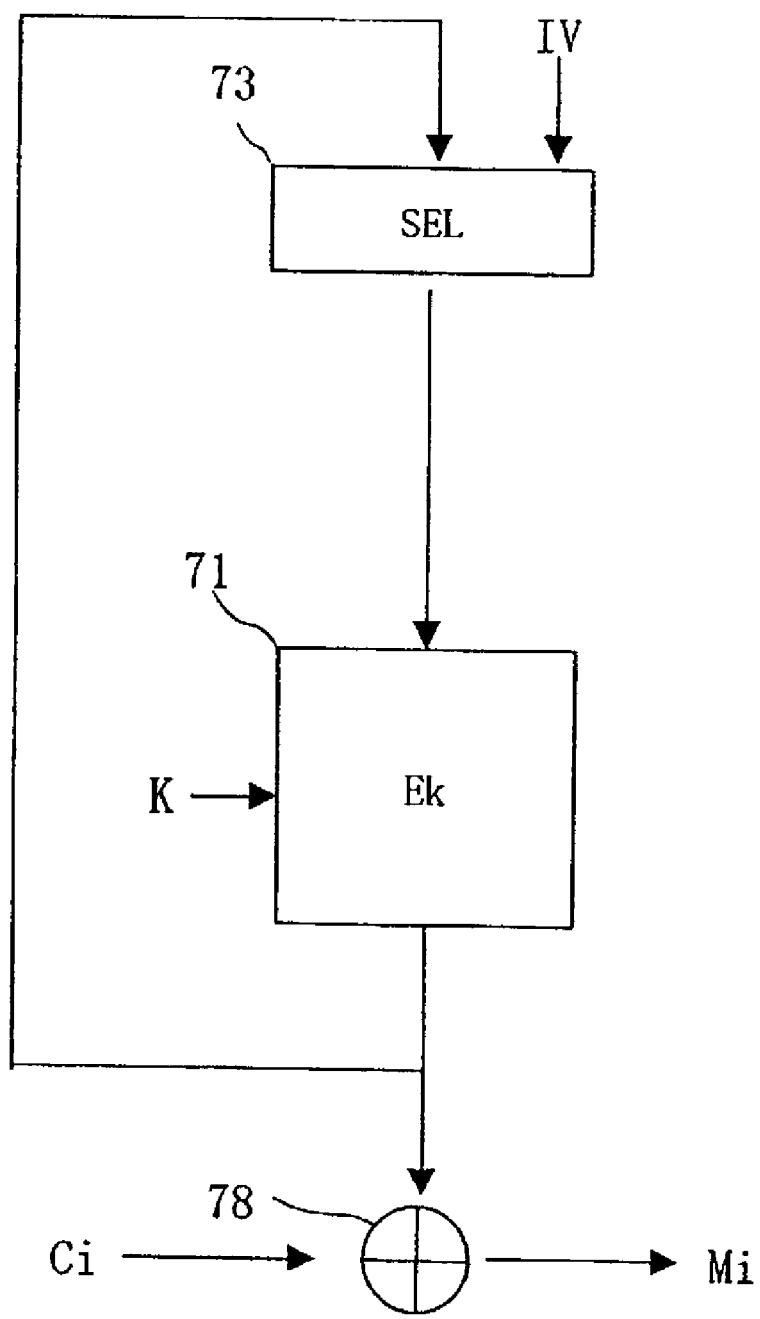
FIG. 46 shows a conventional decryptor of the OFB mode.

Compared with FIG. 44, the decryptor of FIG. 20 additionally includes the memory 75.

The memory 75 includes a register 76 and a switch 77.

Further, a decrypting unit 72 is configured by an XOR circuit 78 and a decrypting module 71 using the key K.

A register 111 can be provided inside a selector 74.

The decryptor shown in FIG. 20, which decrypts the ciphertext block data $C_1$ (i=1, 2, 3, . . . ) included in the ciphertext data C and the ciphertext block data $N_j$ (j=1, 2, 3, . . . ) included in the ciphertext data D and includes a processing mechanism of the interrupt that receives a request to decrypt the ciphertext data D during decrypting process of the ciphertext data C.

Further, the decryptor shown in FIG. 20 further includes the decrypting module 71 for outputting decrypted data of the ciphertext block data $C_1$ as module output block data $T_1$, feedback loops 85, 111, 82, and 86 for feeding back the ciphertext block data $C_1$ to the decrypting unit 72 through the feedback lines 85, 111, and 82 for decrypting ciphertext block data $C_{1+1}$. The decryptor further includes the memory 71 provided in parallel with the feedback line 85, 111, 82, and 86 of the feedback loop and for receiving a request for decrypting the ciphertext data D and storing the block data fed back when the ciphertext block data $C_{1+1}$ is not decrypted subsequent to the ciphertext block data $C_1$ because the decryptor starts decrypting any of ciphertext block data of the ciphertext data D.

Further, the decryptor shown in FIG. 20 includes the selector 74 which selects the ciphertext block data $C_1$ fed back by the feedback lines 85, 111, 82 of the feedback loop to supply to the encrypting unit 72 through the feedback loop when the ciphertext block data $C_1$ is encrypted subsequent to the ciphertext block data $C_1$, and selects the ciphertext block data $C_1$ stored in the memory to supply to the encryption unit 72 through the feedback loop when the ciphertext block data $C_{1+1}$ is not encrypted subsequent to the ciphertext block data $C_1$ but after any of ciphertext block data of the ciphertext data D.

"Feedback line" and "feedback loop" used in the above explanation of FIG. 20 do not mean "feedback" which "inputs data output from itself". Here, "feedback" means to supply ciphertext block data $C_1$ again for decrypting the ciphertext block data $C_{1+1}$ after decrypting the ciphertext block data $C_1$.

Figure 21:
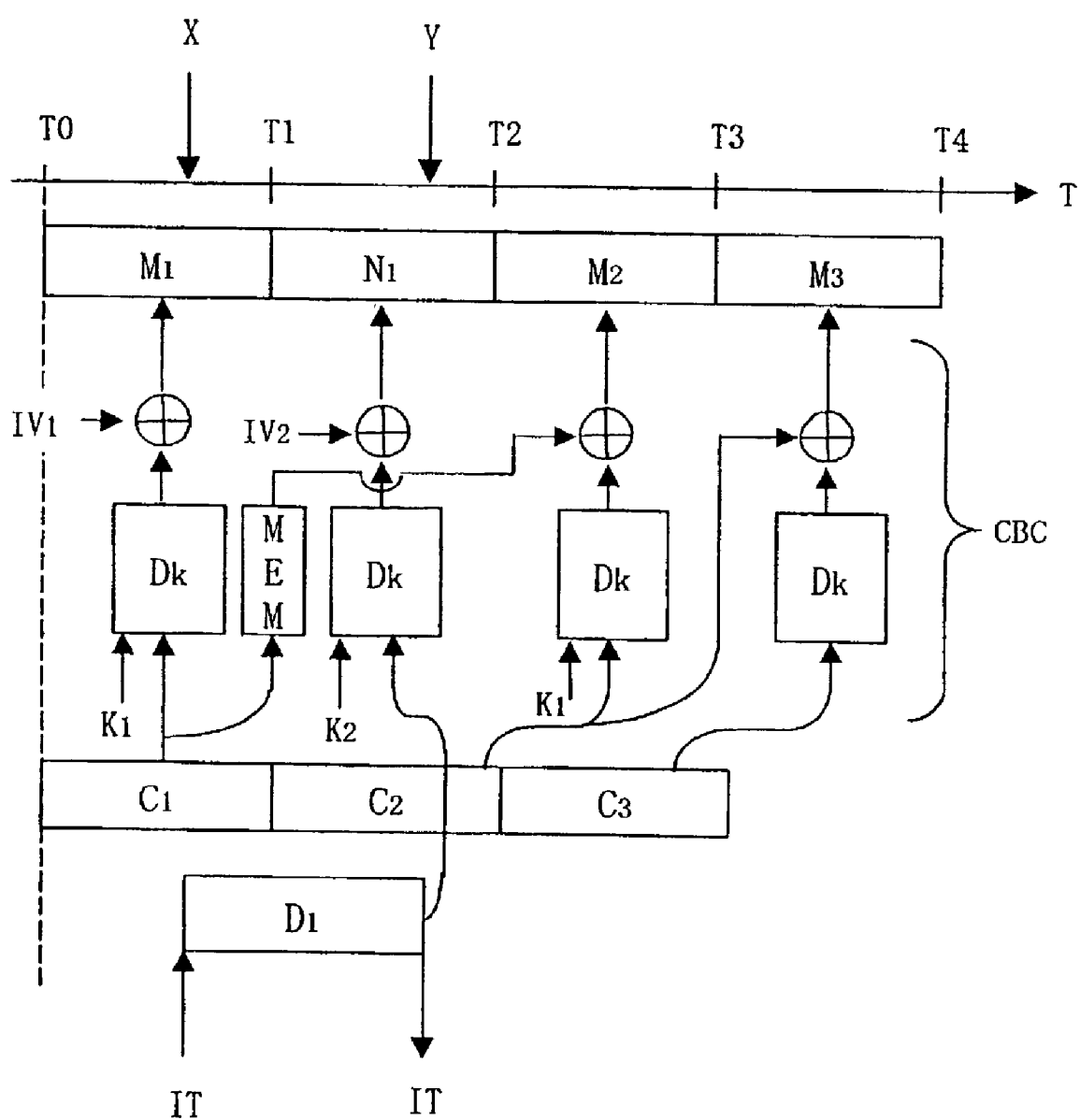
FIG. 21 shows an operation procedure of the decryptor of FIG. 20.

FIG. 21 shows an operation procedure of the decryptor shown in FIG. 20.

When the interrupt IT is generated during decrypting the ciphertext block data $C_1$ using the encryption key (also called decryption key) $K_1$, the ciphertext block data $C_1$ is stored in the register 76 of the memory 75. Thereafter, the ciphertext block data $D_1$ is decrypted using the encryption key (also called decryption key) $K_2$ into the plaintext block data $N_1$. Then, the ciphertext block data $C_1$ stored in the register 76 of the memory 75 is read, the ciphertext block data $C_2$ is decrypted into the plaintext block data $M_2$. The operation of the selector 74 is the same as one shown in FIG. 4. Further, the operation of the switch 77 is the same as one shown in FIG. 5.

Figure 22:
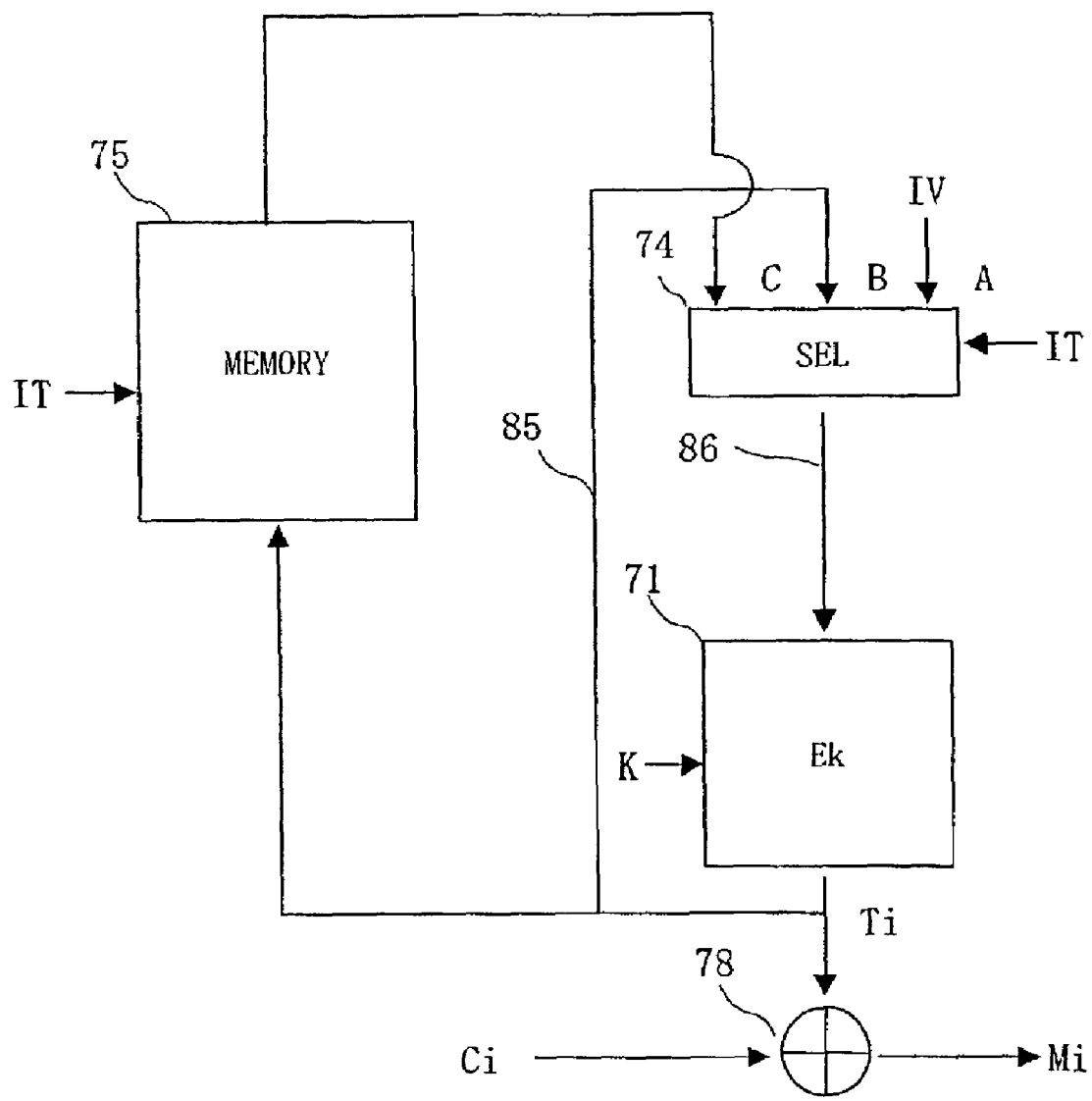
FIG. 22 shows a decryptor of the OFB mode.

FIG. 22 shows the decryptor of the OFB mode.

The decryptor shown in FIG. 22, which decrypts the ciphertext block data $C_1$ (i=1, 2, 3, . . . ) included in the ciphertext data C and the ciphertext block data $D_j$ (j=1, 2, 3, . . . ) included in the ciphertext data D, includes a processing mechanism of the interrupt that receives a request for decrypting the ciphertext data D during decrypting the ciphertext data C at an arbitrary timing point. The decryptor further includes the decrypting module 71 for outputting decrypted data as module output block data $T_1$, feedback loops 85, 86 for feeding back the module output block data $T_1$ to the decrypting module 71 through the feedback lines 85. The decryptor further includes the memory 75 provided in parallel with the feedback line 85, of the feedback loop, and for receiving a request to decrypt the ciphertext data D and storing the module output block data $T_1$ fed back when the ciphertext block data $C_{1+1}$ is not decrypted subsequent to the ciphertext block data $C_1$ because the decryptor starts decrypting any of ciphertext block data of the ciphertext data D. Further, the decryptor shown in FIG. 20 includes the selector 74 which selects the module output block data $T_1$ fed back by the feedback line 85 of the feedback loop to supply to the decrypting module 71 through the feedback loop when the ciphertext block data $C_1$ is encrypted subsequent to the ciphertext block data $C_1$, and selects the module output block data $T_1$ stored in the memory 75 to supply to the decrypting module 71 through the feedback loop when the ciphertext block data $C_{1+1}$ is not encrypted subsequent to the ciphertext block data $C_1$ but after any of ciphertext block data of the ciphertext data D.

Figure 23:
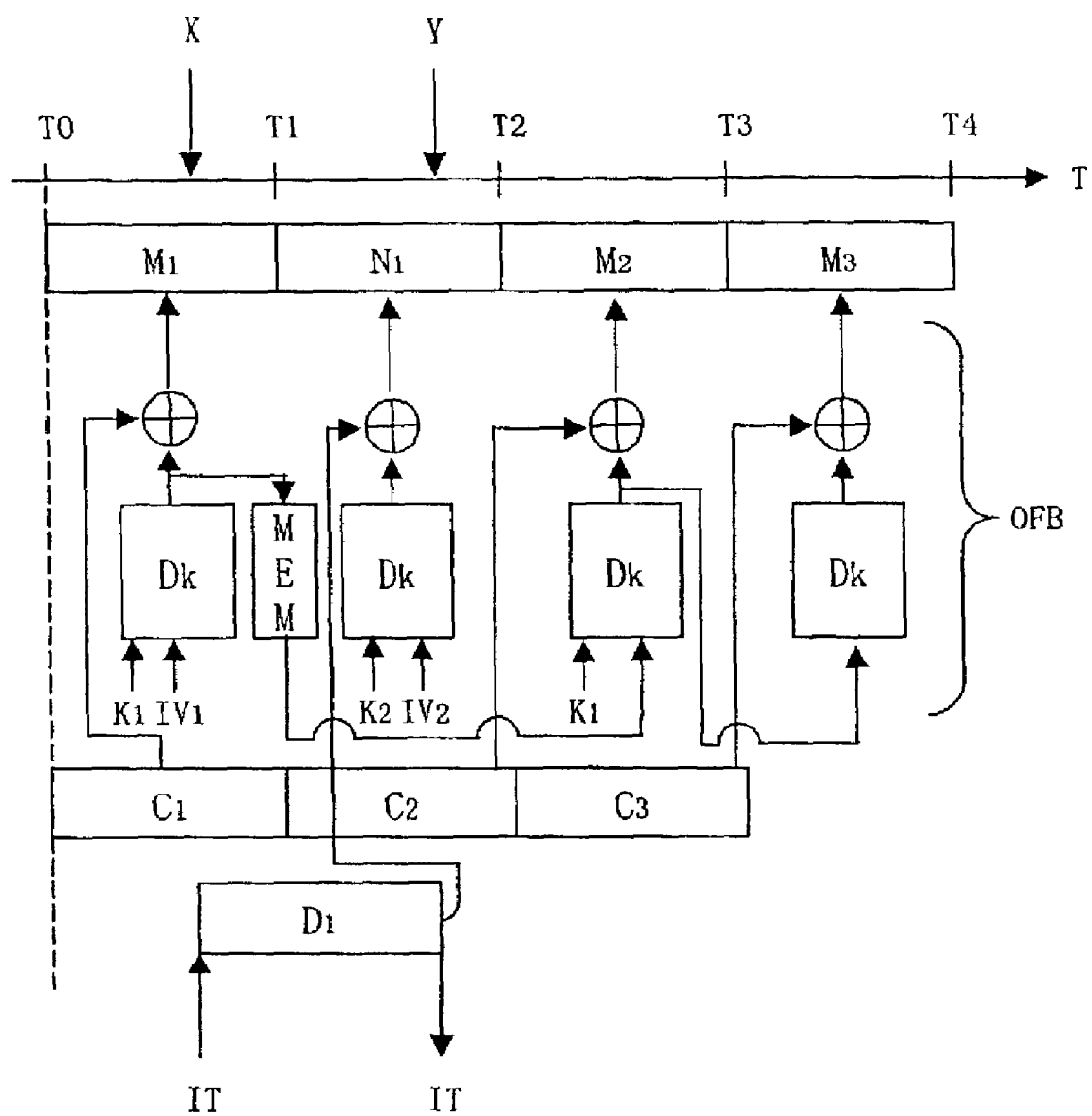
FIG. 23 shows an operation procedure of the decryptor of FIG. 22.

FIG. 23 explains the operation of the encryptor of the OFB mode shown in FIG. 22.

The operation of FIG. 23 is the same with the one of the encryptor of the CBC mode shown FIG. 21 except that the operation is performed in OFB mode instead of the CBC mode.

Figure 24:
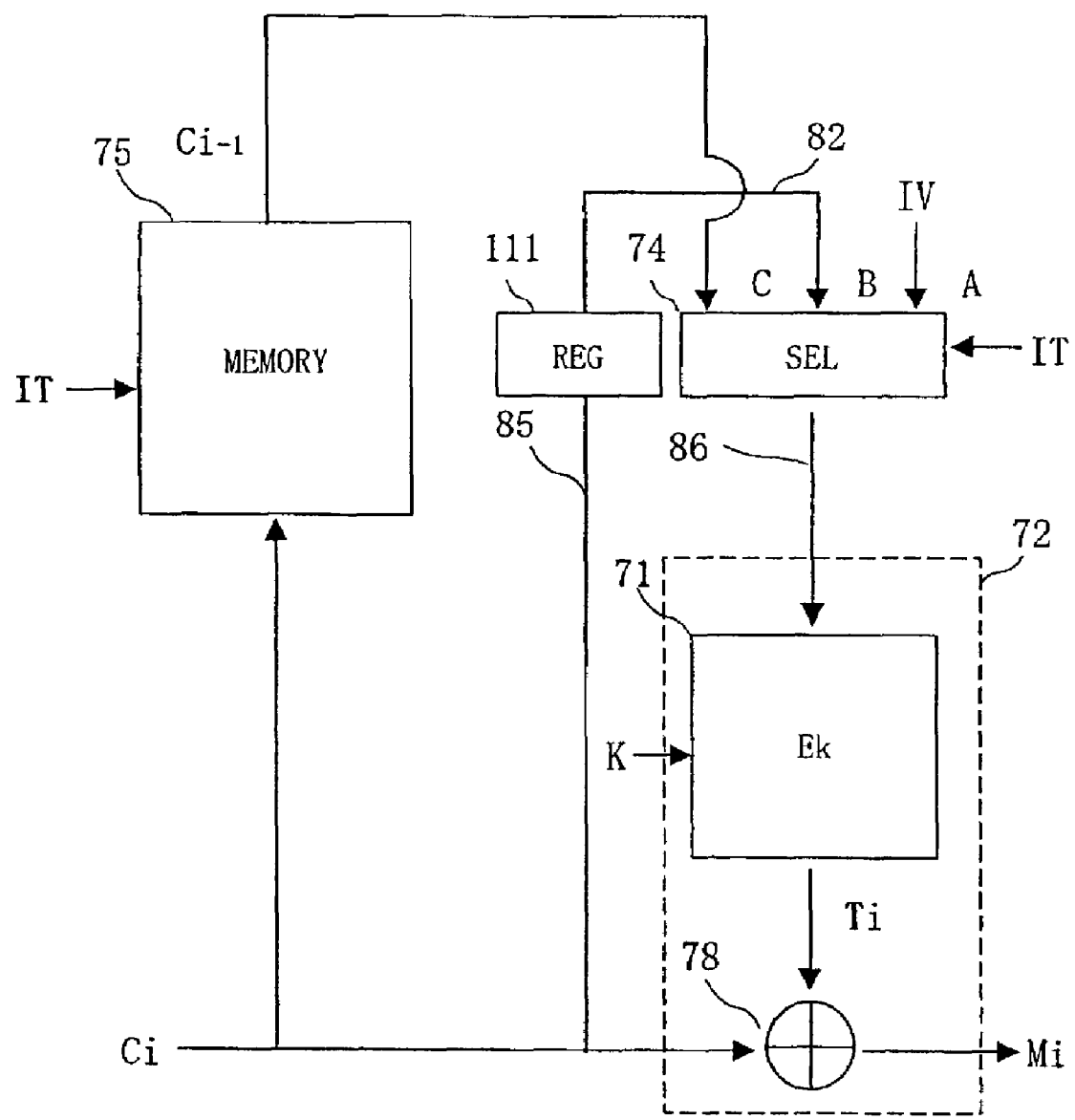
FIG. 24 shows a decryptor of the CFB mode.

FIG. 24 shows a decryptor of the CFB mode.

A decrypting unit 72 is configured by the XOR circuit 78 and a decrypting module 71.

Here, the register 111 can be provided inside the selector 74.

The decryptor shown in FIG. 24, which decrypts the ciphertext block data $C_1$ (i=1, 2, 3, . . . ) included in the ciphertext data C and the ciphertext block data $D_j$ (j=1, 2, 3, . . . ) included in the ciphertext data D, includes a processing mechanism of the interrupt that receives a request to decrypt the ciphertext data D during decrypting the ciphertext data C at an arbitrary timing point. The decryptor further includes the decrypting module 71 for outputting decrypted data as module output block data $T_1$, feedback loops 85, 111, 82, 86 for feeding back the module output block data $T_1$ to the decrypting module 71 through the feedback lines 85, 111, 82. The decryptor further includes the memory 75 provided in parallel with the feedback line 85, 111, 82 of the feedback loop and for receiving a request to decrypt the ciphertext data D and storing the module output block data $T_1$ fed back when the ciphertext block data $C_{1+1}$ is not decrypted subsequent to the ciphertext block data $C_1$ because the decryptor starts decrypting any of ciphertext block data of the ciphertext data D. Further, the decryptor shown in FIG. 24 includes the selector 74 which selects the module output block data $T_1$ fed back by the feedback line 85 of the feedback loop to supply to the decrypting module 71 through the feedback loop when the ciphertext block data $C_1$ is encrypted subsequent to the ciphertext block data $C_1$, and selects the module output block data $T_1$ stored in the memory 75 to supply to the decrypting module 71 through the feedback loop when the ciphertext block data $C_{1+1}$ is not encrypted subsequent to the ciphertext block data $C_1$ but after any of ciphertext block data of the ciphertext data D.

"Feedback line" and "feedback loop" used in the above explanation of FIG. 24 do not mean "feedback" which "inputs data output from itself". Here, "feedback" means to supply ciphertext block data $C_1$ again for decrypting the ciphertext block data $C_{1+1}$ after decrypting the ciphertext block data.

Figure 25:
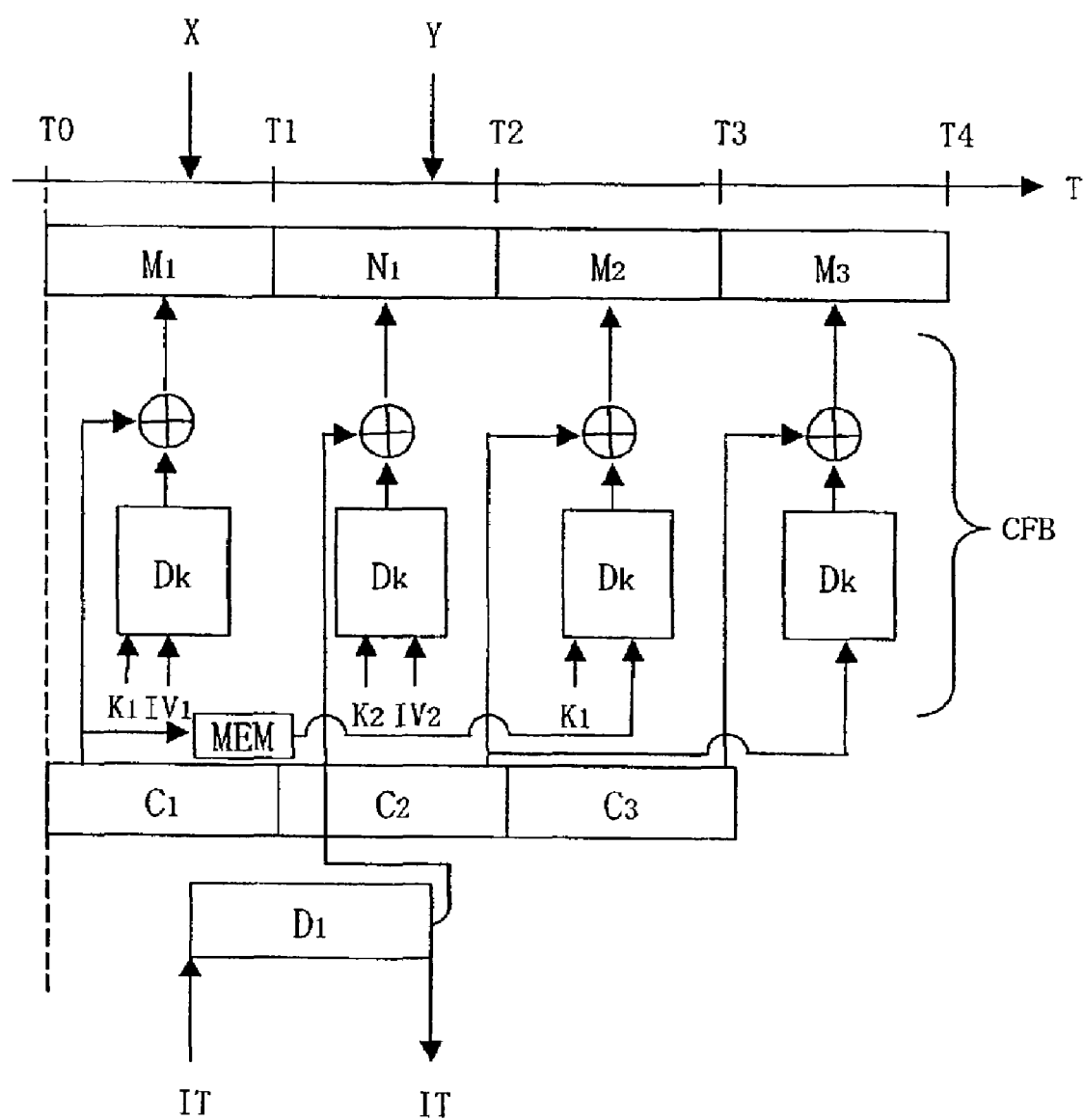
FIG. 25 shows an operation procedure of the decryptor of FIG. 24.

FIG. 25 explains an operation of the encryptor of the CFB mode shown in FIG. 24.

In FIG. 25, the operation in the CBC mode shown in FIG. 21 is replaced with the operation in the CFB mode, and the other operations are the same as ones shown in FIG. 21.

Figure 26:
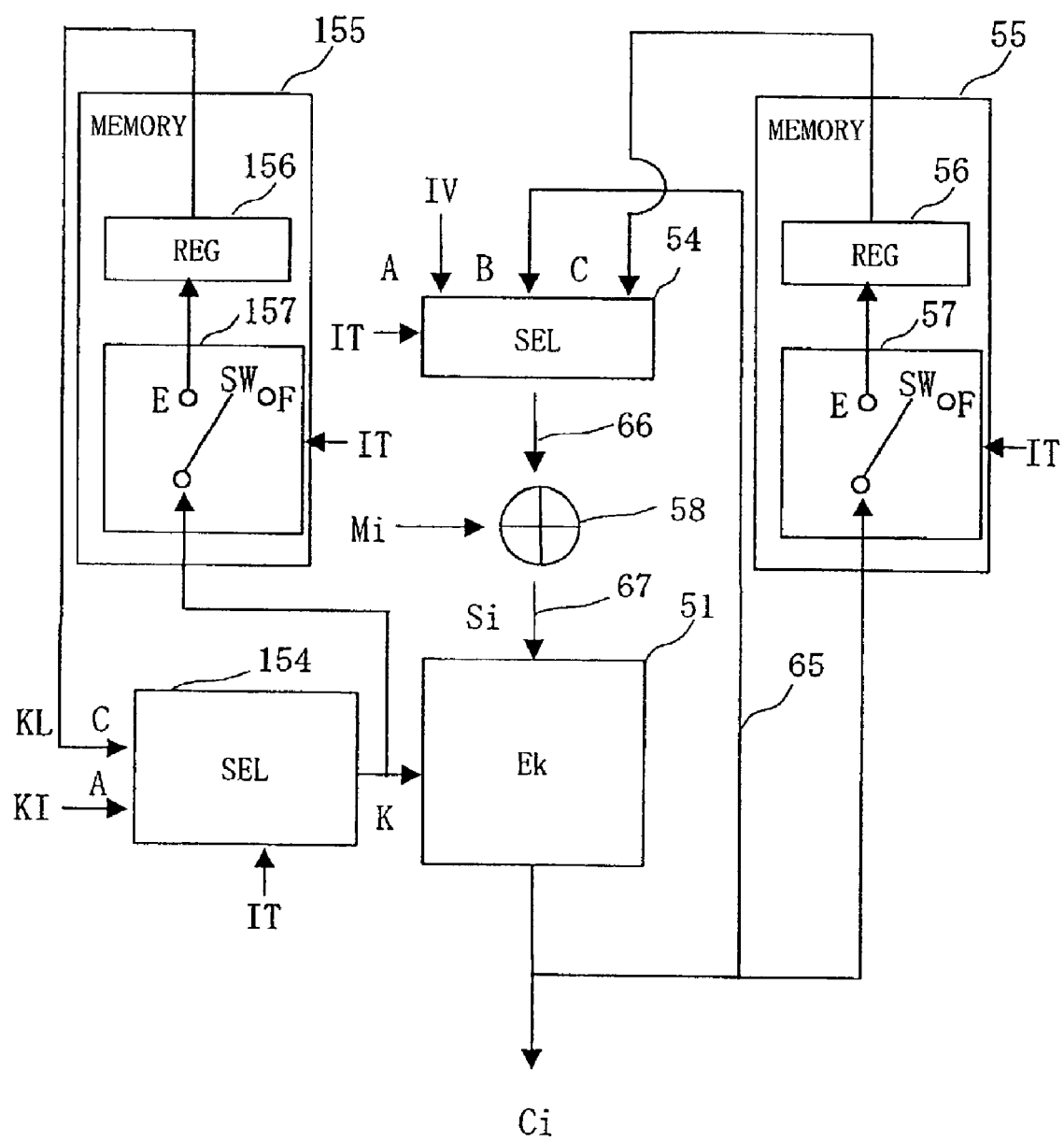
FIG. 26 shows an encryptor of the CBC mode storing a key.

FIG. 26 shows an improvement example of the encryptor of the CBC mode shown in FIG. 1.

A selector 154 and a memory 155 are added to the encryptor of FIG. 26. FIG. 1 shows a case in which the key $K_1$ is supplied from the outside if the interrupt IT is resolved, while the $K_1$ supplied from the outside is stored and used again here.

The memory 155 includes a register 156 and a switch 157. The switch 157 switches ignoring or inputting the encryption key K to the register 156. This switching is performed by, for example, the interrupt IT. When the interrupt IT is generated, the switch 157 is connected to E, and when the interrupt IT is resolved, the switch 157 is connected to F. The register 156 inputs the key K supplied through E and stores it. The key K stored in the register 156 is output to the selector 154. The selector 154 has two inputs of A and C, out of which the selector 154 selects one. This selection depends on the interrupt IT, which will be described later.

Figure 27:
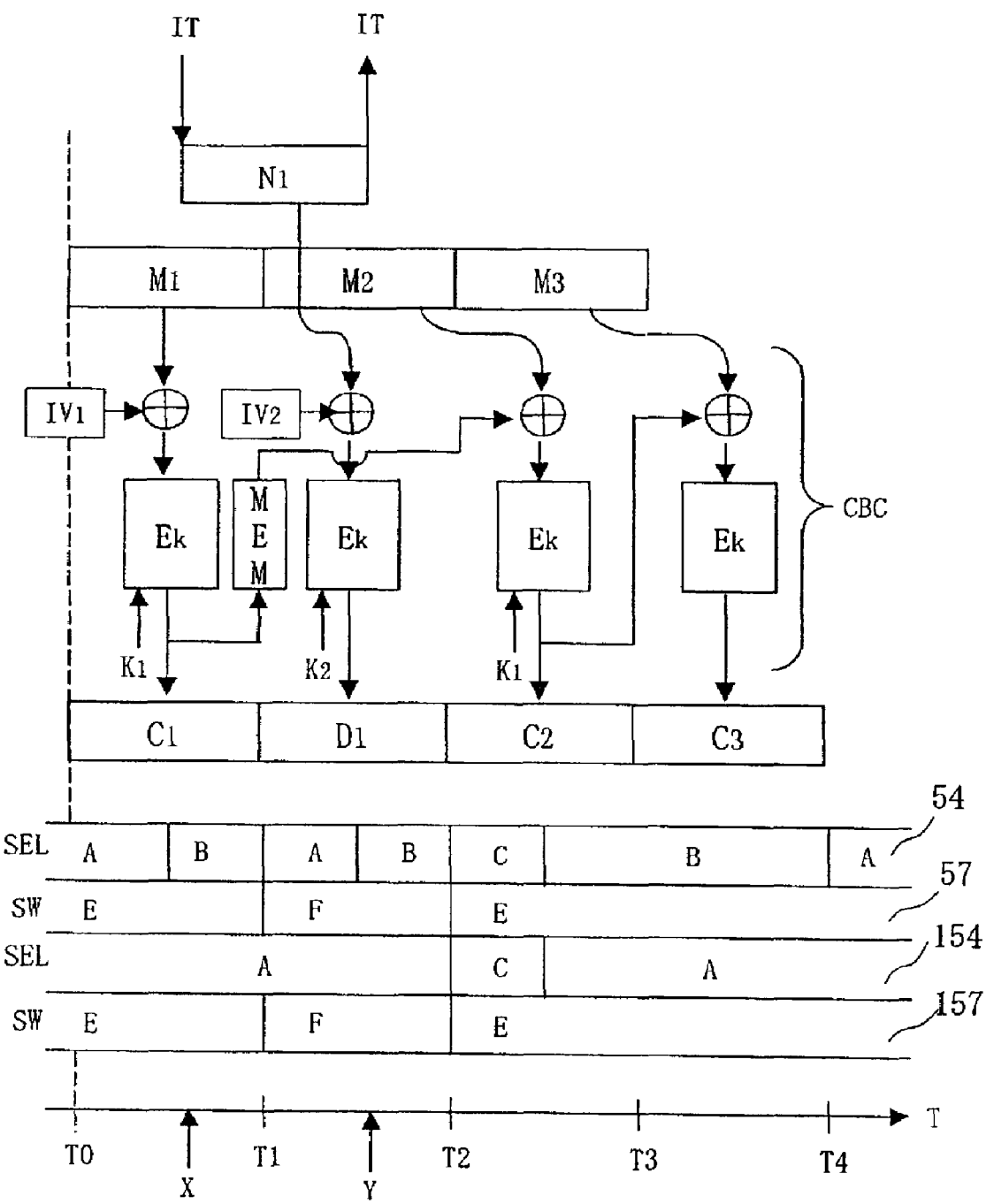
FIG. 27 shows an operation procedure of the encryptor of the CBC mode.

FIG. 27 shows an operation procedure of the encryptor shown in FIG. 26.

When the electric power of the encryptor is supplied, the inputs to the selector 54 and the selector 154 are set to A, and the switch 57 and the switch 157 are connected to E. Further, while a request to encrypt the plaintext data N exists, the interrupt IT is generated and kept ON until the request to encrypt the plaintext data N is resolved. Further, the plaintext data M is to be encrypted using the key $K_1$, and the plaintext data N is to be encrypted using the key $K_2$. The keys $K_1$ and $K_2$ are supplied to the encrypting module 51.

At time T0, the key $K_1$ is supplied from the outside as the key KI. As the switch 157 is connected to E, the key $K_1$ is stored in the register 156. Then, the encrypting process for the plaintext block data $M_1$ is started. When the plaintext block data $M_1$ is started at time T0, the selector 54 inputs an initial value IV through A, and then the selector 54 is switched to B. At time X during the encrypting process of the plaintext block data $M_1$ using the key $K_1$, it is assumed that the interrupt IT for requesting to encrypt the plaintext block data $N_1$. Until time T1, the ciphertext block data $C_1$ becomes stored in the memory 55. Then, the key $K_2$ is supplied to the encrypting module 51 from the outside as the key KI at time T1 due to the generation of the interrupt IT. At time T1, the input to the selector 54 is set to A. And at time T1, the switch 57 and the switch 157 are connected to F. Accordingly, the key $K_2$ is not stored in the register 156. After time T1, the encryption of the plaintext block data $N_1$ is performed using the key $K_2$, and the ciphertext block data $D_1$ is output. At time Y, the encryption of the plaintext block data $N_1$ is finished, and the interrupt IT is resolved. Due to this resolution of the interrupt IT, at time T2, the input to the selector 54 is switched to C, and the switch 57 is connected to E. Consequently, the key $K_1$ is output to the selector 154 from the register 156 as the key KI, and the key $K_1$ is supplied to the encrypting module 51 from the selector 154 as the key $K_1$. Further, as the selector 54 is switched to C, the ciphertext block data $C_1$ stored in the memory 55 is input for encrypting the plaintext block data $M_2$, the plaintext block data $M_2$ is encrypted by the encrypting module 51 using the key $K_1$, and the ciphertext block data $C_2$ is output. Before time T3, the input to the selector 54 is switched to B, and when the plaintext block data $M_3$ is encrypted, the ciphertext block data $C_2$ fed back from the feedback line 65 of the feedback loop is input, the plaintext block data $M_3$ is encrypted by the encrypting module 51 using the key $K_1$, and the ciphertext block data $C_3$ is output.

Further, before time T3, the input to the selector 154 is switched to A.

An operation of the selector 154 will be described.

When the electric power is turned ON, the input to the selector 154 is set to A. Further, also when the generation of the interrupt IT is detected, the input is kept setting to A. Until the interrupt IT is resolved, the selector 154 operates with setting its input to A. When the resolution of the interrupt IT is detected, the selector 154 sets the input to C. Due to setting the input to C, the key $K_1$ stored in the memory 55 is input to the encrypting module 51 as the key K. When the encryption using the key input from C is started, the selector sets the input to A.

As described above, the selector 154 can be switched based on the generation of the interrupt IT.

Next, an operation of processing the interrupt of the switch 157 will be explained.

When the electric power is turned ON, and at the first encrypting process of the plaintext data M, the switch 157 is connected to E, and the key $K_1$ for the plaintext M is stored in the register 156. And when the interrupt IT is generated at time X, the switch 157 is connected to F from E at time $T_1$, and the key $K_2$ for the plaintext N is ignored. Further, when the resolution of the interrupt IT is detected at time Y, the switch 157 is connected to E from F at time T2. In this way, the switch 157 ignores the key $K_2$ for the plaintext data N from the generation until the resolution of the interrupt IT. Accordingly, the key $K_1$ for the plaintext data M is kept storing in the register 156 of the memory 155.

Figure 28:
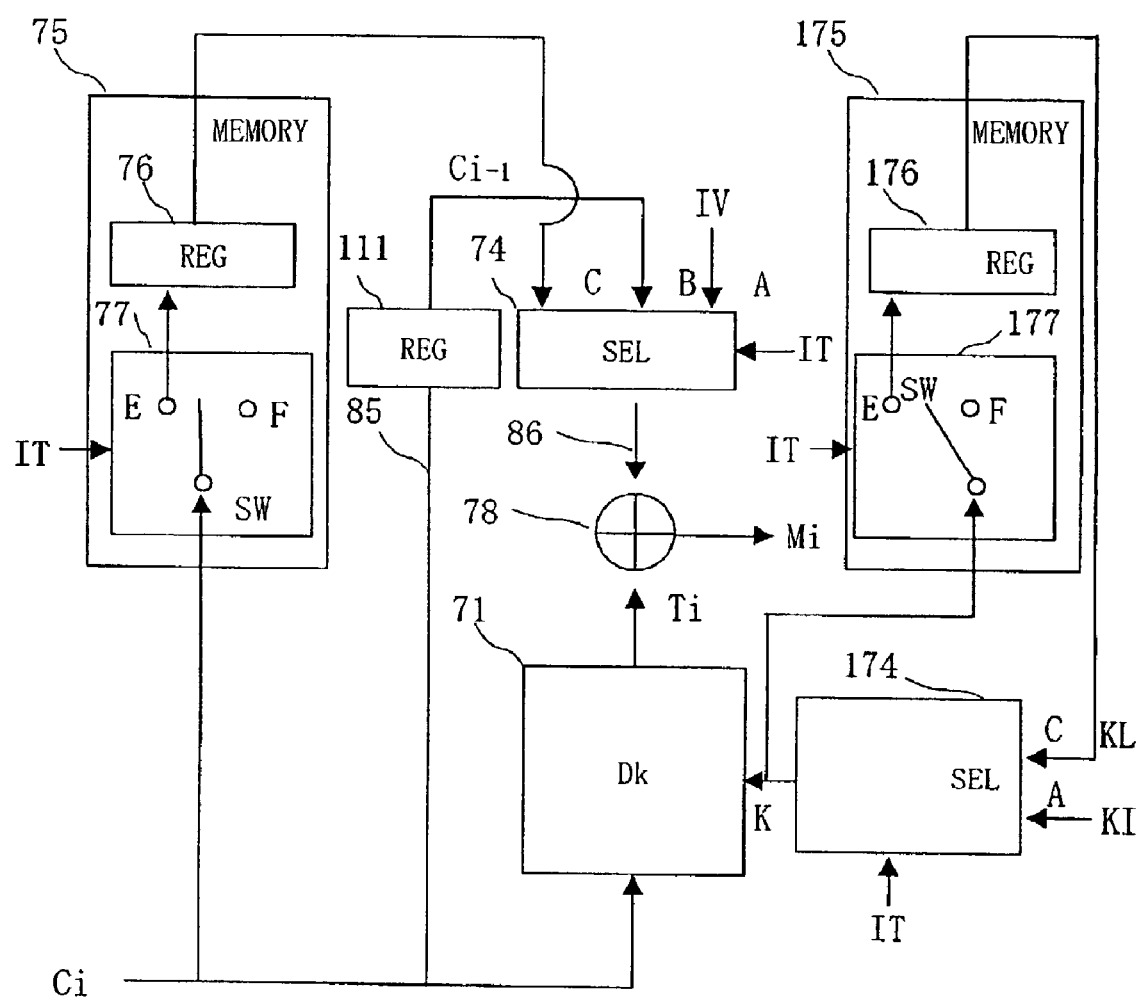
FIG. 28 shows a decryptor of the CBC mode storing a key.

FIG. 28 shows a configuration of the decryptor shown in FIG. 20 when the key $K_1$ is stored to be reused.

FIG. 28 shows a case in which a selector 174 and a memory 175 are added to the decryptor of FIG. 20. The operations of the selector 174 and the memory 175 are the same as the ones of the selector 154 and the memory 155 shown in FIG. 26.

The memory 55 and the memory 155 are examples of the memory for storing the status of the encryptor when the interrupt IT is generated. In this way, the status of the encrypting process is stored in the memory 55 and the memory 155, which enables the encryptor to return to the status of encrypting a certain data even when the encryption of another data is performed during the certain data is encrypted. Namely, using the data stored in the memory 55 and the key K stored in the memory 155, the status of the encryptor can be returned to the identical status when encryption is interrupted, and the interrupted encrypting process can be continued.

The memory 155 and the memory 175 can be configured as identically to the memory 55 shown in FIGS. 6 and 8. Or, the key $K_1$ can be stored by adding the configuration such as ones shown in FIGS. 26 and 28 to FIGS. 16, 18, 22, and 24.

Further, since the memories 55 and 155 shown in FIG. 26 operate the same, these memories can be integrated into one memory.

As has been discussed, the decryptor in relation to the present embodiment performs decryption of the first processing data (ciphertext data C) including at least one block data $C_1$ (i=1, 2, 3, ..., m) and the second processing data (ciphertext data D) including at least one block data $D_J$ (J=1, 2, 3, ..., n). The decryptor includes the memory 75 storing the status of decrypting process. The decryptor starts decrypting process of an initial block data $D_1$ of the second processing data before the completion of the decrypting process of all block data ($C_1$ through $C_n$) of the first processing data. When the decryptor starts the decrypting process of the initial block data $D_1$ of the second processing data, the decryptor makes the above memory store the decrypting status of the first processing data, and when the decryptor restarts decrypting the first processing data, the status of the decryptor is returned to the decrypting status of the decryptor stored in the memory 75 and the decryptor restarts the decrypting process of the first processing data.

Further, the decryptor restarts the decrypting process of the first processing data before the completion of all block data ($D_1$ through $D_n$) of the second processing data, and the memory 74 stores the decrypting status of the second processing data when the decryptor restarts the decrypting process of the first processing data. When the decryptor restarts the decrypting process of the second processing data, the status of the decryptor is returned to the decrypting status of the second processing data stored in the memory and the decryptor restarts the decrypting process of the second processing data.

Here, the status of the encrypting process is, for example,

Encrypted block data $C_1$ (and the key $K_1$) in case of the CBC mode shown in FIG. 1, Module output data $T_1$ (and the key $K_1$) in case of the OFB mode shown in FIG. 16, and Encrypted block data $C_1$ (and the key $K_1$) in case of the CFB mode shown in FIG. 18. The decrypting status is, for example, Encrypted block data $C_1$ (and the key $K_1$) in case of the CBC mode shown in FIG. 20, Module output data $T_1$ (and the key $K_1$) in case of the OFB mode shown in FIG. 22, and Encrypted block data $C_1$ (and the key $K_1$) in case of the CFB mode shown in FIG. 24.

In the above description, the encryptor and the decryptor have been explained in cases of three modes, respectively. The three modes are only examples, the present embodiment can be applied to the encryptor and the decryptor in other mode such as improved mode or transformed mode. In particular, the characteristics of the embodiment is that in the encrypting/decrypting method, in which the block data $C_1$, $M_1$, or $T_1$ generated at the encrypting/decrypting time of the previous data are used for the encrypting/decrypting process of the next block data $M_{1+1}$ or $C_{1+1}$ as the feedback data, the memory 55 is provided for storing the status of the encrypting/decrypting process, so that the status of the encryptor/decryptor can be returned back to the original status using the block data $C_1$, $M_1$, or $T_1$ after encrypting/decrypting process of another piece of data. Accordingly, which encrypting/decrypting mode is used is out of question.

Here, instead of the interrupt IT, the request for encryption using other mechanism such as poling system or token obtainment system can be received, and an interactive parallel processing of at least two encrypting/decrypting processes can be performed.

Further, in the above embodiment, the encryption key K is used for encrypting/decrypting process, however, the embodiment can be applied to the encrypting/decrypting process without using the encryption key.

Embodiment 2

In the following embodiment, another case will be explained, in which the encryptor performs a confidentiality process and a data integrity ensuring process.

The data confidentiality process means to encrypt data in order to make the data meaningless even when the data is wiretapped or stolen. Further, the data integrity ensuring process means to ensure that the data is not replaced by anybody. In case of transferring data, the integrity of data sometimes needs to be ensured as well as performing the confidentiality process of data. The data confidentiality process is performed by encrypting the data. The data integrity ensuring process is performed by appending a MAC (Message Authentication Code) to the last bit of the data and checking the MAC to detect the tempering.

Figure 29:
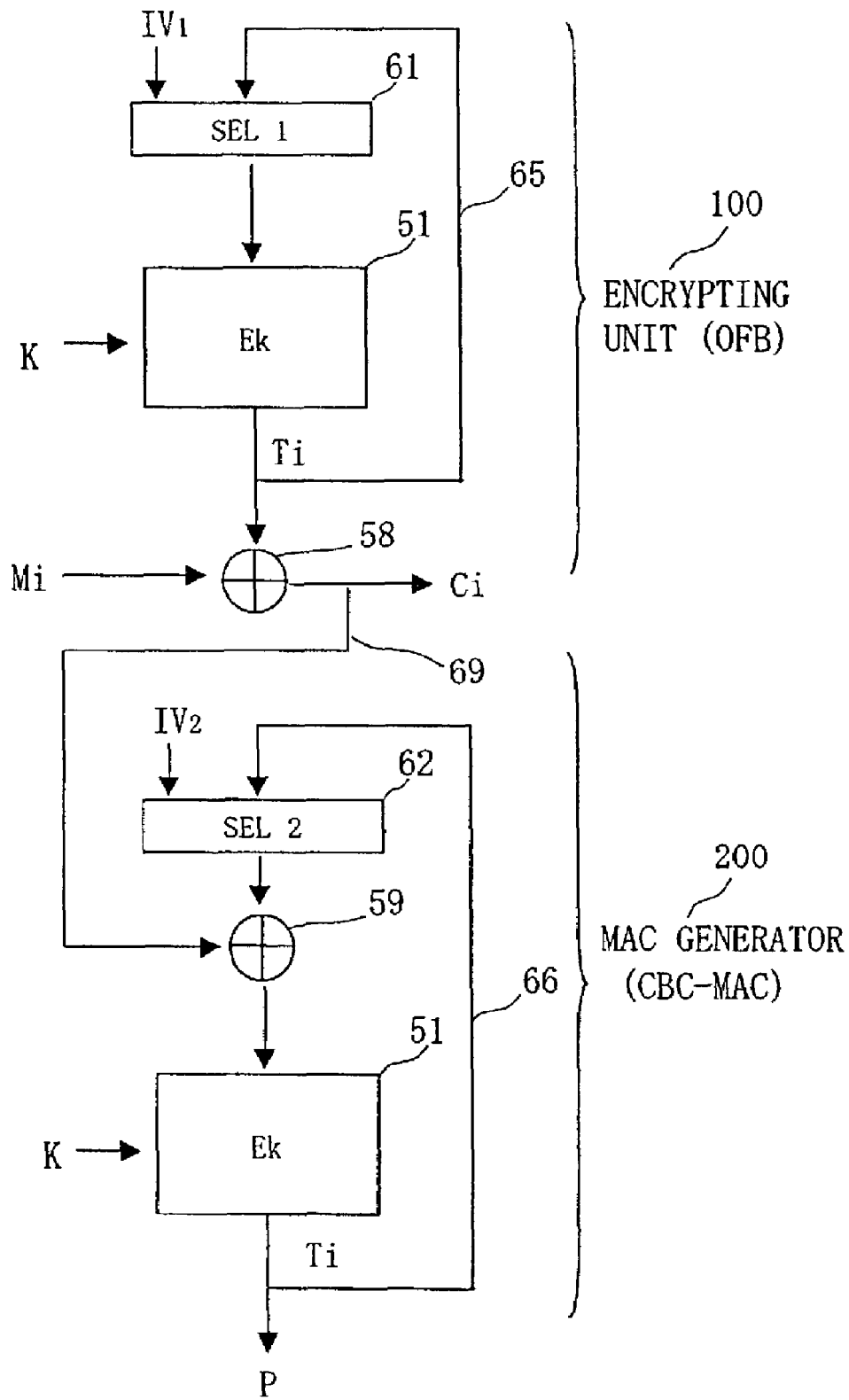
FIG. 29 shows an operation procedure of the decryptor of the CBC mode.

FIG. 29 shows a case in which an encrypting unit 100 of the OFB mode performs the confidentiality process, and a MAC generator 200 of the CBC mode generates the MAC.

FIG. 29 shows the encryptor which encrypts the plaintext data including at least one plaintext block data using the encrypting module and generates the MAC for ensuring the integrity of the ciphertext data. The encryptor includes an encrypting unit 100 having a first feedback loop 65 which feeds back the module output block data $T_1$ supplied from the encrypting module 51 at encrypting the plaintext block data by the encrypting module 51 to the encrypting module 51. The encrypting unit 100 inputs the plaintext block data, feeds back module output block data $T_1$ using the first feedback loop 65 to perform the encrypting process to output ciphertext block data $C_1$. The encryptor includes a MAC generator 200 having a second feedback loop 66 which feeds back a computed intermediate MAC result $T_1$. The MAC generator 200 inputs the ciphertext block data $C_1$ at every output of the ciphertext block data $C_1$ from the encrypting unit 100, computes the MAC, makes the computed intermediate MAC result $T_1$ feedback using the second feedback loop 66, and generates a MAC P to ensure the integrity of the ciphertext data.

Figure 30:
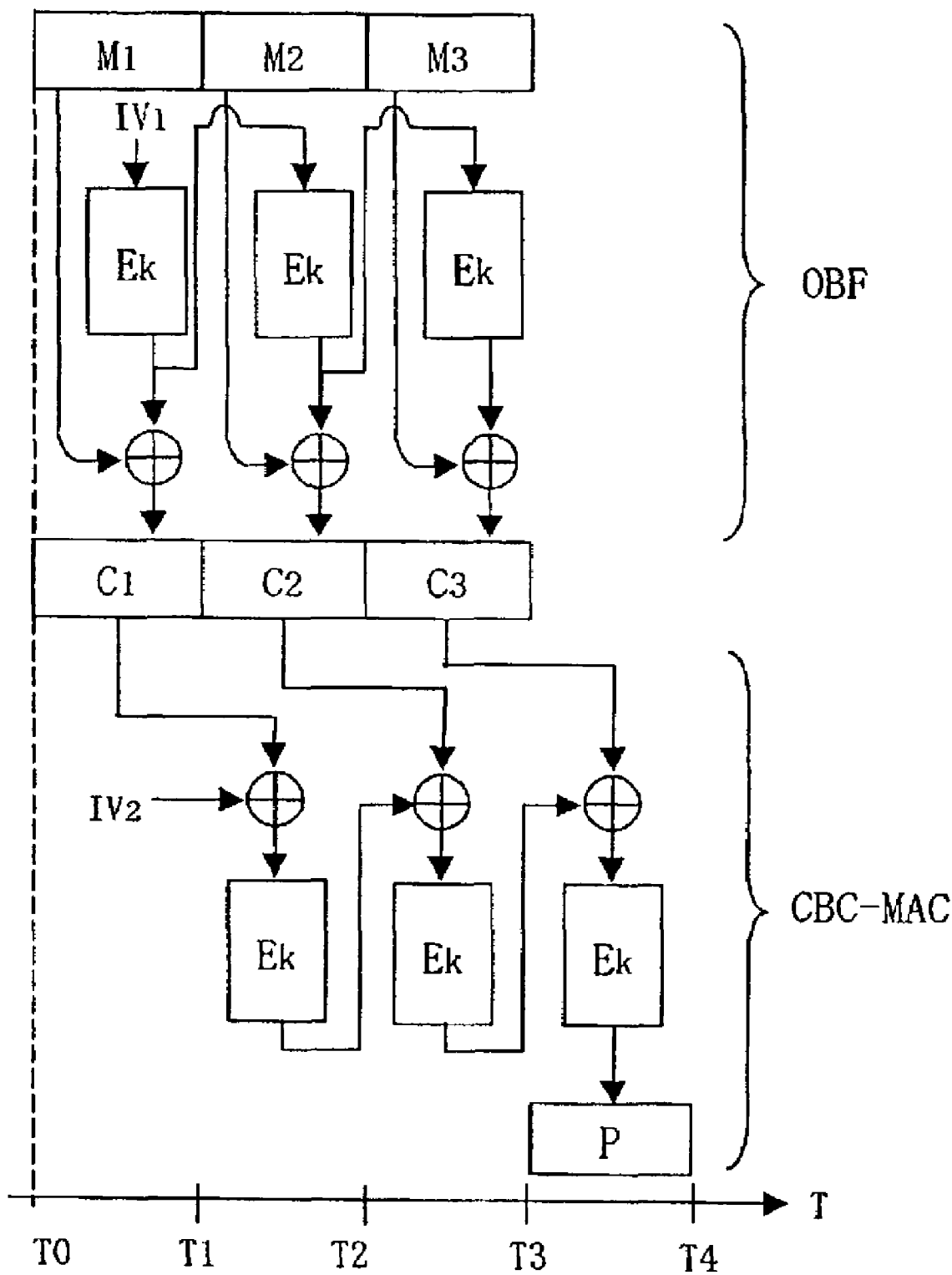
FIG. 30 shows an operation procedure of an encryptor having an encrypting unit 100 and a MAC generator 200.

FIG. 30 shows an operation procedure of the encryptor shown in FIG. 29.

The plaintext block data $M_1$ is first encrypted into the ciphertext block data $C_1$. Next, the plaintext block data $M_2$ is input to be encrypted into the ciphertext block data $C_2$. Simultaneously to the encryption of the plaintext block data $M_1$, the ciphertext block data $C_1$ is input and the computation of the MAC is started. Between time T1 and time T2, the encrypting process of the plaintext block data $M_2$ and the computation of the MAC based on the ciphertext block data $C_1$ are performed. Between time T2 and time T3, the encrypting process of the plaintext block data $M_3$ and the computation of the MAC based on the ciphertext block data $C_2$ are performed. At time T3, the computation of the MAC based on the ciphertext block data $C_3$ is performed and the MAC P is output.

Figure 52:
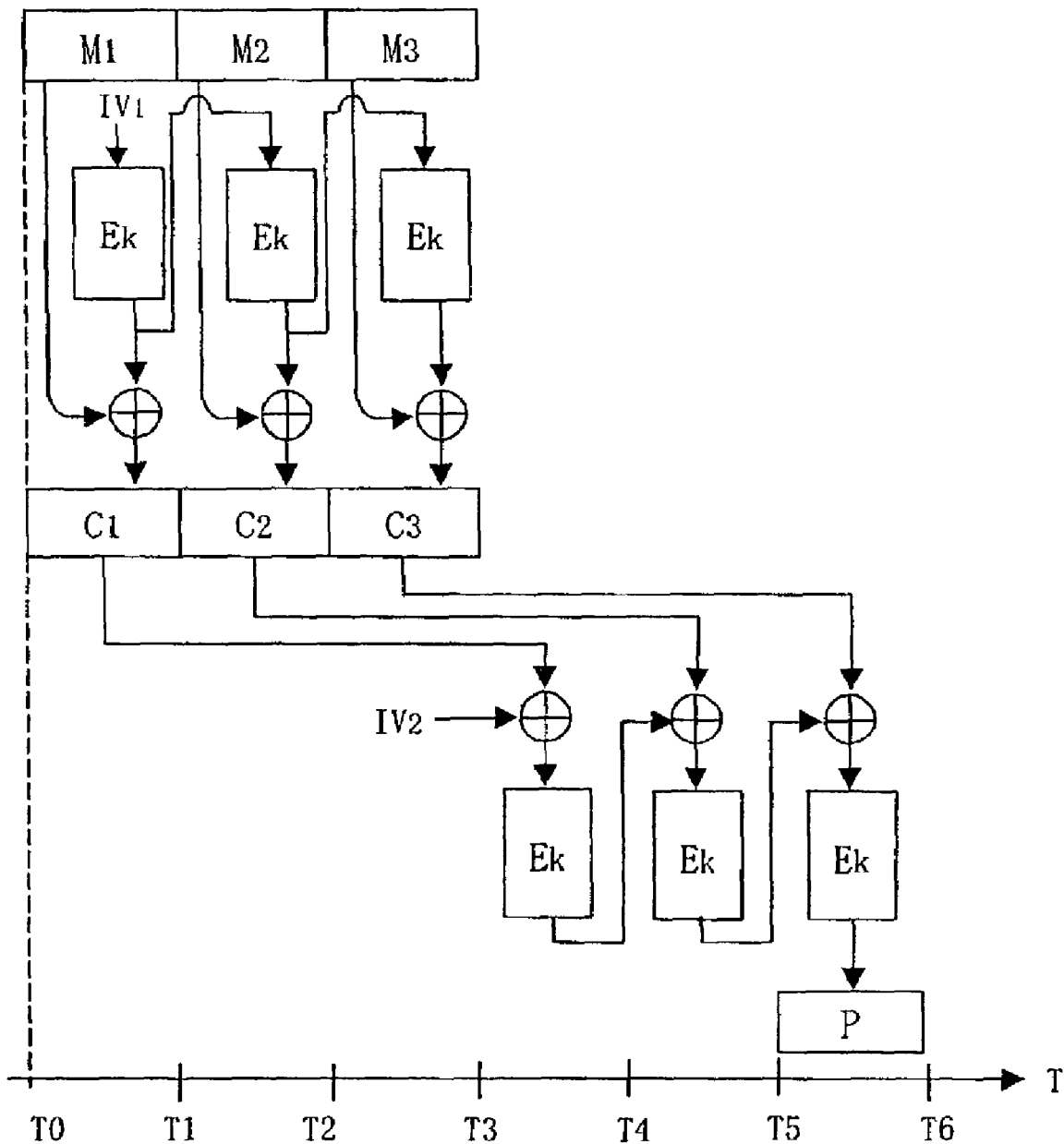
FIG. 52 shows an operation procedure of a conventional confidentiality process and a conventional integrity ensuring process.

The configuration of FIG. 29 is characterized by that the ciphertext block data $C_1$ output from the XOR circuit 58 is input to the XOR circuit 59 by a feed line 69. The feed line 69 combines the encrypting processes of the OFB mode and the CBC mode, so that the confidentiality process and the integrity ensuring process are performed by pipeline processing. In case of FIG. 52, the process at time T6 requires much processing time, however, in case of FIG. 30, the processing is finished at time T4, which shows a high speed processing has been done.

Figure 31:
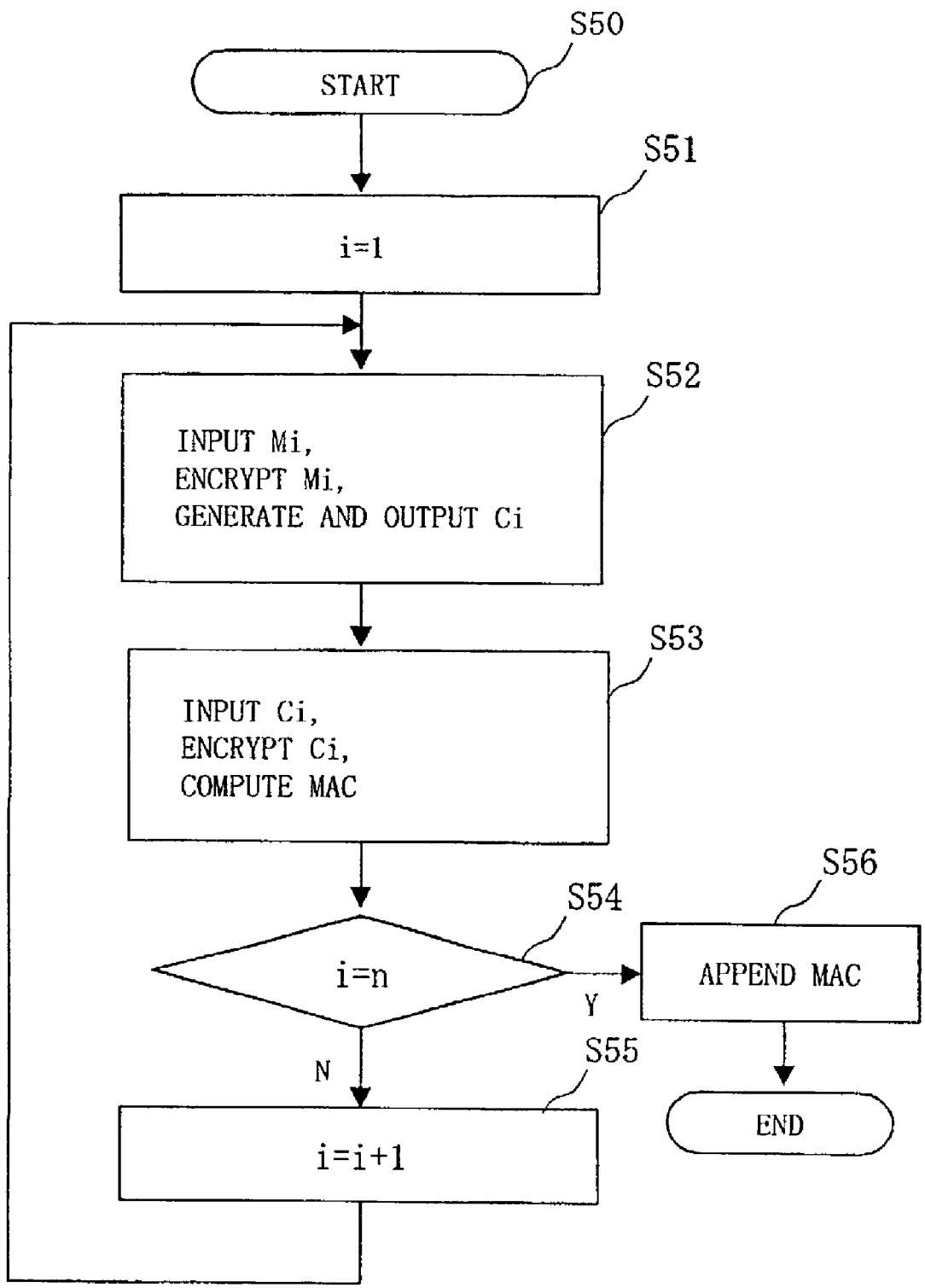
FIG. 31 shows a flowchart of an encryptor having an encrypting unit 100 and a MAC generator 200.

FIG. 31 is a flow diagram showing the operation of the encryptor shown in FIG. 29.

At S51, a block data counter i is initialized to 1. S52 shows the operation of the encrypting unit 100. The encrypting unit 100 inputs the plaintext block data $M_1$, encrypts the plaintext data $M_1$ into the ciphertext block data $C_1$, and outputs the ciphertext block data $C_1$. S53 shows the operation of the MAC generator 200. The MAC generator 200 inputs and encrypts the ciphertext block data $C_1$ and computes the MAC. S54 checks if the block data counter i indicates the last block data n. When the counter doesn't, the block data counter i is incremented at S55, and the operation is returned back to the process of S52. Namely, the processes of the encrypting unit 100 and the MAC generator 200 are repeated. When it is detected at S54 that the process of the last block data is completed, the last MAC computed at S53 becomes the final MAC, and the final MAC is appended to the last bit of the ciphertext block data $C_1$ at S56. As shown in FIG. 31, at every generation of the ciphertext block data $C_1$ by the encrypting unit 100, the MAC generator 200 inputs the ciphertext block data $C_1$ to compute the MAC, which enables the pipeline processing at a high speed.

Figure 32:
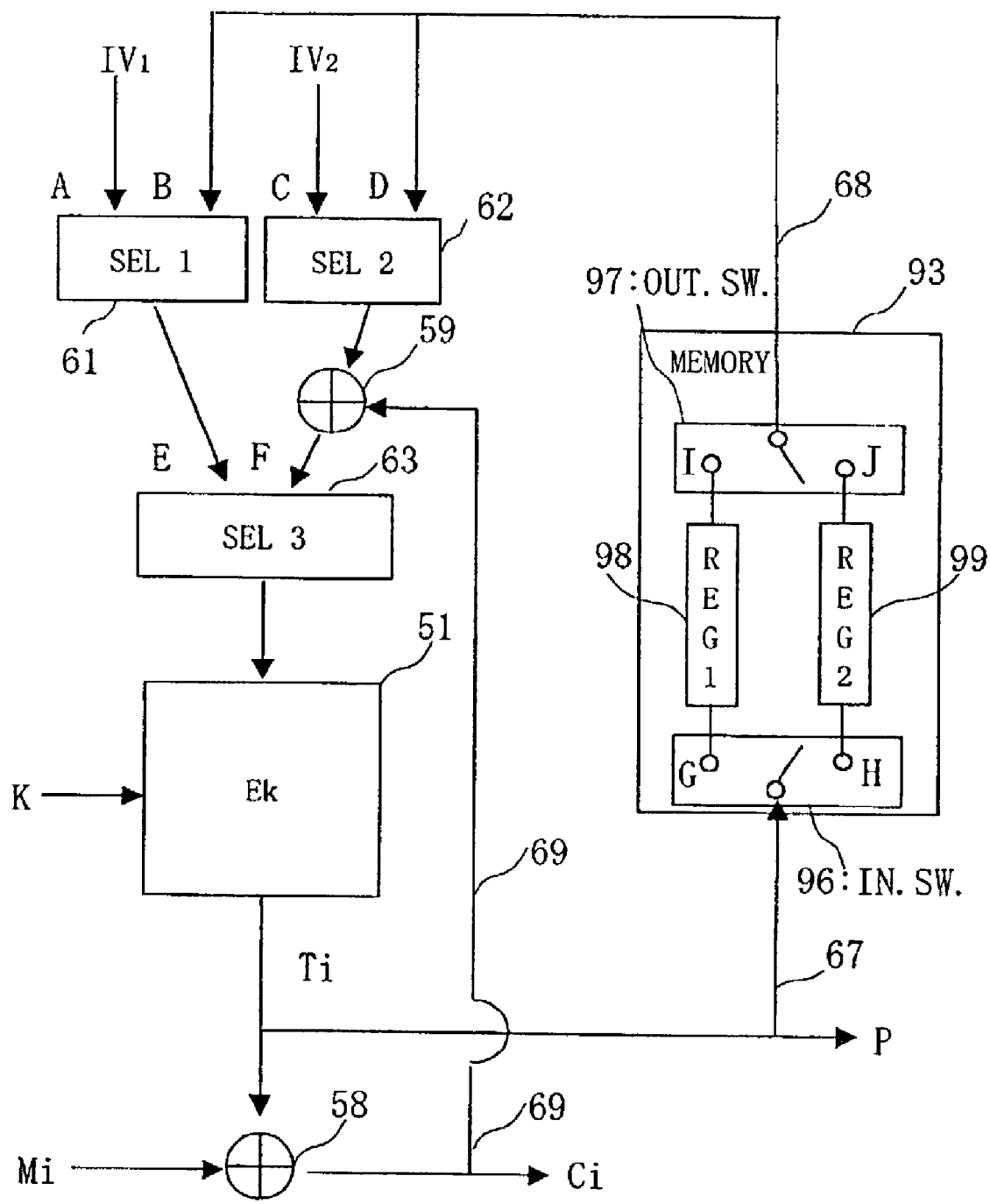
FIG. 32 shows an encryptor in which an encrypting unit 100 and a MAC generator 200 are united as one unit.

FIG. 32 shows a configuration combining the encrypting unit 100 and the MAC generator 200 shown in FIG. 29. That is, the encrypting module 51 is shared by the encrypting unit 100 and the MAC generator 200, and the XOR circuit is used as the XOR circuit 58 of the encrypting unit 100 and the XOR circuit 59 of the MAC generator 200. Further, the feedback line is used as both the feedback line 65 of the encrypting unit 100 and the feedback line 66 of the MAC generator 200.

A first selector 61 selects an initial value IV at starting time of the confidentiality process. A second selector selects the initial value IV at the starting time of the integrity ensuring process. A third selector 63 alternately selects the confidentiality process and the integrity ensuring process. The confidentiality process can be performed by setting the input of the third selector to E. Further, the integrity ensuring process can be performed by setting the input of the third selector to F.

A memory 93 stores the module output data $T_1$ output from the encrypting module 51 using the encryption key K. The memory 93 includes an input switch 96, an output switch 97, a first register 98, and a second register 99. The input switch 96 and the output switch 97 are synchronized with switching the third selector 63. At every switching of the third selector 63, both the input switch 96 and the output switch 97 are switched.

Figure 33:
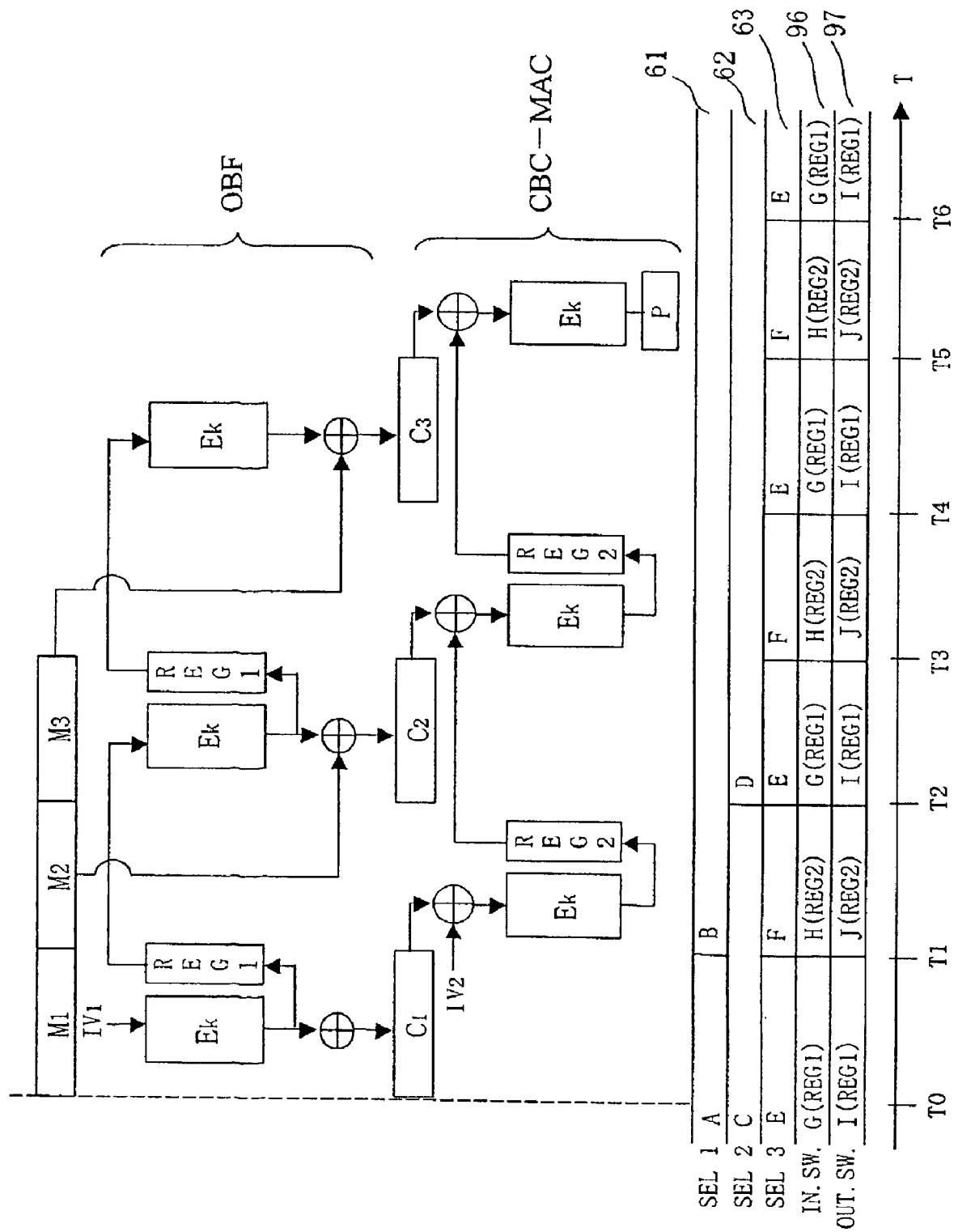
FIG. 33 shows an operation procedure of the encryptor in which an encrypting unit 100 and a MAC generator 200 are united as one unit.

FIG. 33 shows an operation procedure of the encryptor shown in FIG. 32.

Between time T0 and time T1, the confidentiality process of the plaintext block data $M_1$ is performed. The module output data generated during the confidentiality process is stored in the first register 98. Between time T1 and time T2, the MAC is computed based on the ciphertext block data $C_1$. The computed intermediate MAC result generated by the integrity ensuring process is stored in the second register 99. Next, between time T2 and time T3, the confidentiality process of the plaintext block data $M_2$ is performed based on the module output data stored in the first register 98 and the plaintext block data $M_2$. Then, between time T3 and time T4, the computed intermediate MAC result stored in the second register 99 and the ciphertext block data $C_2$ are input and the MAC is computed. By repeating these operations, the confidentiality process and the integrity ensuring process are completed and the ciphertext data and the MAC P are output. In case of FIG. 33, the process is finished at time T6 and the processing time is not reduced. However, as shown in FIG. 32, the encrypting module 51 using the encryption key K, the XOR circuit 58, and the feedback line 67, 68 (feedback loop) are shared by the encrypting unit and the MAC generator, so that the circuit scale can be reduced.

Figure 34:
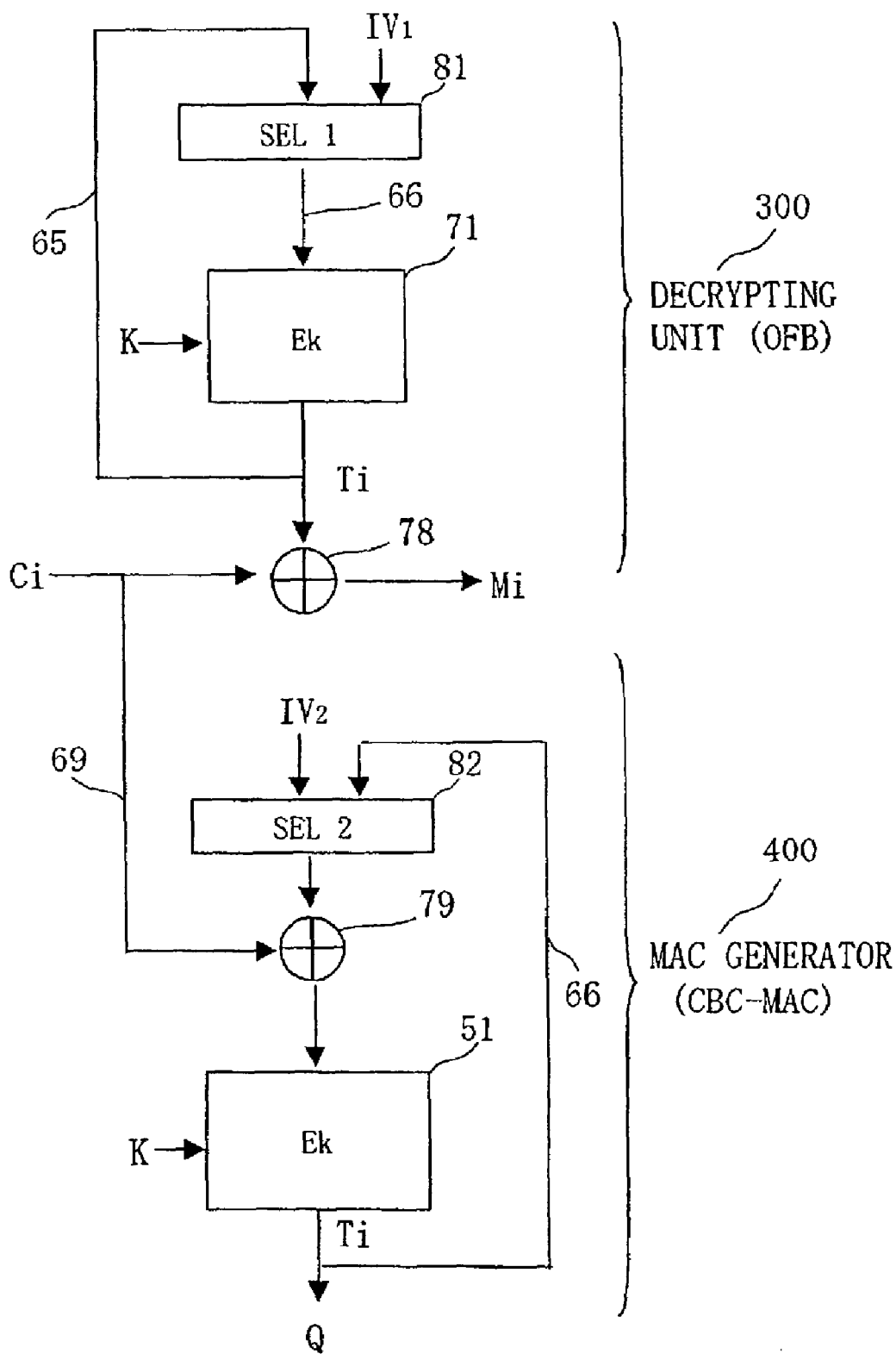
FIG. 34 shows a decryptor having a decrypting unit 300 and a MAC generator 400.

FIG. 34 shows a decryptor including a decrypting unit 300 of the OFB mode and a MAC generator 400 of the CBC mode.

The MAC generator 400 is configured the same as the MAC generator 200.

FIG. 34 shows the decryptor which decrypts the ciphertext data including at least one ciphertext block data into the plaintext data and generates the MAC for ensuring the integrity of the ciphertext data. The decryptor includes a decrypting unit 300 having a first feedback loop 65 which feeds back the module output block data $T_1$ generated at decrypting process of the ciphertext block data $C_1$ using the decrypting module 71. The decrypting unit 300 inputs the ciphertext block data $C_1$ makes the module output block data $T_1$ feedback by the first feedback loop 65 to decrypt and outputs the plaintext block data $M_1$. The decryptor further includes a MAC generator 400 having a second feedback loop 66 which feeds back the computed intermediate MAC result $T_1$. The MAC generator 400 inputs the same ciphertext block data with the ciphertext block data $C_1$ input to the decrypting unit 300, performs the MAC computation to output the computed intermediate MAC result, makes the second feedback loop 66 feedback the computed intermediate MAC result $T_1$, and generates the MAC Q for ensuring the integrity of the ciphertext data.

The ciphertext block data $C_1$ is input to the XOR circuit 78 of the decrypting unit 300, and at the same time, the ciphertext block data $C_1$ is input to the MAC generator 400 by the feed line 69. By this configuration, the processes of the decrypting unit 300 and the MAC generator 400 are performed simultaneously, so that the processing speed can be increased.

Figure 35:
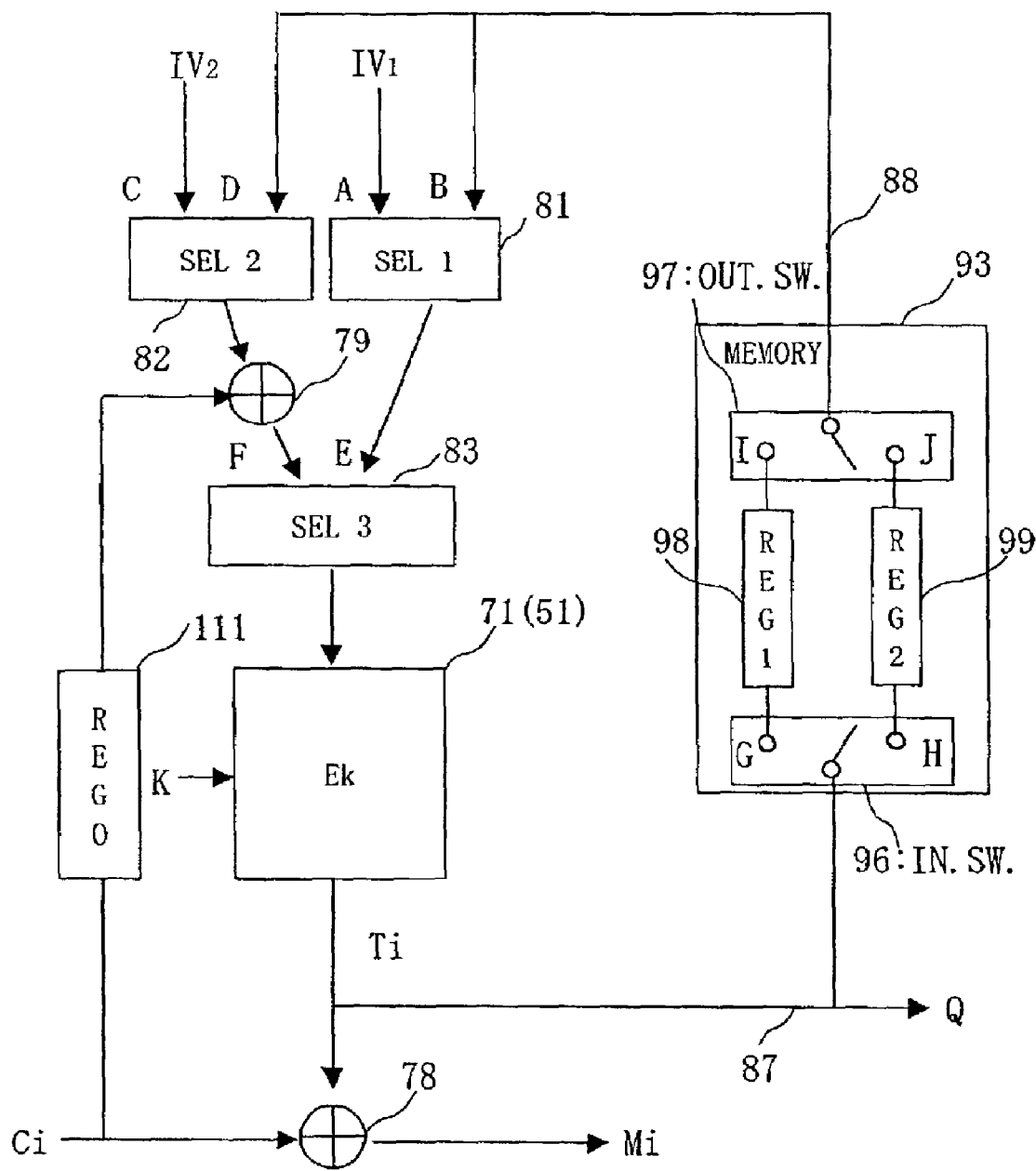
FIG. 35 shows a decryptor in which a decrypting unit 300 and a MAC generator 400 are united as one unit.

FIG. 35 shows a configuration to which the decrypting unit 300 and the MAC generator 400 of the decryptor shown in FIG. 34 are integrated.

FIG. 35 shows a case in which the decrypting module 71 and the feedback lines 87, 88 (feedback loop) are shared.

A first selector 81 selects the initial value IV at starting time of the decrypting process. A second selector 82 selects the initial value IV at starting time of the integrity ensuring process. A third selector 83 alternately selects the decrypting process and the integrity ensuring process. The decryption can be performed by setting the input of the third selector 83 to E. Further, the integrity ensuring process can be performed by setting the input of the third selector 83 to F.

The memory 93 stores the module output data $T_1$ output from the encrypting module 51 using the encryption key K. The memory 93 includes an input switch 96, an output switch 97, a first register 98, and a second register 99. The input switch 96 and the output switch 97 are synchronized to switching of the third selector 83. At every switching of the third selector 83, the input switch 96 and the output switch 97 are also switched.

Figure 36:
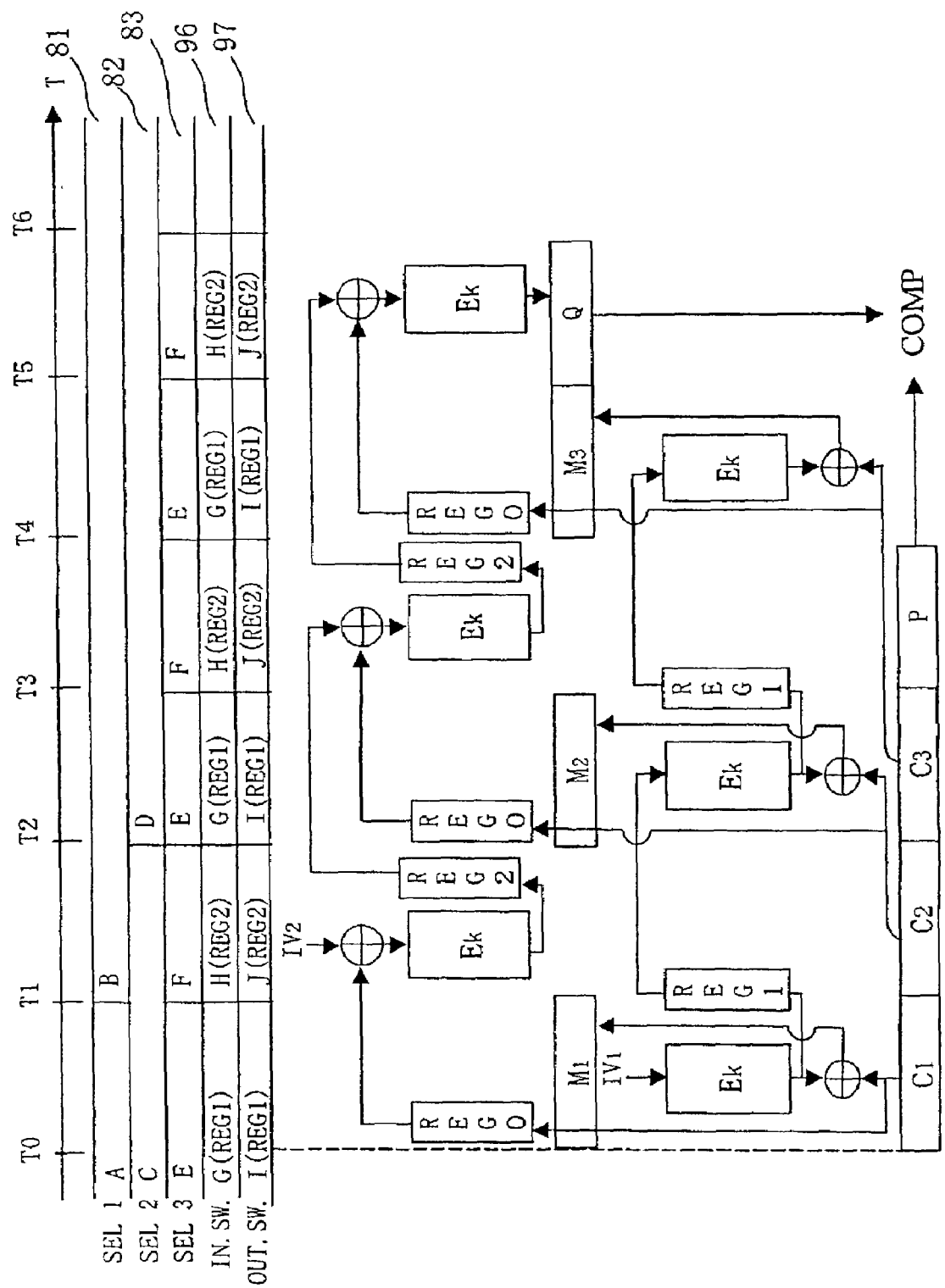
FIG. 36 shows an operation procedure of the decryptor in which a decrypting unit 300 and a MAC generator 400 are united as one unit.

FIG. 36 shows an operation procedure of the decryptor shown in FIG. 35.

The decryptor inputs the ciphertext data and the MAC P.

Between time T0 and time T1, the ciphertext block data $C_1$ is decrypted and the ciphertext block data $C_1$ is stored in the register 111. The module output data generated during the decrypting process is stored in the register 98. Between time T1 and time T2, the MAC is computed based on the ciphertext block data $C_1$ stored in the register 111. The computed intermediate MAC result generated during the integrity ensuring process is stored in the second register 99. Next, between time T2 and time T3, the ciphertext block data $C_2$ is stored in the register 111, the decrypting process of the plaintext block data $M_2$ is performed based on the module output data stored in the first register 98 and the ciphertext block data $C_2$. Then, between time T3 and time T4, the computed intermediate MAC result stored in the second register 99 and the ciphertext block data $C_2$ stored in the register 111 are input and the MAC is computed. By repeating these operations, the plaintext data and the MAC Q are output. The MAC Q is compared with the MAC P. If the MAC P matches the MAC Q, the integrity of the data can be ensured. Thus, the decrypting process and the integrity ensuring process are completed.

Figure 37:
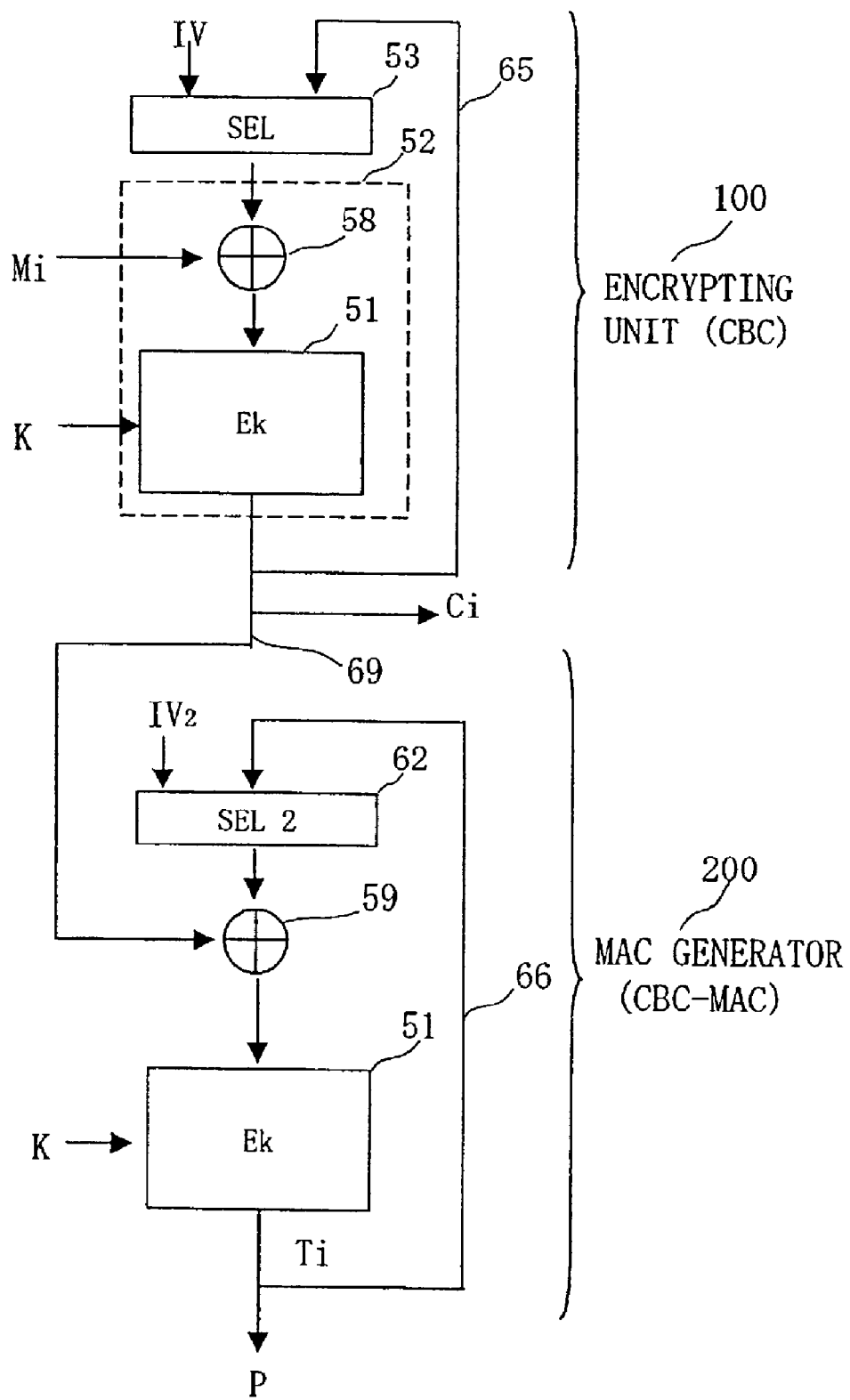
FIG. 37 shows an encryptor having an encrypting unit 100 and a MAC generator 200 according to the second embodiment.

FIG. 37 shows a configuration in which the encrypting unit 100 of the CBC mode is used instead of the encrypting unit 100 of the OFB mode shown in FIG. 29.

FIG. 37 shows the encryptor which encrypts the plaintext data including at least one plaintext block data using the encrypting module and generates the MAC for ensuring the integrity of the ciphertext data. The encryptor includes an encrypting unit 100 having a first feedback loop 65 which feeds back the ciphertext block data $C_1$ output from the encrypting module 51 at encrypting time of the plaintext block data by the encrypting unit 52. The encrypting unit 100 inputs the plaintext block data $M_1$, makes the ciphertext block data $C_1$ feedback using the first feedback loop 65 to perform the encrypting process, and outputs the ciphertext block data $C_1$. The encryptor further includes a MAC generator 400 having a second feedback loop 66 which feeds back a computed intermediate MAC result $T_1$. The MAC generator 200 inputs the ciphertext block data $C_1$ at every output of the ciphertext block data $C_1$ from the encrypting unit 100, computes the MAC, makes the computed intermediate MAC result $T_1$ feedback using the second feedback loop 66, and generates a MAC P to ensure the integrity of the ciphertext data.

Figure 38:
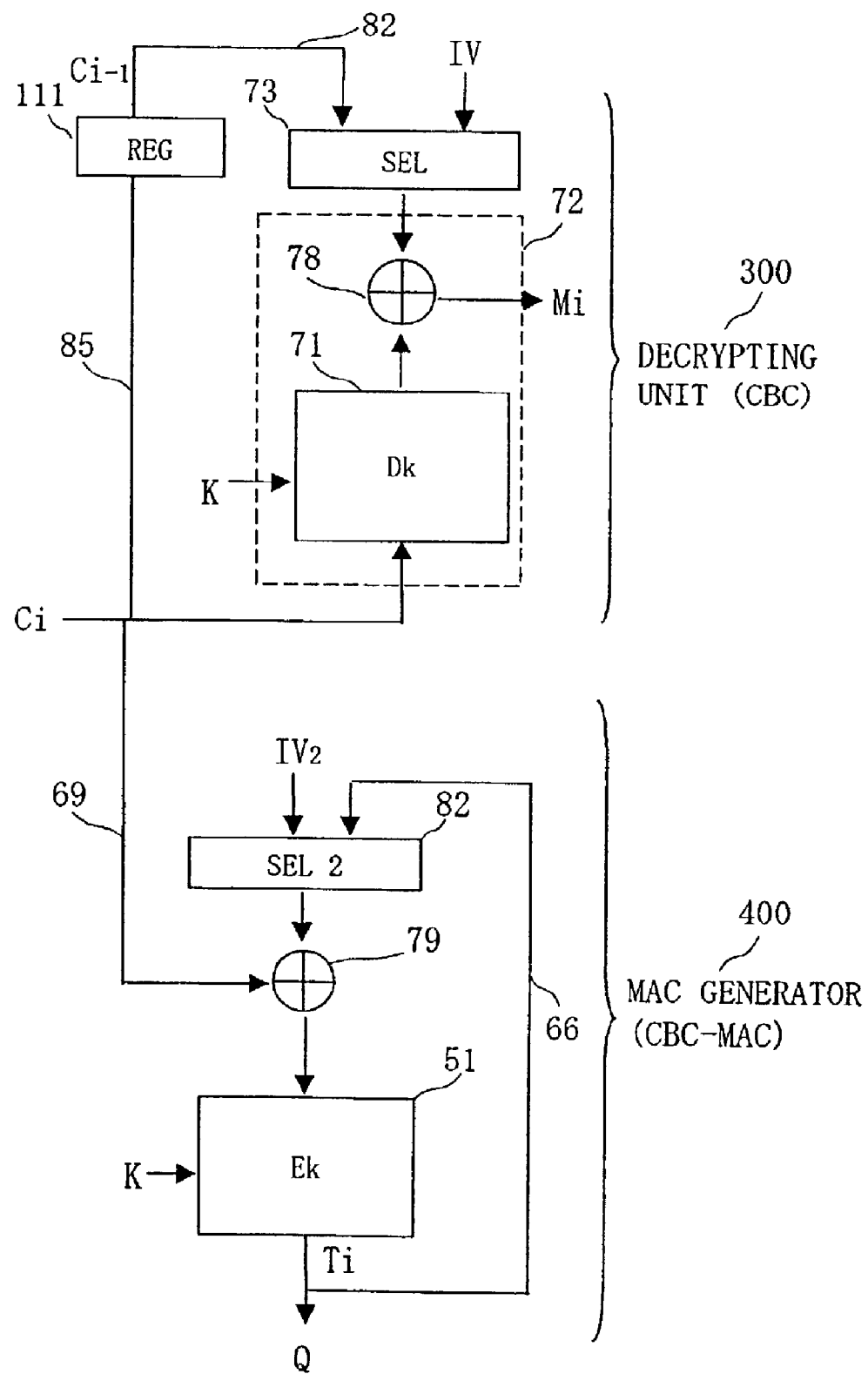
FIG. 38 shows a decryptor having a decrypting unit 300 and a MAC generator 400.

FIG. 38 shows a configuration in which the decrypting unit 300 of the CBC mode is provided instead of the decrypting unit 300 of the OFB mode shown in FIG. 34.

FIG. 38 shows the decryptor which decrypts the ciphertext data including at least one ciphertext block data into the plaintext data and generates the MAC for ensuring the integrity of the ciphertext data. The decryptor includes a decrypting unit 300 having a first feedback loops 85, 82 for feeding back the ciphertext block data $C_1$, and the decrypting unit 300 inputs the ciphertext block data $C_1$ and makes the ciphertext block data $C_1$ feedback by the first feedback loops 85, 82 to decrypt, and outputs the plaintext block data $M_1$. The decryptor further includes a MAC generator 400 having a second feedback loop 66 for feeding back the computed intermediate MAC result $T_1$, and the MAC generator 400 inputs the ciphertext block data $C_1$ being identical to the ciphertext block data $C_1$ input to the decrypting unit 300, computes the MAC outputs the computed intermediate MAC result $T_1$, makes the computed intermediate MAC result $T_1$ feedback by the second feedback loop, and generates the MAC for ensuring the integrity of the ciphertext data.

As described above, FIGS. 29 and 37 show the encryptors, each of which includes the encrypting unit inputting data to encrypt and outputting the data and the MAC generator inputting the encrypted data output from the encrypting unit and generating the MAC for ensuring the integrity of the ciphertext data, wherein the MAC generator starts generating the MAC before the encryption of the data is completed by the encrypting unit.

Further, FIGS. 34 and 38 show the decryptors, each of which includes the decrypting unit inputting the data to decrypt and outputting the data and the MAC generator inputting the data input by the decrypting unit and generating the MAC for ensuring the integrity of the ciphertext data, wherein the MAC generator starts generating the MAC before the decryption of the data is completed by the decrypting unit.

The encrypting unit 100 or the decrypting unit 300 of the OFB mode, which are not shown in the figures, can be used in the above encryptor/decryptor.

The MAC generator 200 of the OFB mode or the CFB mode, which are not shown in the figures, can be used in the above encryptor/decryptor.

Figure 39:
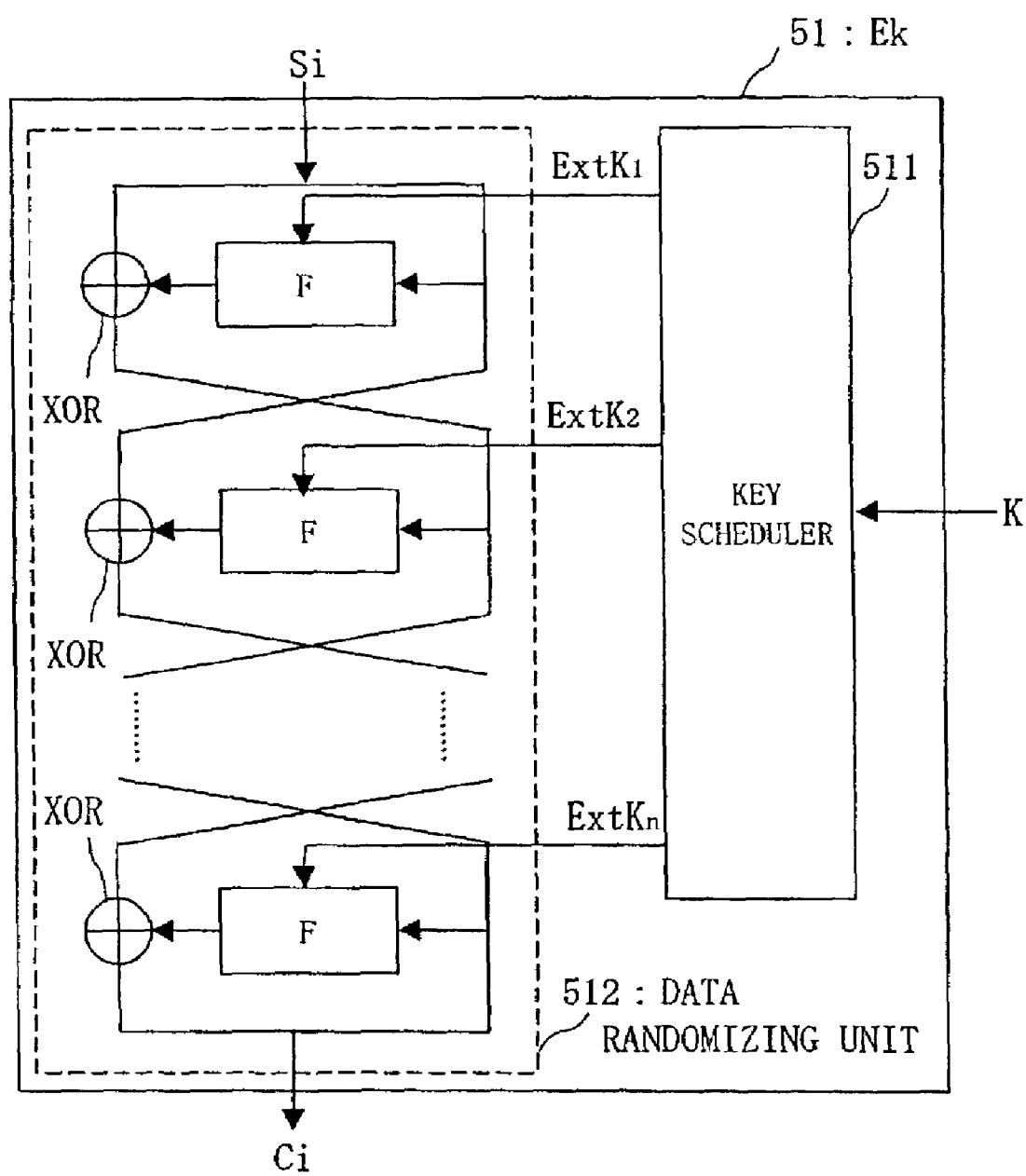
FIG. 39 shows a model configuration of an encrypting module 51 using an encryption key K.

FIG. 39 shows a configuration of the encrypting module 51 or the decrypting module 71.

The encrypting module 51 includes a key scheduler 511 and a data randomizer 512. The key scheduler 511 inputs one key K to generate n number of extended keys $ExtK_1$ through $ExtK_n$. The data randomizer 512 generates a random number using a function F and an XOR circuit. The function F inputs the extended key and performs non-linear transformation of the data.

In the encrypting module 51 of the above encryptor, the block cipher algorithm such as:

(1) DES (Data Encryption Standard),
(2) MISTY, the block cipher algorithm disclosed by the International Patent Publication No. WO97/9705 (U.S. patent application Ser. No. 08/83640),
(3) KASUMI, 64-bit block cipher developed based on the block cipher algorithm MISTY, which was determined to be applied to the International standard cipher for next generation cellular phone (IMT2000) (more in detail, please visit http://www.3gpp.org/About_3GPP/3gpp.htm), or
(4) Camellia, the block cipher algorithm disclosed in the Japanese patent application No. 2000-64614 (filed on Mar. 9, 2000). Further, in the decrypting module of the decryptor, the block cipher algorithm such as DES, MISTY, KASUMI, or Camellia can be applied.

Figure 40:
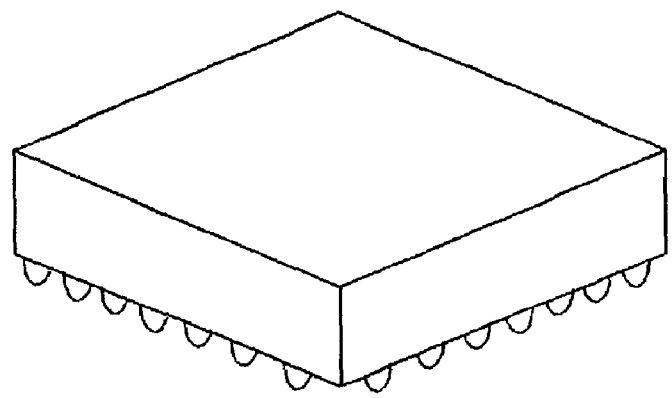
FIG. 40 shows an implementation example of a hardware of an encryptor and a decryptor.

FIG. 40 shows an implementation form of the encryptor or the decryptor.

FIG. 40 shows a case in which the encryptor and the decryptor are installed in FPGA, IC, or LSI. Namely, the above-mentioned encryptor and decryptor can be implemented by the hardware. Further, the encryptor and the decryptor can be implemented by a printed circuit board, which is not shown in the figure.

Figure 41:
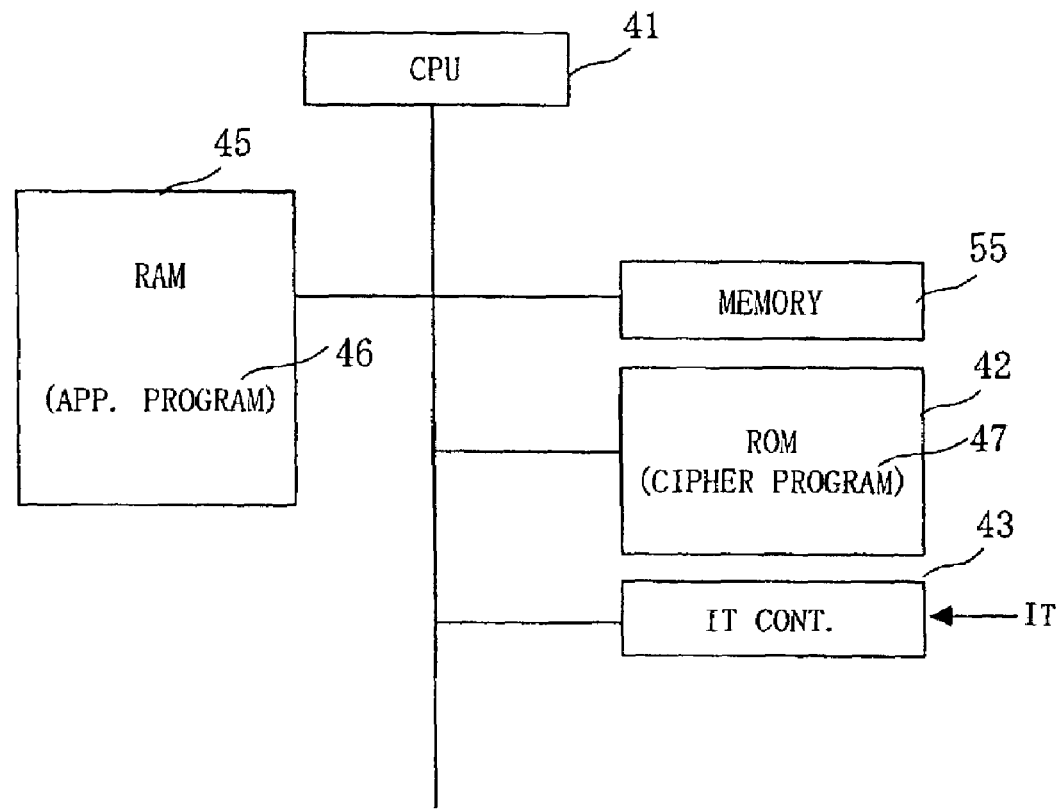
FIG. 41 shows an implementation example of a hardware of an encryptor and a decryptor.

FIG. 41 shows a case in which the encryptor and the decryptor are implemented by the software.

The above encryptor can be implemented by a cipher program 47. The cipher program 47 is stored in ROM (Read Only Memory) 42 (an example of the storage). The cipher program 47 can be stored in other kind of storage such as RAM (Random Access Memory), a flexible disk, or a fixed disk. Further, the cipher program 47 can be downloaded from a server computer. The cipher program 47 operates as a sub-routine. The cipher program 47 is called from an application program 46 stored in the RAM 45 by a sub-routine call and the cipher program 47 is executed. Or, the cipher program 47 can be activated by generation of an interrupt received by the interrupt control unit 43. The memory 55 can be a part of the RAM 45. The application program 46 and the cipher program 47 are programs executed by the CPU.

Figure 42:
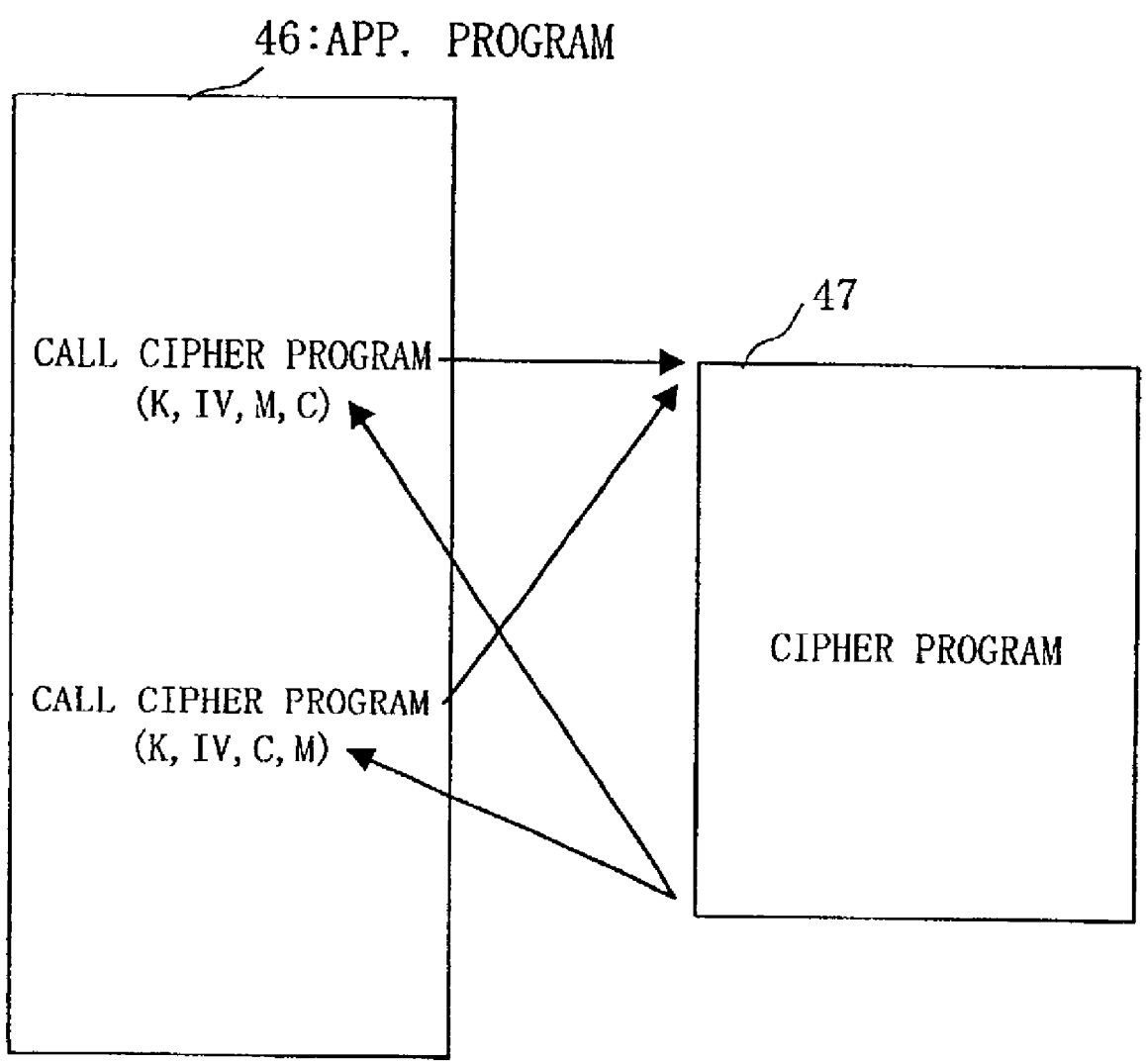
FIG. 42 shows a case in which an cipher program 47 is called by an application program 46.
Figure 43:
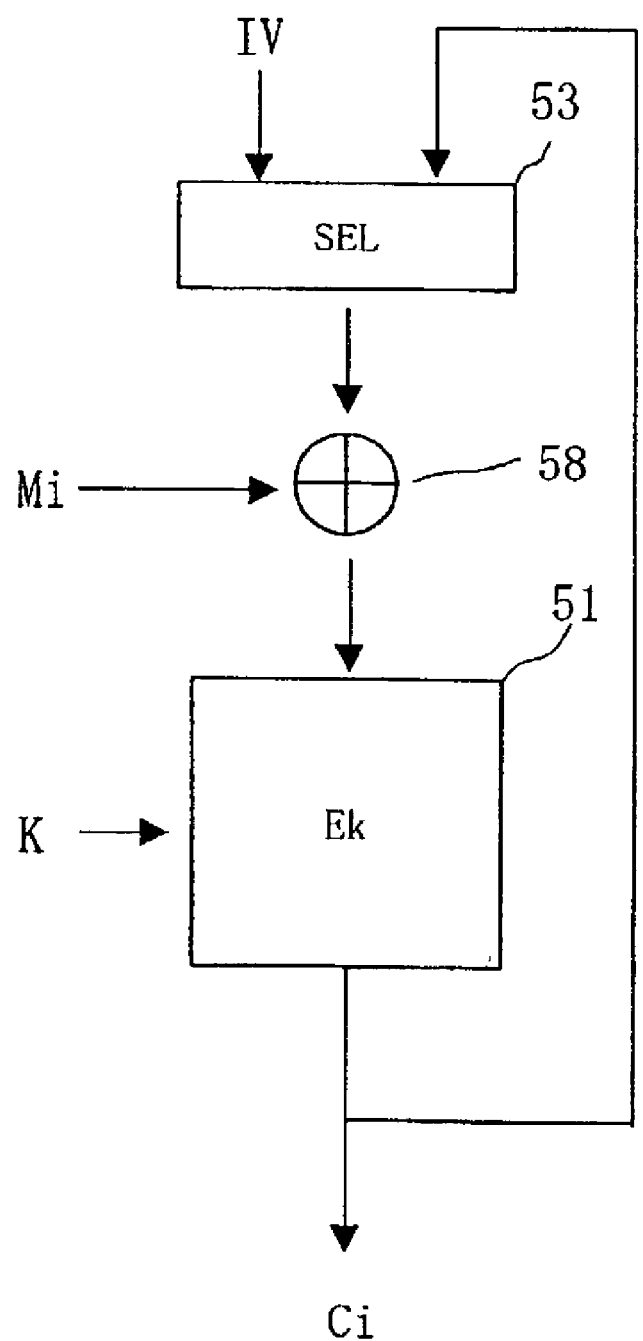
FIG. 43 shows a conventional encryptor of the CBC mode.

FIG. 42 shows a mechanism by which the application program 46 calls the cipher program 47.

The application program 46 calls the cipher program 47 using the key K, the initial value IV, the plaintext data M, and the ciphertext data C as parameters. The cipher program 47 inputs the key K, the initial value IV, and the plaintext data M and returns the ciphertext data C. When the cipher program 47 and the decipher program are the same, the cipher program is called using the key K, the initial value IV, the ciphertext data C, and the plaintext data M as parameters.

The cipher program 47 can be implemented by a digital signal processor and a program which is read and executed by the digital signal processor. Namely, the cipher program 47 can be implemented by the combination of the hardware and the software.

FIGS. 40, 41, and 42 mainly explain cases for the encryptor, however, the decryptor can be implemented in the same manner.

The encryptor and the decryptor shown in FIGS. 40 and 41 can be installed in an electronic device. For example, the encryptor and the decryptor can be installed in all kinds of the electronic devices such as a personal computer, a facsimile machine, a cellular phone, a video camera, a digital camera, a TV camera. In particular, the characteristics of the present embodiment can be effectively drawn in case of encrypting/decrypting the data from plural channels. Or the application of the embodiment is effective when plural pieces of data are received from plural users to be decrypted, when plural pieces of data are generated from plural users at random and the data should be encrypted in real time. Namely, the encryptor and the decryptor of the embodiment are really effective when the number of the devices for encrypting/decrypting is small compared with the number of pieces of data to be encrypted/decrypted. For example, the encryptor and the decryptor are very effective for the server computer which requires to support many client computers, a base station or a line controller which requires to collect data from lots of cellular phones.

Instead of parallel processing of encrypting processes and decrypting processes, the encrypting process and the decrypting process can be performed in parallel.

Further, the above explanation shows a case of the combination of the encrypting unit (or the decrypting unit) of the OFB mode and the MAC generator of the CBC mode, however, any combination of modes can be used such as the OFB mode, the CBC mode, the CFB mode, improved mode of these modes, and so on.

Further, the above explanation shows a case in which the MAC generator performs encryption using the encryption key K, however, the MAC generator can perform the data scrambling, the data calculation, or other data processing.

INDUSTRIAL APPLICABILITY

As has been described, according to the preferred embodiment of the present invention, the encrypting process of the plaintext data N can be started during the encrypting process of the plaintext data M. Further, the decrypting process of the ciphertext data D can be started during the decrypting process of the ciphertext data C.

Further, according to the preferred embodiment of the present invention, priorities can be assigned to the data to be encrypted/decrypted, a high speed processing can be performed based on the priorities of the data.

Yet further, according to the preferred embodiment of the present invention, the confidentiality process and the integrity ensuring process can be performed in parallel, which enables a high speed processing. Further, the confidentiality process and the integrity ensuring process can be performed by one integrated hardware.

The invention claimed is:

1. An encrypting apparatus encrypting first processing data and second processing data comprising:
   a memory for storing a status of an encrypting process of a particular processing data,
   wherein the encrypting apparatus starts an encrypting process of the second processing data before an encrypting process of the first processing data is completed, thereby interrupting the encryption process of the first processing data between two logically continuous data elements in the first processing data,
   the encrypting apparatus causes the memory to store the status of the encrypting process of the first processing data when the encrypting apparatus starts the encrypting process of the second processing data,
   the encrypting status of the encrypting apparatus is returned to the status of the encrypting process of the first processing data stored in the memory when the encrypting apparatus restarts encrypting the first processing data, and
   the first processing data are a first logically continuous set of data elements, and the second processing data are a second logically continuous set of data elements.

2. The encrypting apparatus of claim 1, wherein the encrypting apparatus restarts the encrypting process of the first processing data before the encrypting process of the second processing data is completed,
   the memory stores the status of the encrypting process of the second processing data when the encrypting apparatus restarts the encrypting process of the first processing data,
   the encrypting status of the encrypting apparatus is returned to the status of the encrypting process of the second processing data stored in the memory when the encrypting apparatus restarts encrypting process of the second processing data.

3. The encrypting apparatus of claim 1, wherein the first processing data is a set of consecutive plaintext data blocks and the second processing data is another set of consecutive plaintext data blocks.

4. The encrypting apparatus of claim 1, the encrypting apparatus starts encrypting process of the second processing data in response to receiving an interrupt.

5. The encrypting apparatus of claim 1, wherein the encrypting process is performed using block cipher algorithm.

6. The encrypting apparatus of claim 1, wherein the memory stores an intermediate encrypting result of the first processing data and an encryption key to be used for encrypting the first processing data as the status of the encrypting process.

7. An encrypting apparatus encrypting plaintext data M including plaintext block data $M_i$ (i=1, 2, 3, . . . , I; where I is an integer) and plaintext data N including plaintext block data $N_j$ (j=1, 2, 3, . . . , J; where J is an integer), the encrypting apparatus comprising:

a mechanism for receiving a request to encrypt the plaintext data N during an encrypting process of the plaintext data M;

an encrypting unit for encrypting the plaintext block data $M_i$ to output ciphertext block data $C_i$ (i=1, 2, 3, ..., I; where I is an integer);

a feedback loop for feeding back the ciphertext block data $C_i$ output from the encrypting unit to the encrypting unit through a feedback line;

a memory, provided in parallel with the feedback line of the feedback loop, for receiving a request to encrypt the plaintext data N and storing the ciphertext block data $C_i$ fed back when the plaintext block data $M_{i+1}$ is not encrypted subsequent to the plaintext block data $M_i$ so that the encryption process of any of the plaintext block data of the plaintext data N is started; and a selector for selecting and supplying the ciphertext block data $C_i$ fed back from the feedback line of the feedback loop to the feedback loop in case that the plaintext block data $M_{i+1}$ is encrypted subsequent to the plaintext block data $M_i$, and for selecting and supplying the ciphertext block data $C_i$, stored in the memory to the feedback loop in case that the plaintext block data $M_{i+1}$ is not encrypted subsequent to the plaintext block data $M_i$ and the plaintext block data $M_{i+1}$ is encrypted after any of the plaintext block data of the plaintext data N is encrypted, wherein the plaintext block data $M_i$ (i=1, 2, 3, ..., I) are logically continuous data elements, and the plaintext block data $N_j$ (j=1, 2, 3, ..., J) are logically continuous data elements.

8. The encrypting apparatus of claim 7, wherein the memory includes:

plural registers corresponding to plural pieces of plaintext data; and a switch for switching the plural registers corresponding to the plaintext data to be encrypted.

9. An encrypting method comprising the steps of:

encrypting plaintext block data $M_i$ (i=1, 2, 3, ..., I; where I is an integer) of first plaintext data M using ciphertext block data $C_i$ (i=1, 2, 3, ..., I) output from an encrypting module;

storing ciphertext block data $C_i$ to be used for encrypting plaintext block data $M_{i+1}$ of the first plaintext data M in a memory during or after encrypting process of the plaintext block data $M_i$;

encrypting at least one plaintext block data of second plaintext data N after storing the ciphertext block data $C_i$ to be used for encrypting the plaintext block data $M_{i+1}$ in the memory thereby interrupting the encryption process of the first plaintext data M between $M_i$ and $M_{i+1}$, wherein $M_i$ and $M_{i+1}$ are two logically continuous data elements in the first processing data; and encrypting the plaintext block data $M_{i+1}$ of the first plaintext data M by inputting the ciphertext block data $C_i$ to be used for the plaintext block data $M_{i+1}$ stored in the memory and using the encrypting module after encrypting the at least one plaintext block data of the second plaintext data N, wherein the plaintext block data $M_i$ (i=1, 2, 3, ..., I) are logically continuous data elements.

10. A computer readable storage medium storing a program for having a computer execute steps for the encrypting method described in claim 9.

11. An encrypting apparatus encrypting plaintext data including at least one plaintext block data into ciphertext data using an encrypting unit and generating a message authentication code (MAC) to ensure an integrity of the ciphertext data, the encrypting apparatus comprising:

an encrypting unit, having a first feedback loop for feeding back ciphertext block data $C_i$ (i=1, 2, 3, ..., I; where I is an integer) output by the encrypting unit to the encrypting unit when the plaintext block data $M_i$ (i=1, 2, 3, ..., I) is encrypted by the encrypting unit, for inputting the plaintext block data $M_i$, performing an encrypting process by feeding back the ciphertext block data $C_i$ through the first feedback loop, and outputting the ciphertext block data $C_i$;

a message authentication code (MAC) generator, having a second feedback loop for feeding back a computed intermediate MAC result, for inputting the ciphertext block data $C_i$ whenever the ciphertext block data $C_i$ is output from the encrypting unit, processing data, feeding back the computed intermediate MAC result by the second feedback loop, and generating the MAC to ensure the integrity of the ciphertext data, wherein the ciphertext block data $C_i$ is input to the MAC generator before the ciphertext block data $C_{i+1}$ is output from the encrypting unit.

12. The encrypting apparatus of claim 11, wherein the encrypting unit and the MAC generator perform alternately the encrypting process and a MAC generating process by sharing one encrypting module and one feedback loop, and wherein the one feedback loop includes:

a memory for respectively storing and outputting results of the encrypting process and the MAC generating process; and a selector for selecting alternately the results of the encrypting process and the MAC generating process from the memory to alternately perform the encrypting process and the MAC generating process.

13. An encrypting method for encrypting plaintext data including at least one plaintext block data into ciphertext data using an encrypting unit and generating a message authentication code (MAC) to ensure an integrity of the ciphertext data, the encrypting method comprising:

an encrypting step, including a first feedback step for feeding back ciphertext block data $C_i$ (i=1, 2, 3, ..., I; where I is an integer) output from the encrypting unit when the encrypting unit encrypts plaintext block data $M_i$ (i=1, 2, 3, ..., I), inputting the plaintext block data $M_i$, performing an encrypting process by feeding back the ciphertext block data $C_i$ through a first feedback loop, and outputting a ciphertext block data $C_i$; and a MAC generating step, including a second feedback step for feeding back a computed intermediate MAC result, inputting the ciphertext block data whenever the ciphertext block data is output from the encrypting step, processing data, feeding back the computed intermediate MAC result through the second feedback step, and generating the MAC to ensure the integrity of the ciphertext data, wherein the ciphertext block data $C_i$ is input to the MAC generating step before the ciphertext block data $C_{i+1}$ is output by the encrypting step.

14. A computer readable storage medium storing a program for having a computer execute steps for the encrypting method described in claim 13.

15. A decrypting apparatus decrypting first processing data and second processing data comprising a memory for storing a status of a decrypting process, wherein the decrypting apparatus starts the decrypting process of the second processing data before the decrypting process of the first processing data is completed, the decrypting apparatus causes the memory store the status of the decrypting process of the first processing data when the decrypting process of the second processing data is started, and the decrypting status of the decrypting apparatus is returned to the status of the decrypting process of the first processing data stored in the memory when the decrypting process of the first processing data is restarted, and the first processing data comprises a first logically continuous set of data elements when decrypted, and the second processing data comprises a second logically continuous set of data elements when decrypted.

16. The decrypting apparatus of claim 15, wherein the decrypting apparatus restarts the decrypting process of the first processing data before the decrypting process of the second processing data is completed, the memory stores the decrypting status of the second processing data when the decrypting process of the first processing data is restarted, the decrypting status of the decrypting apparatus is returned to the decrypting status of the second processing data stored in the memory when the decrypting process of the second processing data is restarted.

17. The decrypting apparatus of claim 15, wherein the first processing data is a continuous set of ciphertext data, and the second processing data is another ciphertext data.

18. The decrypting apparatus of claim 15, wherein the decrypting apparatus starts the decrypting process of a first block data of the second processing data in response to receiving an interrupt.

19. The decrypting apparatus of claim 15, wherein the decrypting process is performed using block cipher algorithm.

20. The decrypting apparatus of claim 15, wherein the memory stores an intermediate decrypting result of the second processing data and an encryption key to be used for decrypting the second processing data as the status of the decrypting process.

21. A decrypting apparatus decrypting ciphertext block data $C_i$ (i=1, 2, 3, ..., I; where I is an integer) included in ciphertext data C and ciphertext block data $D_j$ (j=1, 2, 3, ..., J; where J is an integer) included in ciphertext data D, the decrypting apparatus comprising:

a mechanism for receiving a request to decrypt the ciphertext data D at an arbitrary timing during a decrypting process of the ciphertext data C;

a decrypting unit for performing the decrypting process of the ciphertext block data $C_i$ to output plaintext block data $M_i$;

a feedback loop for feeding back the ciphertext block data $C_i$ to be used for decrypting ciphertext block data $C_{i+1}$ to the decrypting unit through a feedback line;

a memory, provided in parallel with the feedback line of the feedback loop, for receiving the request to decrypt the ciphertext data D and storing the ciphertext block data $C_i$ fed back when the ciphertext block data $C_{i+1}$ is not decrypted subsequent to the ciphertext block data $C_i$ so that the decrypting process of any of ciphertext block data of the ciphertext data D is started; and a selector for selecting and supplying the ciphertext block data $C_i$ fed back from the feedback line of the feedback loop in case that the ciphertext block data $C_{i+1}$ is decrypted subsequent to the ciphertext bock data $C_i$, and for selecting and supplying the ciphertext block data $C_i$ stored in the memory in case that the ciphertext block data $C_{i+1}$ is not decrypted subsequent to the ciphertext block data $C_i$ and the ciphertext block data $C_{i+1}$ is decrypted after any of the ciphertext block data of the ciphertext data D is decrypted, wherein the plaintext block data $M_i$ (i=1, 2, 3, ..., I) are logically continuous data elements, and decryption of the ciphertext data D results in another plaintext data N being output.

22. The decrypting apparatus of claim 21, wherein the memory includes:

plural registers corresponding to plural pieces of ciphertext data; and a switch switching registers corresponding to the ciphertext data to be decrypted.

23. A decrypting method comprising steps of:

decrypting ciphertext block data $C_i$ (i=1, 2, 3, ..., I; where I is an integer) of first ciphertext data C using a decrypting module;

storing ciphertext block data $C_i$ to be used for decrypting ciphertext block data $C_{i+1}$ in a memory;

decrypting at least one ciphertext block data of a second ciphertext data D after storing the ciphertext block data $C_i$ to be used for decrypting the ciphertext block data $C_{i+1}$; and inputting the ciphertext block data $C_i$ to be used for decrypting the ciphertext block data $C_{i+1}$ stored in the memory after decrypting the at least one ciphertext block data $D_j$ of the ciphertext data D and decrypting the ciphertext block data $C_{i+1}$ of the first ciphertext data C using the decrypting module, wherein decryption of the ciphertext block data $C_i$ results in a logically-continuous set of plaintext block data $M_i$ (i=1, 2, 3, ..., I), and decryption of the ciphertext block data $D_j$ results in another plaintext block data $N_j$ being output.

24. A computer readable storage medium storing a program for having a computer execute steps for the decrypting method described in claim 23.

25. A decrypting apparatus decrypting ciphertext data including at least one ciphertext block data into plaintext data, and generating a message authentication code (MAC) for ensuring an integrity of the ciphertext data, the decrypting apparatus comprising:

a decrypting unit, including a first feedback loop for feeding back module output block data $T_i$ (i=1, 2, 3, ..., I; where I is an integer) generated at decrypting data by a decrypting module, for inputting the ciphertext block data $C_i$ (i=1, 2, 3, ..., I; where I is an integer), decrypting the ciphertext block data $C_i$ using the module output block data $T_i$ fed back through the first feedback loop, and outputting plaintext block data;

a MAC generator, including a second feedback loop for feeding back a computed intermediate MAC result, for inputting ciphertext block data $C_i$ identical to the ciphertext block data $C_i$ input to the decrypting unit, processing the data, outputting the computed intermediate MAC result, feeding back the computed intermediate MAC result through the second feedback loop, and generating the MAC for ensuring the integrity of ciphertext data, wherein the ciphertext block data $C_i$ is input to the MAC generator before the ciphertext block data $C_{i+1}$ is decrypted by the decrypting unit.

26. The decrypting apparatus of claim 25,
wherein the decrypting unit and the MAC generator share one decrypting module and one feedback loop and alternately perform a decrypting process and a MAC generating process, and
wherein the one feedback loop includes:
a memory storing and outputting results of the decrypting process and the MAC generating process; and
a selector for alternately selecting the results of the decrypting process and the MAC generating process to output to the decrypting module for alternately performing the decrypting process and the MAC generating process.

27. A decrypting method decrypting ciphertext data including at least one ciphertext block data into plaintext data and generating a message authentication code (MAC) for ensuring an integrity of the ciphertext data, the decrypting method comprising:
a decrypting step including a first feedback step for feeding back module output block data $T_i$ (i=1, 2, 3, ..., I; where I is an integer) generated at decrypting data by a decrypting module, inputting the ciphertext block data $C_i$ (i1, 2, 3, ..., I), decrypting the ciphertext block data $C_i$ using the module output block data $T_i$ fed back through the first feedback step, and outputting plaintext block data;
a MAC generating step including a second feedback step for feeding back a computed intermediate MAC result, inputting ciphertext block data $C_i$ identical to the ciphertext block data $C_i$ input to the decrypting unit, processing the data, outputting the computed intermediate MAC result, feeding back the computed intermediate MAC result by the second feedback step, and generating the MAC for ensuring the integrity of ciphertext data,
wherein the ciphertext block data $C_i$ is input to the MAC generating step before the ciphertext block data $C_{i+1}$ is decrypted by the decrypting step.

28. A computer readable storage medium storing a program for having a computer execute steps for the decrypting method described in claim 27.

29. An encrypting apparatus encrypting plaintext data M including plaintext block data $M_i$ (i=1, 2, 3, ..., I; where I is an integer) and plaintext data N including plaintext block data $N_j$ (j=1, 2, 3, ..., J; where J is an integer), the encrypting apparatus comprising:
a mechanism for receiving a request to encrypt the plaintext data N during encrypting process of the plaintext data M before completion of the encrypting process of the plaintext data M;
an encrypting module for outputting encrypted data as module output block data $T_i$;
a feedback loop for feeding back the module output block data $T_i$ output from the encrypting module to the encrypting module through a feedback line;
a memory, provided in parallel with the feedback line of the feedback loop, for receiving the request to encrypt the plaintext data N, and storing the module output block data $T_i$ fed back when the plaintext block data $M_{i+1}$ is not encrypted subsequent to the plaintext block data $M_i$ so that an encrypting process of any plaintext block data of the plaintext data N is started; and
a selector for selecting and supplying the module output block data $T_i$ fed back through the feedback line of the feed back loop to the feedback loop in case that the plaintext block data $M_{i+1}$ is encrypted subsequent to the plaintext block data $M_i$, and for selecting and supplying the module output block data $T_i$ stored in the memory to the feedback loop in case that the plaintext block data $M_{i+1}$ is not encrypted subsequent to the plaintext block data $M_i$ and the plaintext block data $M_{i+1}$ is encrypted after any of plaintext block data of the plaintext data N is encrypted,
wherein the plaintext block data $M_i$ (i=1, 2, 3, ..., I) are logically continuous data elements, and the plaintext block data $N_j$ (j=1, 2, 3, ..., J) are logically continuous data elements.

30. The encrypting apparatus of claim 29, wherein the memory includes:
plural registers corresponding to plural pieces of plaintext data; and
a switch switching registers corresponding to the plaintext data to be encrypted.

31. An encrypting method comprising steps of:
encrypting plaintext block data $M_i$ (i=1, 2, 3, ..., I; where I is an integer) of first plaintext data M using module output block data $T_i$ (i=1, 2, 3, ..., I) output from an encrypting module;
storing the module output block data $T_i$ to be used for encrypting the plaintext block data $M_{i+1}$ of the first plaintext data M;
encrypting at least one plaintext block data of second plaintext data N after storing the module output block data $T_i$ to be used for encrypting the plaintext block data $M_{i+1}$; and
inputting the module output block data $T_i$ to be used for encrypting the plaintext block data $M_{i+1}$ stored in the memory after encrypting the at least one plaintext block data of the second plaintext data N and encrypting the plaintext block data $M_i$ of the first plaintext data M using the encrypting module,
wherein the plaintext block data $M_i$ (i=1, 2, 3, ..., I) are logically continuous data elements.

32. A computer readable storage medium storing a program for having a computer execute steps for the encrypting method described in claim 31.

33. An encrypting apparatus encrypting plaintext data including at least one plaintext block data and generating a message authentication code (MAC) for ensuring an integrity of ciphertext data, the encrypting apparatus comprising:
an encrypting unit, having a first feedback loop for feeding back module output block data $T_i$ (i=1, 2, 3, ..., I; where I is an integer) output from the encrypting module to the encrypting module when the plaintext block data $M_i$ (i=1, 2, 3, ..., I) is encrypted by the encrypting unit, for inputting the plaintext data, performing encrypting process by feeding back the module output block data $T_i$ through the first feedback loop, and outputting the ciphertext block data $C_i$ (i=1, 2, 3, ..., I);
a MAC generator, having a second feedback loop for feeding back a computed intermediate MAC result, for inputting the ciphertext block data $C_i$ whenever the ciphertext block data $C_i$ is output from the encrypting unit, processing data, feeding back the computed intermediate MAC result through the second feedback loop, and generating the MAC to ensure the integrity of the ciphertext data,
wherein the ciphertext block data $C_i$ is input to the MAC generator before the ciphertext block data $C_{i+1}$ is output from the encrypting unit.

34. The encrypting apparatus of claim 33,
wherein the encrypting unit and the MAC generator share one encrypting module and one feedback loop to perform alternately the encrypting process and a MAC generating process, and
wherein the one feedback loop includes:
a memory for respectively storing and outputting results of the encrypting process and the MAC generating process; and
a selector for selecting alternately the results of the encrypting process and the MAC generating process from the memory to alternately perform the encrypting process and the MAC generating process.

35. An encrypting method for encrypting plaintext data including at least one plaintext block data into ciphertext data using an encrypting unit and generating a message authentication code (MAC) to ensure an integrity of the ciphertext data comprising:
an encrypting step, having a first feedback step for feeding back module output block data $T_i$ (i=1, 2, 3, ..., I; where I is an integer) output from an encrypting module when the plaintext block data $M_i$ (i=1, 2, 3, ..., I) is encrypted, for inputting the plaintext block data, performing an encrypting process by feeding back the module output block data $T_i$ through a first feedback loop, and outputting ciphertext block data $C_i$ (i=1, 2, 3, ..., I); and
a MAC generating step, having a second feedback step for feeding back a computed intermediate MAC result, for inputting the ciphertext block data $C_i$ whenever the ciphertext block data $C_i$ is output from the encrypting step, processing data, feeding back the computed intermediate MAC result through the second feedback step, and generating the MAC to ensure the integrity of the ciphertext data,
wherein the ciphertext block data $C_i$ is input to the MAC generating step before the ciphertext block data $C_{i+1}$ is output by the encrypting step.

36. A computer readable storage medium storing a program for having a computer execute steps for the encrypting method described in claim 35.

37. A decrypting apparatus decrypting ciphertext data C including ciphertext block data $C_i$ (i=1, 2, 3, ..., I; where I is an integer) and ciphertext data D including ciphertext block data $D_j$ (j=1, 2, 3, ..., J; where J is an integer), the decrypting apparatus comprising:
a mechanism for receiving a request to decrypt the ciphertext data D during a decrypting process of the ciphertext data C;
a decrypting module for outputting decrypted data as module output block data $T_i$ (i=1, 2, 3, ..., I; where I is an integer);
a feedback loop for feeding back the module output block data $T_i$ output from the decrypting module to the decrypting module through a feedback line;
a memory, provided in parallel with the feedback line of the feedback loop, for receiving a request to decrypt the ciphertext data D and stores the module output block data $T_i$ fed back in case that the ciphertext block data $C_{i+1}$ is not decrypted subsequent to the ciphertext block data $C_i$ so that the decrypting process of any of the ciphertext block data of the ciphertext data D is started; and
a selector for selecting and supplying the module output block data $T_i$ fed back through the feedback line of the feedback loop to the feedback loop in case that the ciphertext block data $C_{i+1}$ is decrypted subsequent to the ciphertext block data $C_i$, and for selecting and supplying the module output block data $T_i$ stored in the memory to supply to the feedback loop in case that the ciphertext block data $C_{i+1}$ is not decrypted subsequent to the ciphertext block data $C_i$ and the ciphertext block data $C_{i+1}$ is decrypted after any of the ciphertext block data of the ciphertext data D is decrypted,
wherein the plaintext block data $M_i$ (i=1, 2, 3, ...) are logically continuous data elements, and decryption of the ciphertext data D results in another plaintext data N being output.

38. The decrypting apparatus of claim 37, wherein the memory includes:
plural registers corresponding to plural ciphertext data; and
a switch for switching the plural registers corresponding to the ciphertext data to be decrypted.

39. A decrypting method comprising steps of:
decrypting ciphertext block data $C_i$ (i=1, 2, 3, ..., I; where I is an integer) of first ciphertext data C using module output block data $T_i$ (i=1, 2, 3, ..., I) output from a decrypting module;
storing module output block data $T_i$ to be used for decrypting ciphertext block data $C_{i+1}$ of the first ciphertext data C in a memory;
decrypting at least one ciphertext block data $D_j$ of second ciphertext data D after storing the module output block data $T_i$ to be used for decrypting the ciphertext block data $C_{i+1}$ in the memory; and
decrypting the ciphertext block data $C_{i+1}$ of the first ciphertext data C using the decrypting module by inputting the module output block data $T_i$ to be used for the ciphertext block data $C_{i+1}$ stored in the memory after decrypting the at least one ciphertext block data of the second ciphertext data D,
wherein decryption of the ciphertext block data $C_i$ results in a logically-continuous set of plaintext block data $M_i$ (i=1, 2, 3, ..., I), and decryption of the ciphertext block data $D_j$ results in another plaintext block data $N_j$ being output.

40. A computer readable storage medium storing a program for having a computer execute steps for the decrypting method described in claim 39.

41. A decrypting apparatus decrypting ciphertext data including at least one ciphertext block data into ciphertext data using a decrypting module and generating a message authentication code (MAC) to ensure an integrity of the ciphertext data, the decrypting apparatus comprising:
a decrypting unit, having a first feedback loop for feeding back ciphertext block data $C_i$ (i=1, 2, 3, ..., I; where I is an integer) output from the decrypting unit to the decrypting unit when the ciphertext block data $C_i$ is decrypted by the decrypting unit, for inputting the ciphertext data, performing a decrypting process by feeding back the module output block data $T_i$ (i=1, 2, 3, ..., I) through the first feedback loop, and outputting the ciphertext block data $C_i$;
a message authentication code (MAC) generator having a second feedback loop for feeding back a computed intermediate MAC result, for inputting the ciphertext block data $C_i$ identical to the ciphertext block data $C_i$ input to the decrypting unit, processing data, feeding back the computed intermediate MAC result through the second feedback loop, and generating the MAC to ensure the integrity of the ciphertext data, wherein the ciphertext block data $C_i$ is input to the MAC generator before the ciphertext block data $C_{i+1}$ is output by the decrypting unit.

42. The decrypting apparatus of claim 41,
wherein the decrypting unit and the MAC generator share one decrypting module and one feedback loop to perform alternately the decrypting process and a MAC generating process, and
wherein the one feedback loop includes:
a memory for respectively storing and outputting results of the decrypting process and the MAC generating process; and
a selector for selecting alternately the results of the decrypting process and the MAC generating process from the memory to alternately perform the decrypting process and the MAC generating process.

43. A decrypting method for decrypting ciphertext data including at least one ciphertext block data into plaintext data using a decrypting unit and generating a message authentication code (MAC) to ensure an integrity of the ciphertext data, the decrypting method comprising:
a decrypting step, having a first feedback step for feeding back ciphertext block data $C_i$ (i=1, 2, 3, ..., I; where I is an integer), for inputting the ciphertext block data $C_i$, performing a decrypting process of the ciphertext block data $C_i$ fed back through the first feedback step, and outputting plaintext block data; and
a MAC generating step, having a second feedback step for feeding back a computed intermediate MAC result, for inputting the ciphertext block data $C_i$ identical to the ciphertext block data $C_i$ input to the decrypting step, processing data to output the computed intermediate MAC result, feeding back the computed intermediate MAC result through the second feedback step, and generating the MAC to ensure the integrity of the ciphertext data, wherein
the ciphertext block data $C_i$ is input to the MAC generating step before the ciphertext block data $C_{i+1}$ is output by the decrypting step.

44. A computer readable storage medium storing a program for having a computer execute steps for the decrypting method described in claim 43.

45. An encrypting apparatus comprising:
an encrypting unit with a feedback loop, the encrypting unit being adapted for inputting blocks of plaintext data and outputting ciphertext data, each block of ciphertext data being generated by encrypting a corresponding block of the plaintext data according to a feedback-based scheme; and
a message authentication code (MAC) generator with a second feedback loop, the MAC generator being adapted for inputting each block of ciphertext data output from the encrypting unit and generating a MAC according to a feedback-based scheme for ensuring an integrity of the ciphertext data, and
wherein the MAC generator starts generating the MAC before the blocks of plaintext data have been encrypted by the encrypting unit.

46. A decrypting apparatus comprising:
a decrypting unit with a feedback loop, the decrypting unit being adapted for inputting blocks of ciphertext data to decrypt and outputting plaintext data, each block of plaintext data being generated by decrypting a corresponding block of ciphertext data according to a feedback-based scheme; and
a message authentication code (MAC) generator with a second feedback loop, the MAC generator being adapted for inputting each block of plaintext data output from the decrypting unit and generating a MAC according to a feedback-based scheme for ensuring an integrity of the ciphertext data, and
wherein the MAC generator starts generating the MAC before the blocks of ciphertext data have been decrypted by the decrypting unit.

47. An encrypting method comprising:
a feedback-based encrypting step for inputting blocks of plaintext data and outputting ciphertext data, each block of ciphertext data being generated by encrypting a corresponding block of the plaintext data according to a feedback-based scheme; and
a feedback-based MAC generating step for inputting each block of ciphertext data output from the encrypting step and generating a MAC according to a second feedback-based scheme for ensuring an integrity of the ciphertext data, and
wherein the MAC generating step starts generating the MAC before the blocks of plaintext data have been encrypted by the encrypting step.

48. A decrypting method comprising:
a feedback-based decrypting step for inputting blocks of ciphertext data to decrypt and outputting plaintext data, each block of plaintext data being generated by decrypting a corresponding block of ciphertext data according to a feedback-based scheme; and
a feedback-based MAC generating step for inputting each block of plaintext data output from the decrypting step and generating a MAC according to a second feedback-based scheme for ensuring an integrity of the ciphertext data, and
wherein the MAC generating step starts generating the MAC before the blocks of ciphertext data have been decrypted by the decrypting step.

49. A computer readable storage medium storing a program for having a computer execute steps for the encrypting method described in claim 47.

50. A computer readable storage medium storing a program for having a computer execute steps for the decrypting method described in claim 48.

* * * * *